United States Patent
White et al.

(10) Patent No.: US 10,731,077 B2
(45) Date of Patent: **\*Aug. 4, 2020**

(54) VOXELATED LIQUID CRYSTAL ELASTOMERS

(71) Applicant: Government of the United States as Represented by the Secretary of the Air Force, Wright-Patterson AFB, OH (US)

(72) Inventors: Timothy J. White, Centerville, OH (US); Taylor H. Ware, Richardson, TX (US); Michael E. McConney, Beavercreek, OH (US); Jeong Jae Wie, Beavercreek, OH (US); Suk-Kyun Ahn, Busan (KR)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/877,533

(22) Filed: Jan. 23, 2018

(65) Prior Publication Data
US 2018/0208847 A1    Jul. 26, 2018

Related U.S. Application Data

(63) Continuation of application No. 15/135,087, filed on Apr. 21, 2016, now Pat. No. 9,902,906.
(Continued)

(51) Int. Cl.
C09K 19/38 (2006.01)
C08F 22/10 (2006.01)
(Continued)

(52) U.S. Cl.
CPC .......... *C09K 19/3809* (2013.01); *C08F 22/10* (2013.01); *C09K 19/3804* (2013.01); *G02F 1/133711* (2013.01); *G02F 1/133788* (2013.01); *C09K 2019/0425* (2013.01); *C09K 2219/00* (2013.01); *G02F 1/1339* (2013.01); *G02F 2001/133715* (2013.01)

(58) Field of Classification Search
None
See application file for complete search history.

(56) References Cited

U.S. PATENT DOCUMENTS

| 4,390,401 A | 6/1983 | Costanza |
| 5,838,407 A | 11/1998 | Chigrinov et al. |

(Continued)

FOREIGN PATENT DOCUMENTS

EP    2835394    2/2015

OTHER PUBLICATIONS

Haan et al. (Angew. Chem. Int. Ed. 2012, 51, 12469-12472).*
(Continued)

*Primary Examiner* — Vu A Nguyen
(74) *Attorney, Agent, or Firm* — AFMCLO/JAZ; Chastity Whitaker

(57) ABSTRACT

A shape-programmable liquid crystal elastomer comprises polymerized, nematic monomers. The monomers are organized into a plurality of voxels with each voxel having a director orientation.

4 Claims, 52 Drawing Sheets

US 10,731,077 B2
Page 2

Related U.S. Application Data

(60) Provisional application No. 62/150,778, filed on Apr. 21, 2015.

(51) Int. Cl.
*G02F 1/1337* (2006.01)
*C09K 19/04* (2006.01)
*G02F 1/1339* (2006.01)

(56) References Cited

U.S. PATENT DOCUMENTS

| | | | |
|---|---|---|---|
| 5,863,457 | A | 1/1999 | Hasebe et al. |
| 9,067,866 | B2 | 6/2015 | Bergiers |
| 9,902,906 | B2 | 2/2018 | White et al. |
| 2004/0233362 | A1 | 11/2004 | Kashima |
| 2009/0086128 | A1 | 4/2009 | Nakamura |
| 2010/0026935 | A1 | 2/2010 | Bachels |
| 2010/0231847 | A1 | 9/2010 | Escuti |
| 2011/0043717 | A1 | 2/2011 | Valyukh |
| 2012/0021142 | A1 | 1/2012 | Lee |
| 2013/0044267 | A1 | 2/2013 | Ishiguro |
| 2013/0050825 | A1 | 2/2013 | Takahashi |
| 2013/0100367 | A1 | 4/2013 | Takahashi |
| 2013/0342798 | A1 | 12/2013 | Miyake |
| 2014/0106089 | A1* | 4/2014 | Lee .............. C09K 19/2007 428/1.23 |
| 2014/0252666 | A1 | 9/2014 | Tabirian |
| 2015/0029456 | A1 | 1/2015 | Ikeda |
| 2015/0185387 | A1 | 7/2015 | Amimori |
| 2015/0331167 | A1 | 11/2015 | Escuti |
| 2018/0208847 | A1 | 7/2018 | White et al. |

OTHER PUBLICATIONS

Yu et al., Chem. Mater. 2004, 16, 1637-1643.*
Torras et al., J. Mater. Chem. C, 2013, 1, 5183-5190.*
Yu et al., Angew. Chem. Int. Ed. 2007, 46, 881-883.*
United States Patent and Trademark Office, Non-Final Office Action in U.S. Appl. No. 15/135,108, dated Oct. 4, 2018, 14 pages total.
United States Patent and Trademark Office, Final Office Action in U.S. Appl. No. 15/135,108, dated Feb. 12, 2018, 12 pages total.
C. L. Van Oosten et al., "Glassy photomechanical liquid-crystal network actuators for microscale devices," Eur. Phys. J. E., vol. 23 (2007) 329-336.
L. T. De Haan et al., "Supporting Information," Angew. Chem. Int. Ed., vol. 51 (2012) 4 pages total.
United States Patent and Trademark Office, Final Office Action in U.S. Appl. No. 15/135,108, dated Apr. 8, 2019, 14 pages total.
United States Patent and Trademark Office, Office Action in U.S. Appl. No. 15/135,108, dated Sep. 20, 2019, 7 pages total.

* cited by examiner

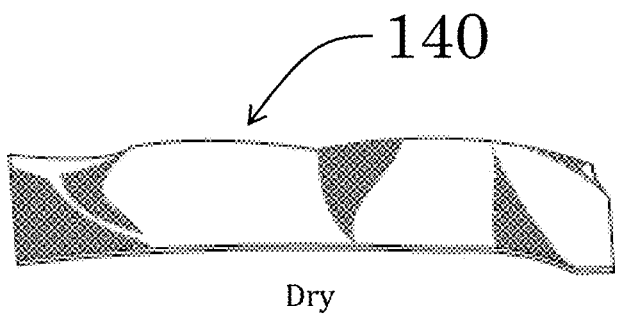
FIG. 19A  Dry
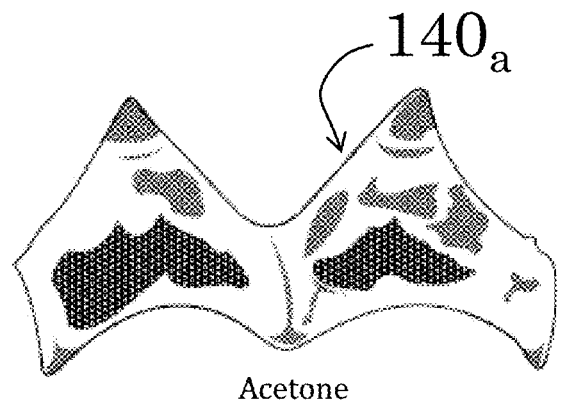
FIG. 19B  Acetone
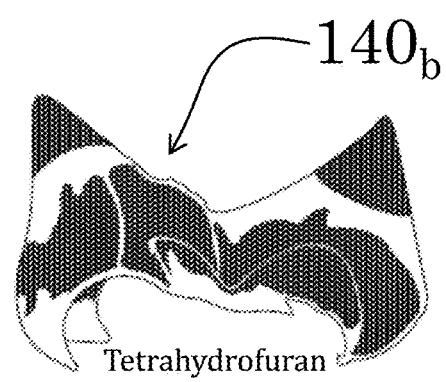
FIG. 19C  Tetrahydrofuran
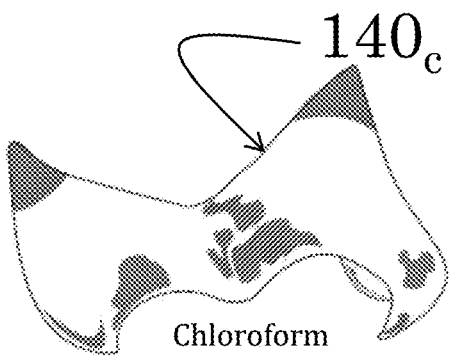
FIG. 19D  Chloroform

101 °C = $T_{NI}$ + 2

Dry

Acetone

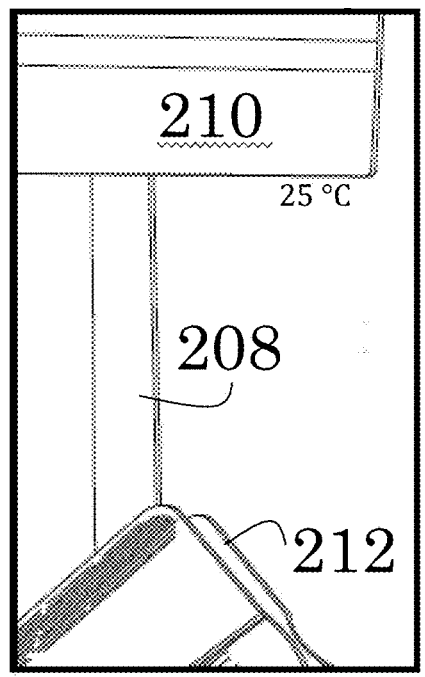
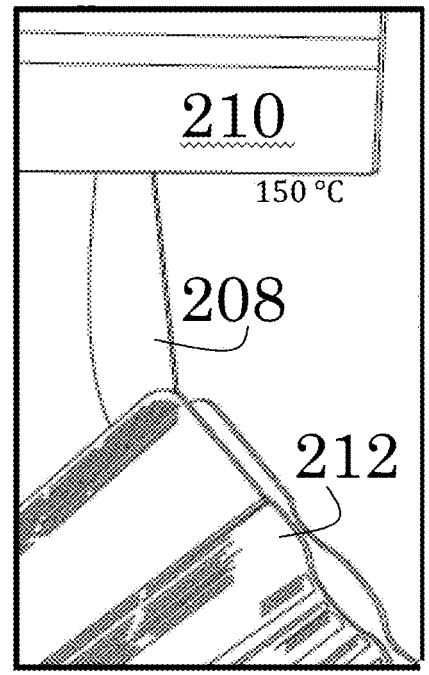
FIG. 51A   FIG. 51B
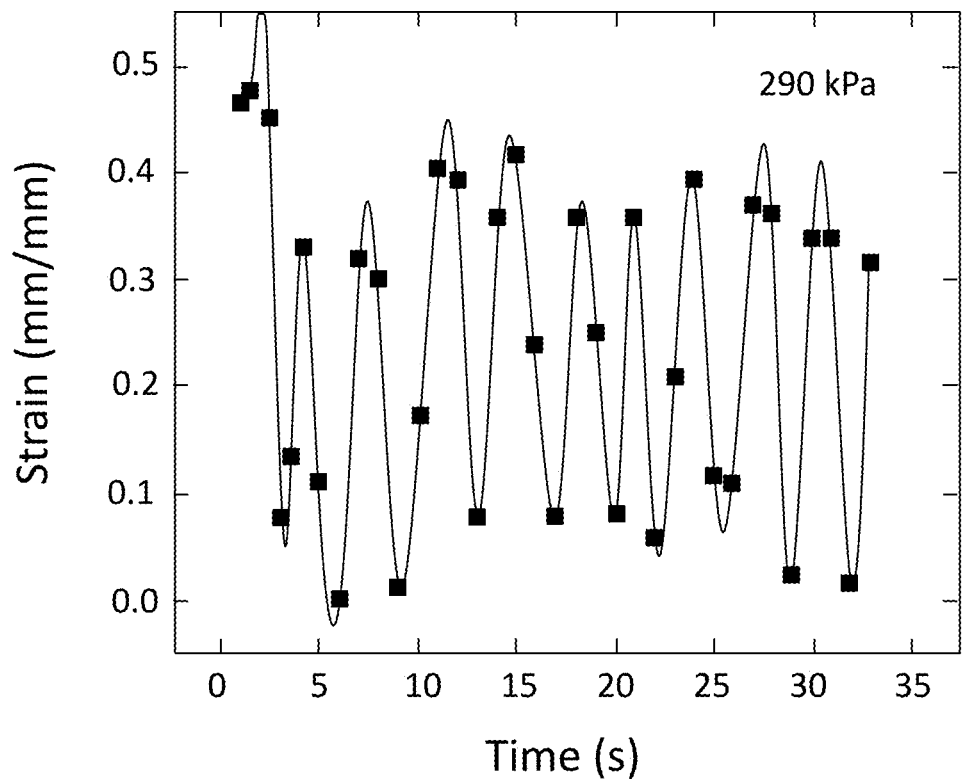
FIG. 52

FIG. 59
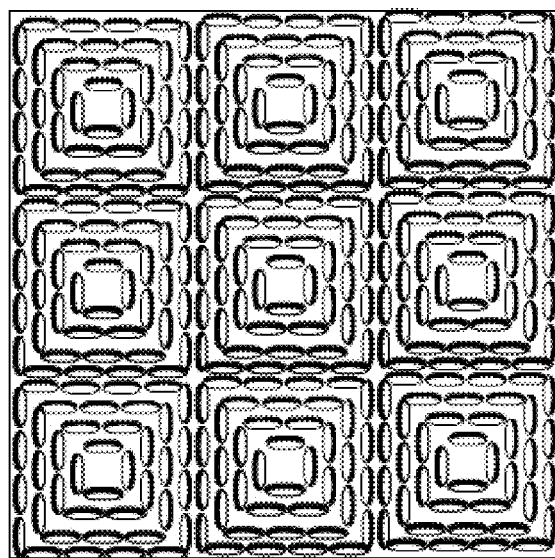
FIG. 60A
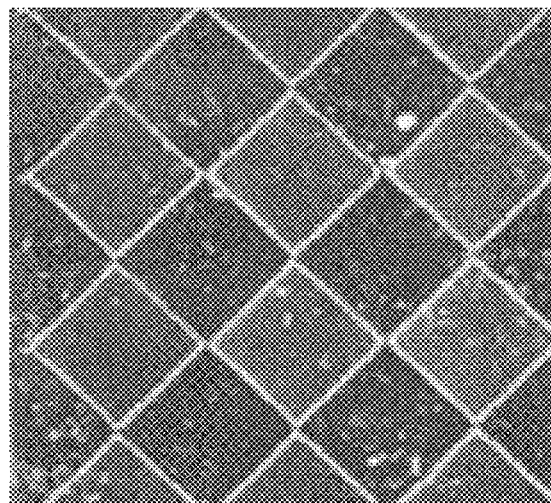
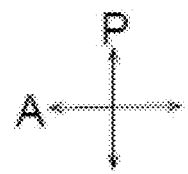
FIG. 60B
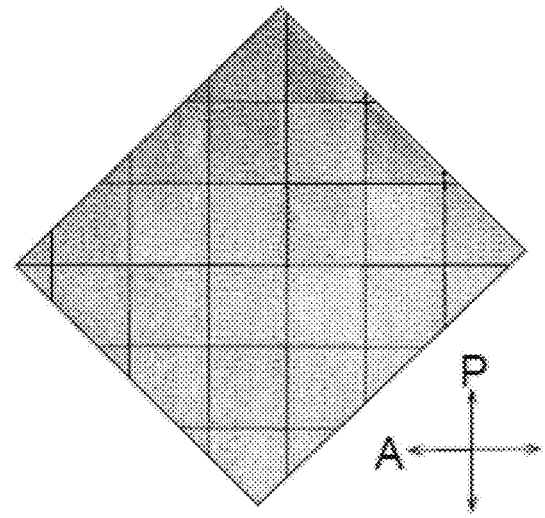

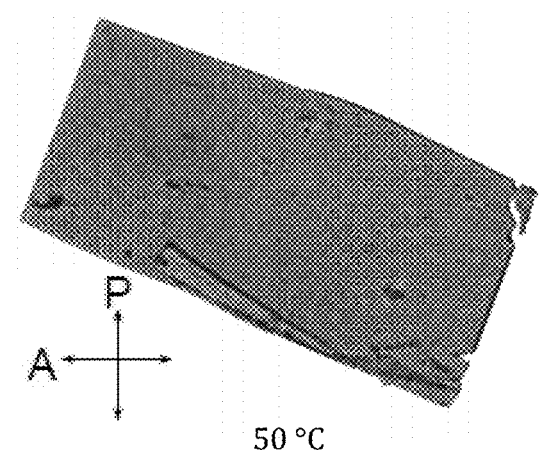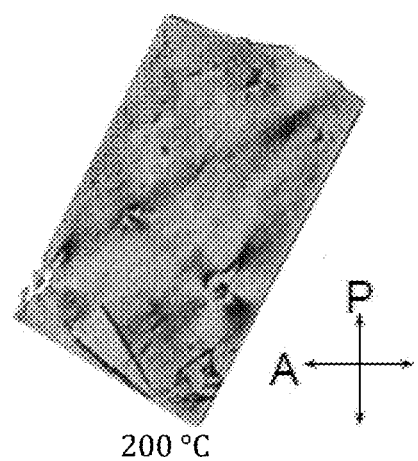
FIG. 67A  FIG. 67B
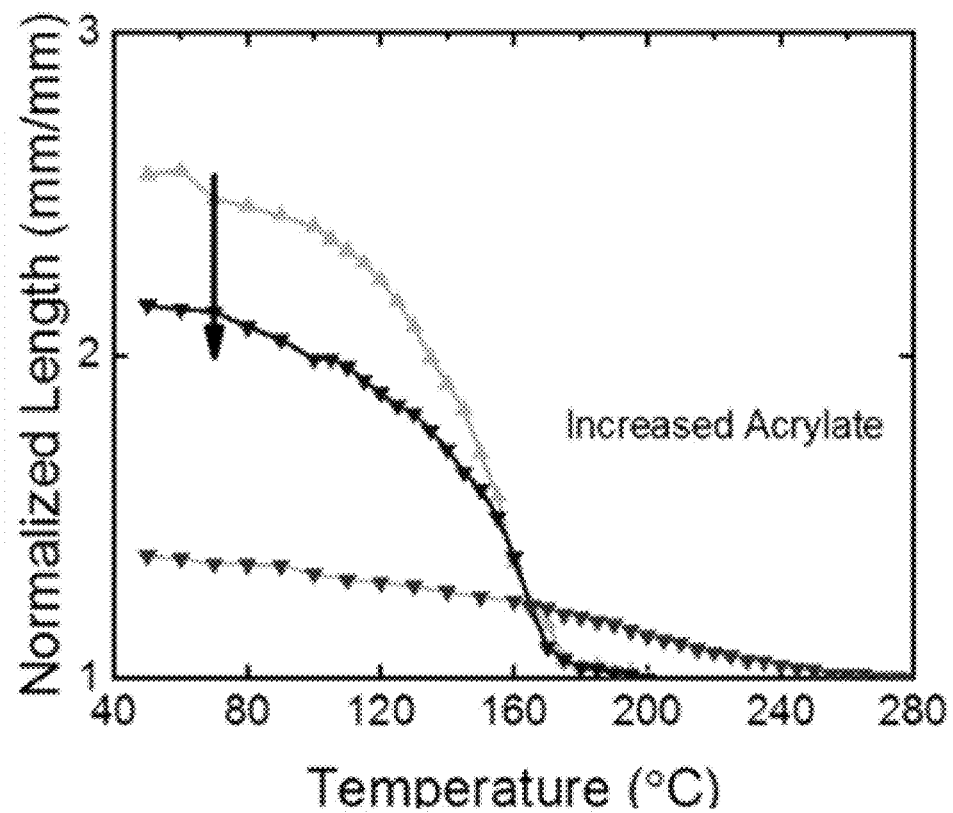
FIG. 68

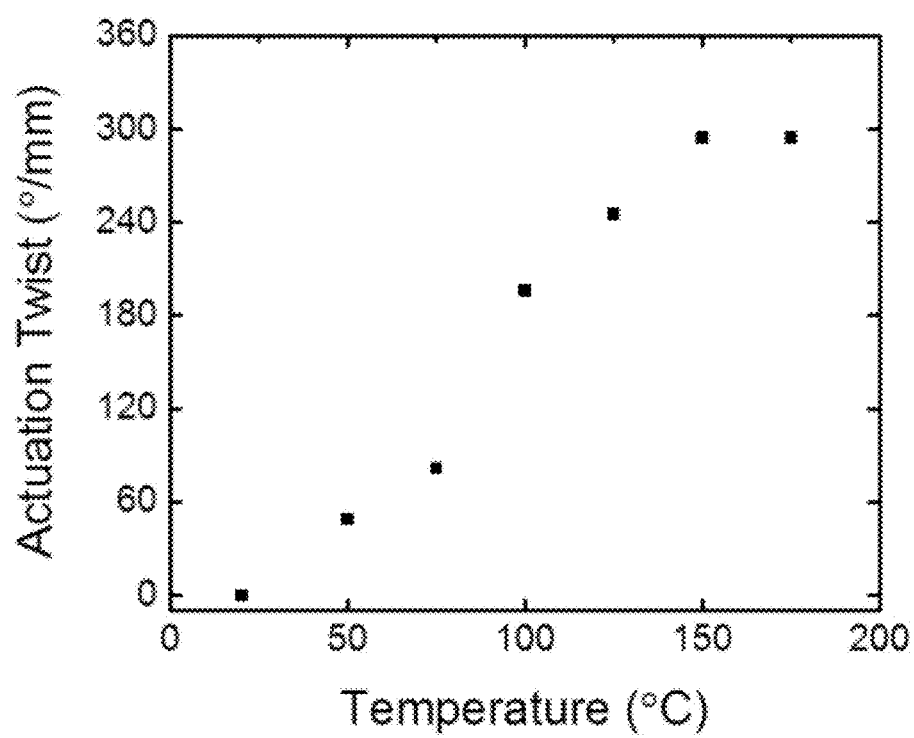
FIG. 69
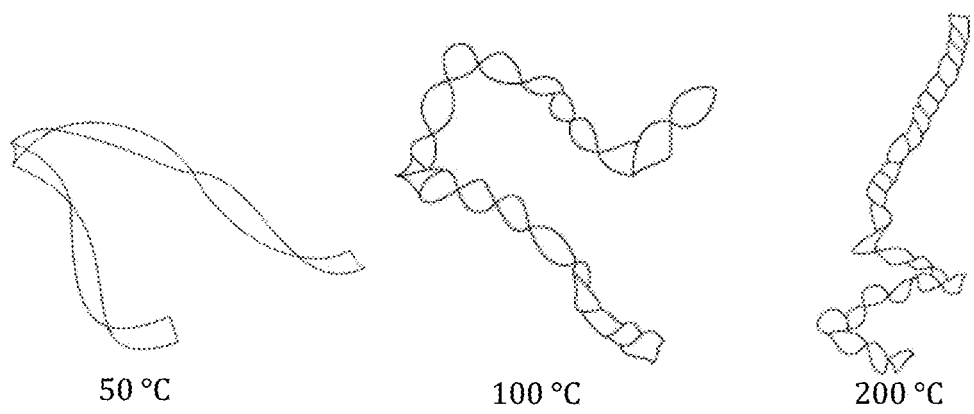
50 °C
FIG. 70A
100 °C
FIG. 70B
200 °C
FIG. 70C

25 °C

150 °C

25 °C

150 °C

VOXELATED LIQUID CRYSTAL ELASTOMERS

This application is a continuation of co-pending U.S. application Ser. No. 15/135,087, filed Apr. 21, 2016, which claimed the benefit of and priority to prior filed Provisional Application Ser. No. 62/150,778, filed Apr. 21, 2015. This application is also related to co-pending U.S. application Ser. No. 15/135,108, filed on Apr. 21, 2016, entitled METHODS OF MAKING VOXELATED LIQUID CRYSTAL ELASTOMERS. The disclosures of these applications are expressly incorporated herein by reference, each in its entirety.

RIGHTS OF THE GOVERNMENT

The invention described herein may be manufactured and used by or for the Government of the United States for all governmental purposes without the payment of any royalty.

FIELD OF THE INVENTION

The present invention relates generally to liquid crystals and, more particularly, to compositions and methods regarding cross-linked liquid crystal polymers.

BACKGROUND OF THE INVENTION

The dexterity, reversibility, and reconfigurability of a complex shape or surface would enhance devices and practices in medicine, robotics, and aerospace. Limited complex shape change and actuation has been reported in patterned hydrogels by carefully designing semicrystalline polymer networks. The implementation of a programmable shape change in applications in aerospace and other outlets requires the further development of soft materials that exhibit large stimuli-induced responses while affording local control of the magnitudes and directionality of the strain. Once realized, these shape-programmable materials could enable and extend the functionality of devices in applications as simple as packaging to as complex as deployable and tunable antennas.

Cross-linked liquid crystal polymers, particularly elastomeric versions referred to as liquid crystal elastomers ("LCEs") have shown some promise in the field of reconfigurable shapes and surfaces. LCEs are lightly cross-linked, ordered polymers that exhibit reversible shape change in response to a stimulus, such as heat, light, or solvent. Alignment of LCEs into a mono-domain or single crystal orientation has primarily employed stretching (the so-called "Finkelmann Method") or applications of a magnetic field. Uniaxially-aligned LCEs have exhibited dimensional changes (tensile strain) that can exceed 300% along an alignment direction when exposed to a change in temperature.

However, these alignment methods are limited in spatial control of orientation and resolution. Complex director profiles within LCEs are necessary to realize monolithic devices or functional substrates capable of non-trivial, programmable, reversible shape change. While conventional methods exist and have been employed to generate complex and spatial variations in director orientations of low molar mass liquid crystals and glassy liquid crystalline polymer networks, the chemistries and procedures employed to synthesize aligned LCEs have proven insensitive to such techniques. Thus there remains a need for improved materials and methods for employing LCEs as reconfigurable shapes and surfaces.

SUMMARY OF THE INVENTION

The present invention overcomes the foregoing problems and other shortcomings, drawbacks, and challenges of conventional materials and methods related to reconfigurable shapes and surfaces. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a shape-programmable liquid crystal elastomer comprises polymerized, nematic monomers. The monomers are organized into a plurality of voxels with each voxel having a director orientation.

Other embodiments of the present invention are directed to a method of making a shape-programmable liquid crystal elastomer that includes preparing an alignment cell having a surface programmed with a plurality of domains. A cavity of the alignment cell is filled with a monomer solution. The monomers of the monomer solution are configured to align to the surface of the alignment cell. The aligned monomers are polymerized by Michael Addition. The polymerized monomers are then cross-linked to form a cross-linked liquid crystal elastomer. The cross-linking traps monomer alignment into a plurality of voxels with each voxel having a director orientation.

Still other embodiments of the present invention include a method of making a shape-programmable liquid crystal elastomer by preparing a patterned cell having a plurality of pixels. A nematic monomer solution is injected into a cavity of the patterned cell and the monomers polymerized. The polymers are cross-linked to trap monomer alignment into a plurality of voxels corresponding to respective one of the plurality of domains.

Embodiments of the present invention further include a liquid crystal film that includes a polymerized, nematic monomer and a topographical defect within the polymerized, nematic monomer. The topographical defect has first and second states. With a presence of a stimulus, the topographical defect assumes the first state; in an absence of the stimulus, the topographical defect assumes the second state.

According to yet other embodiments of the present invention, a liquid crystal film includes polymerized nematic monomers. First and second domains within the polymerized nematic monomer have first and second average directors, respectively. With a presence of a stimulus, the first average director is configured to cause a shape change of the first domain.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIGS. 19A-19D are side elevational views of an exemplary LCE according to another embodiment of the present invention and prepared to respond to a chemical stimulus.

FIGS. 51A and 51B are sequential, schematic representation of a thermally actuated film prepared according to embodiments of the present invention actuating a load that is approximately 1470 times the mass of the film.

FIG. 52 is a graphical representation of the reversible actuation of the film of FIGS. 51A and 51B.

FIG. 59 is a schematic representation of a pattern comprising a square array of alternating regions of alignment of either 0° or 90° with respect to the director orientation.

FIGS. 60A and 60B are grey scale images of a film patterned with the arrangement of FIG. 59 and visualized between crossed polarizers.

FIGS. 67A and 67B are polarized optical micrographs of a film prepared in accordance with an embodiment of the present invention with 0.5 RM82, at room temperature and 200° C., respectively.

FIG. 68 is a graphical representation of reversible shape change for three films prepared in accordance with embodiments of the present invention.

FIG. 69 is a graphical representation of induced torsional shape change with increasing temperature for films prepared in accordance with embodiments of the present invention.

FIGS. 70A-70C are schematic representations of sequential shape change of a film with temperature according to embodiments of the present invention.

Figure 1:
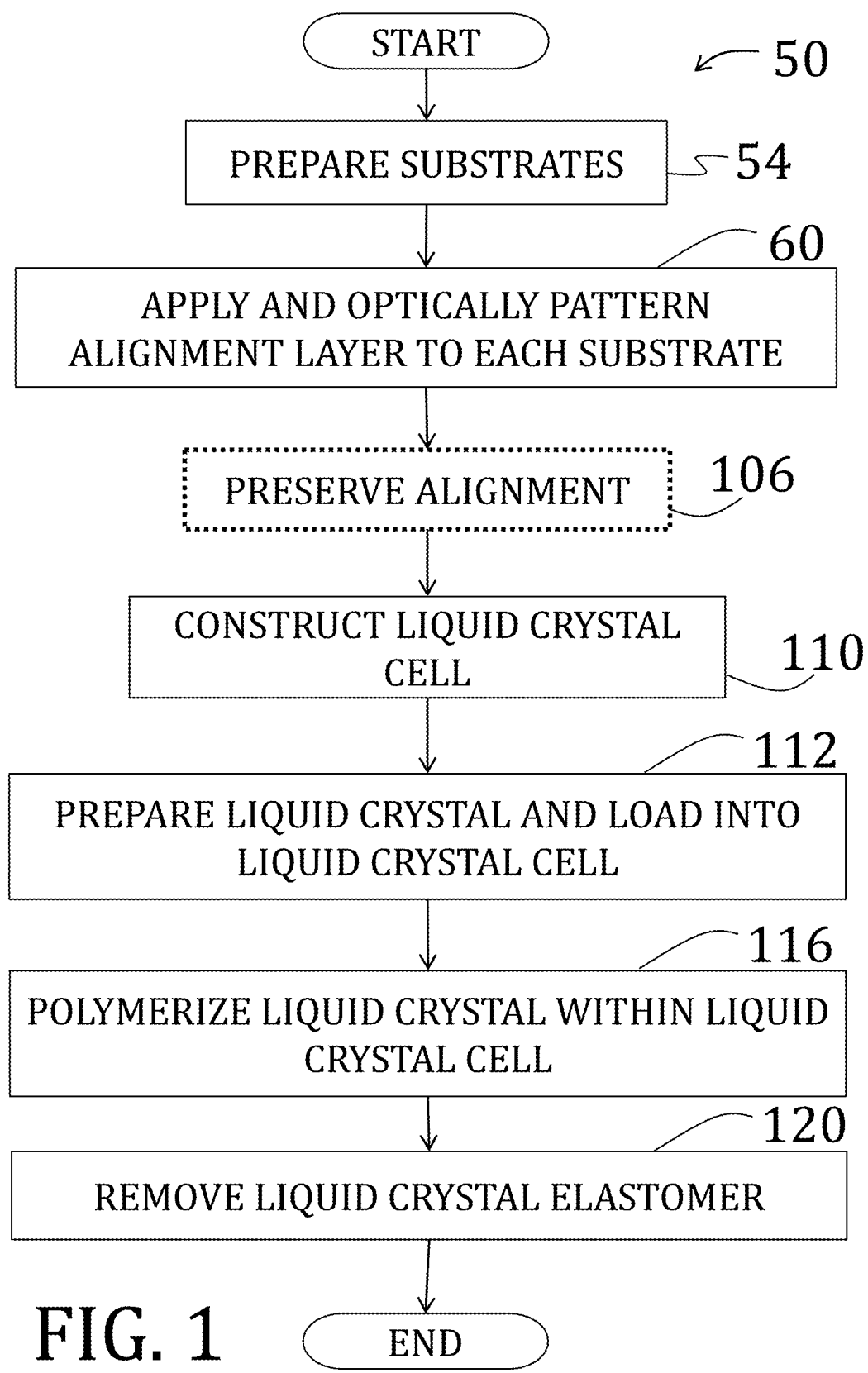
FIG. 1 is a flow chart illustrating a method of preparing a liquid crystal elastomer according to one embodiment of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Referring now to the figures, methods of preparing and using facile materials chemistry platforms conducive to the surface-alignment of liquid crystals are shown and described. The sensitivity of the materials chemistry to surface-alignment is combined with photoalignment of volumetric elements (also known as "voxels") having discrete directors (or domains of similar directors) of aligned liquid crystal elastomer ("LCE") or liquid crystal network ("LCN"). Enabled by the large strain inherent to LCEs, the sensitivity of the material chemistry to surface-alignment, and the optical patterning methods, programmable shape change, and actuation in a monolithic element derived from a variety of complex director profiles can be achieved.

As used herein, "elastomer" refers to a polymer having viscoelasticity—that is, being both viscous and elastic. These materials generally have a glass transition temperature less than about 20° C., low Young's modulus, and a high failure strain, compared to other polymer materials.

As used herein, "liquid crystal" or "LC" refers to a state of matter having properties consistent with those of conventional liquids and those of conventional crystals.

As used herein, "mesogen" is a part of a molecule or compound of a liquid crystal that is responsible for the liquid and crystal properties.

As used herein, "macromers" are polymerizable molecules formed from a chain-extension reaction of monomer precursors.

As used herein, "director" refers to an average molecular orientation of the mesogens comprising the liquid crystal.

As used herein, "voxel" refers to a discrete, three-dimensional area within a liquid crystal elastomer having a director.

As used herein, "domain" refers to a plurality of voxels having similar directors.

As used herein, "acrylates" are salts, esters, and conjugate bases of acrylic acid and its derivatives.

As used herein, "methacrylates" are salts, esters, and conjugate bases of methacrylic acid ("MAA"), $CH_3CH_2CCOOH$, and its derivatives.

As used herein, "thiols" are organosulfur compounds: HSRSH, wherein R may include alkyl chains, such as ethyl, propyl, or butyl groups.

As used herein, "vinyls" are ethenyl functional groups: —$C_2H_3$

As used herein, "epoxides" are cyclic ethers having a three-atom ring: $R^1R^2COCR^3R^4$.

As used herein, "amines" are compounds and functional groups comprising a basic nitrogen atom, e.g., having a lone pair of electrons: $RNH_2$, wherein R may be an alkyl chain, for example, an n-butyl group.

As used herein, "diacrylates" are molecules having two acrylate groups.

As used herein, "nematic" refers to a liquid crystal in which the mesogens are oriented in parallel, but not in well-defined planes.

As used herein, a "smectic" refers to a liquid crystal having mesogens oriented in parallel and arranged in well-defined planes.

As used herein, a "chiral phase" refers to a nematic liquid crystal possessing a chiral center between well-defined planes.

As used herein, "defect" refers to a topological pattern of order within a liquid crystal elastomer. Defects may be characterized by strength and charge.

As used herein, "glass transition temperature" or "$T_g$" is the temperature at which glass transition occurs. "Glass transition," as it is used herein, is a reversible transition of a material from a "glassy" state to an elastomeric state.

Figure 2:
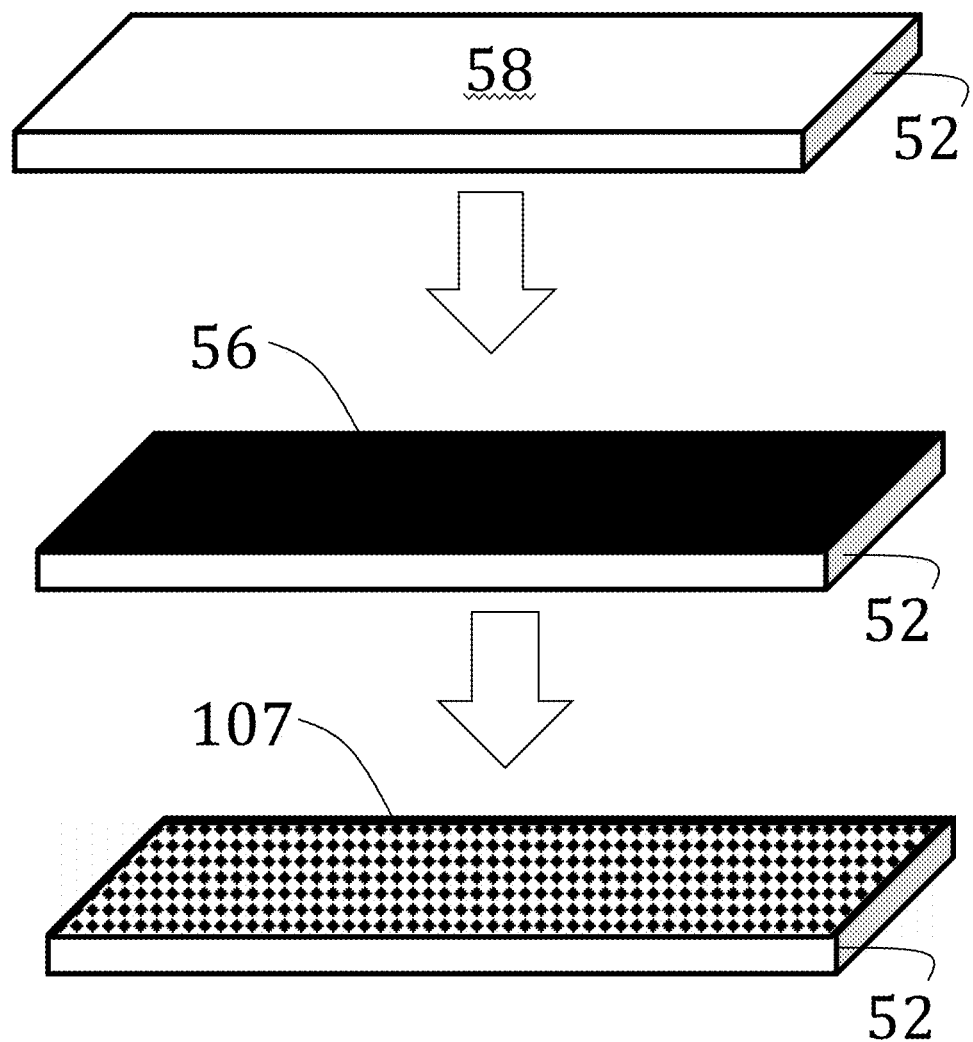
FIG. 2 is a schematic representation of formation of a patterned substrate according to an embodiment of the present invention.

In that regard and with reference now to a method 50 according to an embodiment of the present invention illustrated in FIGS. 1 and 2, a substrate 52 is prepared (Block 54). Preparation of the substrate 52 may include various combinations of cleaning, baking, washing, drying, and so forth, and as would be known by those of ordinary skill in the art. The substrate 52, itself, may comprise glass, poly (ethylene terephthalate), or other inert materials.

An alignment layer 56 may then be applied to a cleaned surface 58 of the substrate 52 (Block 60). The alignment layer 56 generally comprising a chromophore that, when illuminated, behaves as a molecular oscillator until the absorption cross section is minimized with the final orientation being 90° to the electric field vector of the incident light. Said another way, the chromophores of the alignment layer, when exposed to light (such as light emitted from a laser), having particular polarization, amplitude, and phase, may so orient themselves with respect to the surface 58 so as to be orthogonal to the electric field vector of that light. Suitable alignment layer materials may comprise, for example, an azobenzene polymer, a stilbene polymer, a linearly polymerizable polymer, or other suitable photosensitive material know to those of ordinary skill in the art of liquid crystal alignment. Application of the alignment layer 56 may include dispersion (such as from a pipette or other like device) or printing, spinning to ensure uniformity, baking to set the alignment layer 56 and remove residual solvent, and so forth.

Figure 3:
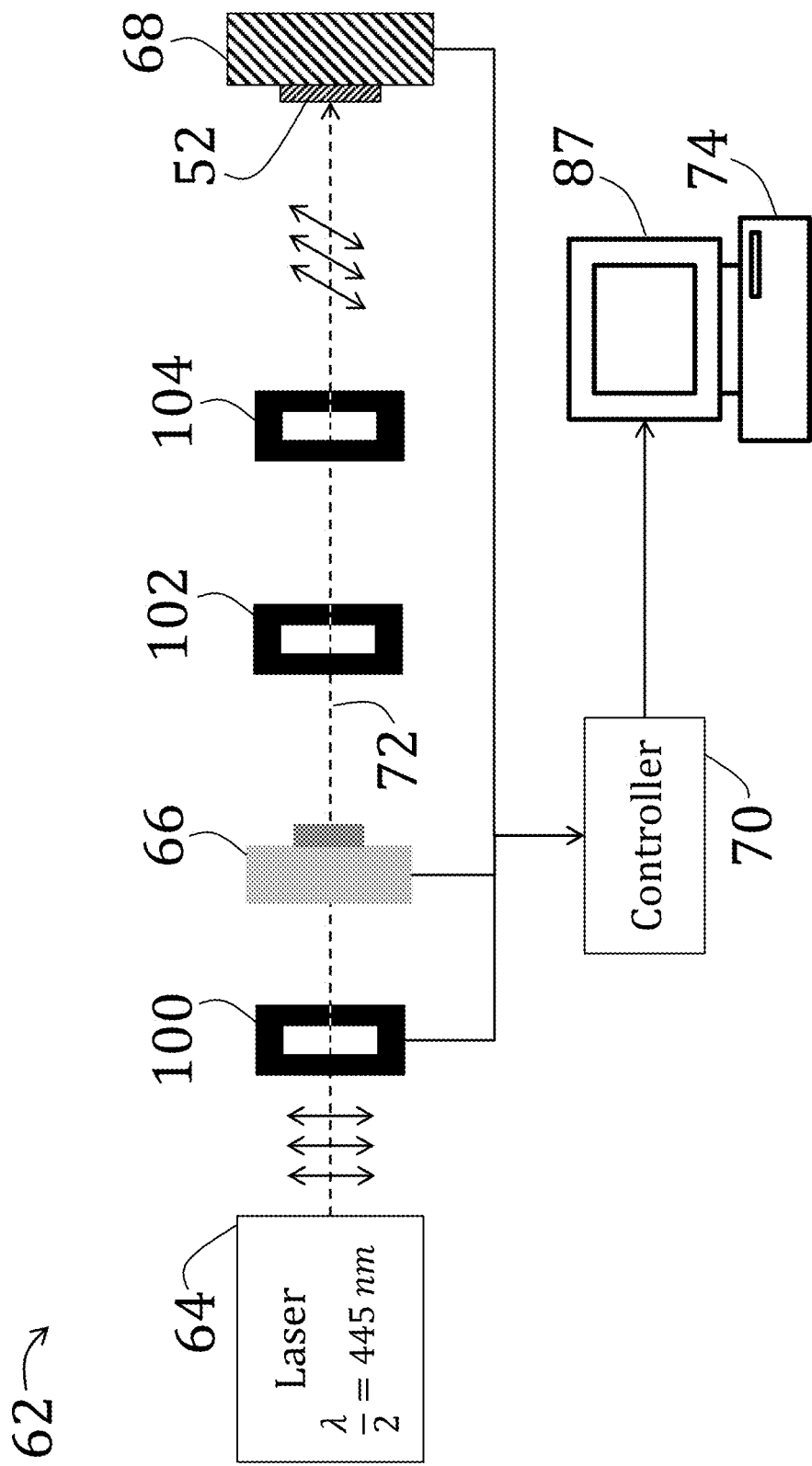
FIG. 3 is a schematic illustration of a system configured to optically pattern the substrate of FIG. 2, in accordance with an embodiment of the present invention.

With the alignment layer 56 applied, the alignment layer 56 may then be optically patterned (continuation of Block 60). An exemplary system 62 for optically patterning the alignment layer 56 according to one exemplary method of the present invention is shown in FIG. 3. Generally, the system 62 includes a laser 64 (for example, a 445 nm laser), a moveable waveplate 66, and a moveable substrate support 68. The moveable waveplate 66 is operably coupled to a controller 70, which is configured to move the waveplate 66 with respect to a directionality of the beam 72, which controls a polarization of the light to be used for patterning the alignment layer 56 (FIG. 2). Although not specifically shown, movement of the waveplate 66 may include one or more motors (such as a rotary motor), which may work in concert with movement of the substrate support 68 to dynamically control irradiation over an area as small as 100 $\mu m^2$. The system 62 is configured to manipulate the local surface-alignment of liquid crystalline cells prepared with the alignment layer 56 (FIG. 2).

Figure 4:
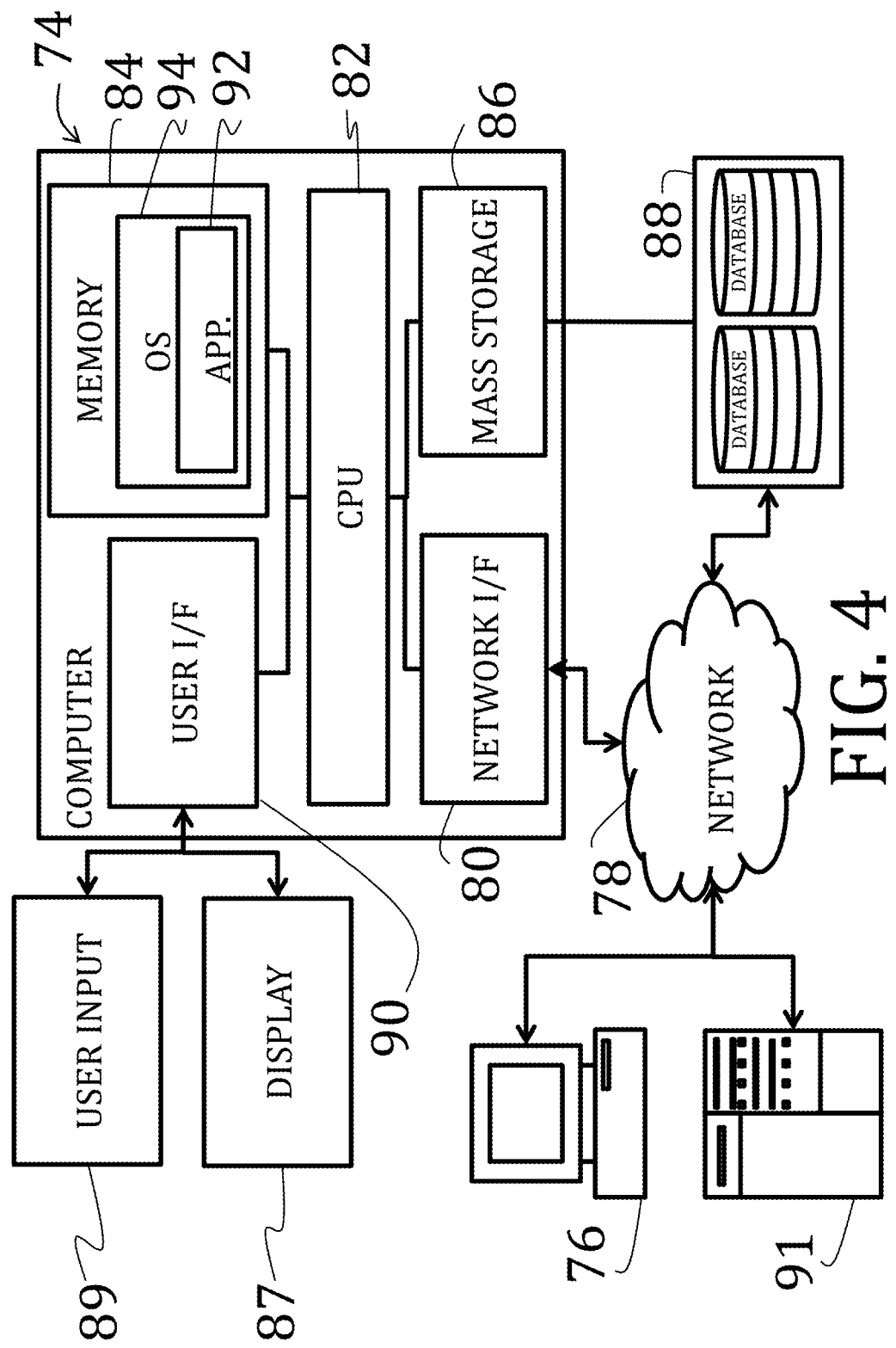
FIG. 4 is a schematic illustration of an exemplary computer configured to operate the systems of FIGS. 3 and 3A.

The controller 70 is operably coupled to a computer 74, which is described in greater detail with respect to FIG. 4, and which may be considered to represent any type of computer, computer system, computing system, server, disk array, or programmable device such as multi-user computers, single-user computers, handheld devices, networked devices, or embedded devices, etc. The computer 74 may be implemented with one or more networked computers 76 using one or more networks 78, e.g., in a cluster or other distributed computing system through a network interface 80 (illustrated as "NETWORK I/F"). The computer 74 will be referred to as "computer" for brevity's sake, although it should be appreciated that the term "computing system" may also include other suitable programmable electronic devices consistent with embodiments of the invention.

The computer 74 typically includes at least one central processing unit 82 (illustrated as "CPU") coupled to a memory 84 along with several different types of peripheral devices, e.g., a mass storage device 86 with one or more databases 88, an input/output interface 90 (illustrated as "I/O I/F" with associated display 87 and user input device 89), and the Network I/F 80. The memory 84 may include dynamic random access memory ("DRAM"), static random access memory ("SRAM"), non-volatile random access memory ("NVRAM"), persistent memory, flash memory, at least one hard disk drive, and/or another digital storage medium. The mass storage device 86 is typically at least one hard disk drive and may be located externally to the computer 74, such as in a separate enclosure or in one or more networked computers 76, one or more networked storage devices (including, for example, a tape or optical drive), and/or one or more other networked devices 91 (including, for example, a server).

The CPU 82 may be, in various embodiments, a single-thread, multi-threaded, multi-core, and/or multi-element processing unit (not shown) as is well known in the art. In alternative embodiments, the computer 74 may include a plurality of processing units that may include single-thread processing units, multi-threaded processing units, multi-core processing units, multi-element processing units, and/or combinations thereof as is well known in the art. Similarly, the memory 84 may include one or more levels of data, instruction, and/or combination caches, with caches serving the individual processing unit or multiple processing units (not shown) as is well known in the art.

The memory 84 of the computer 74 may include one or more applications 92 (illustrated as "APP."), or other software program, which are configured to execute in combination with the Operating System 94 (illustrated as "OS") and automatically perform tasks necessary for operating the transducers and/or reconstructing the images with or without accessing further information or data from the database(s) 88 of the mass storage device 86.

Those skilled in the art will recognize that the environment illustrated in FIG. 4 is not intended to limit the present invention. Indeed, those skilled in the art will recognize that other alternative hardware and/or software environments may be used without departing from the scope of the invention.

Referring again to FIG. 3, the system 62 may further comprise a shutter 100, a collimator 102, and a lens 104. Altogether, the system 62 operates to focus the laser beam 72 onto each point on the alignment layer 56 (FIG. 2) of the substrate 52 having a desired polarization. Linear polarization angles from about 0° to about 180° with respect to the beam propagation direction may be achieved. Exposure dosage is controlled through the shutter and power of the laser. Dose is dependent on the alignment layer, for example, for azobenzene dyes the exposure energy may be 0.1 J/cm$^2$ and higher.

As shown, the system 62 may be configured to provide a focal spot having a maximum dimensions ranging from nanometer scales to meter scales. More particularly, a maximum dimension of about 100 μm may be easily achieved. As such, a 200×200 pixelated square area (comprising 40,000 pixels, 4 cm$^2$), each pixel being 100 μm, and presuming a 10 msec exposure time per pixel, may take approximately 80 min to pattern.

Figure 3A:
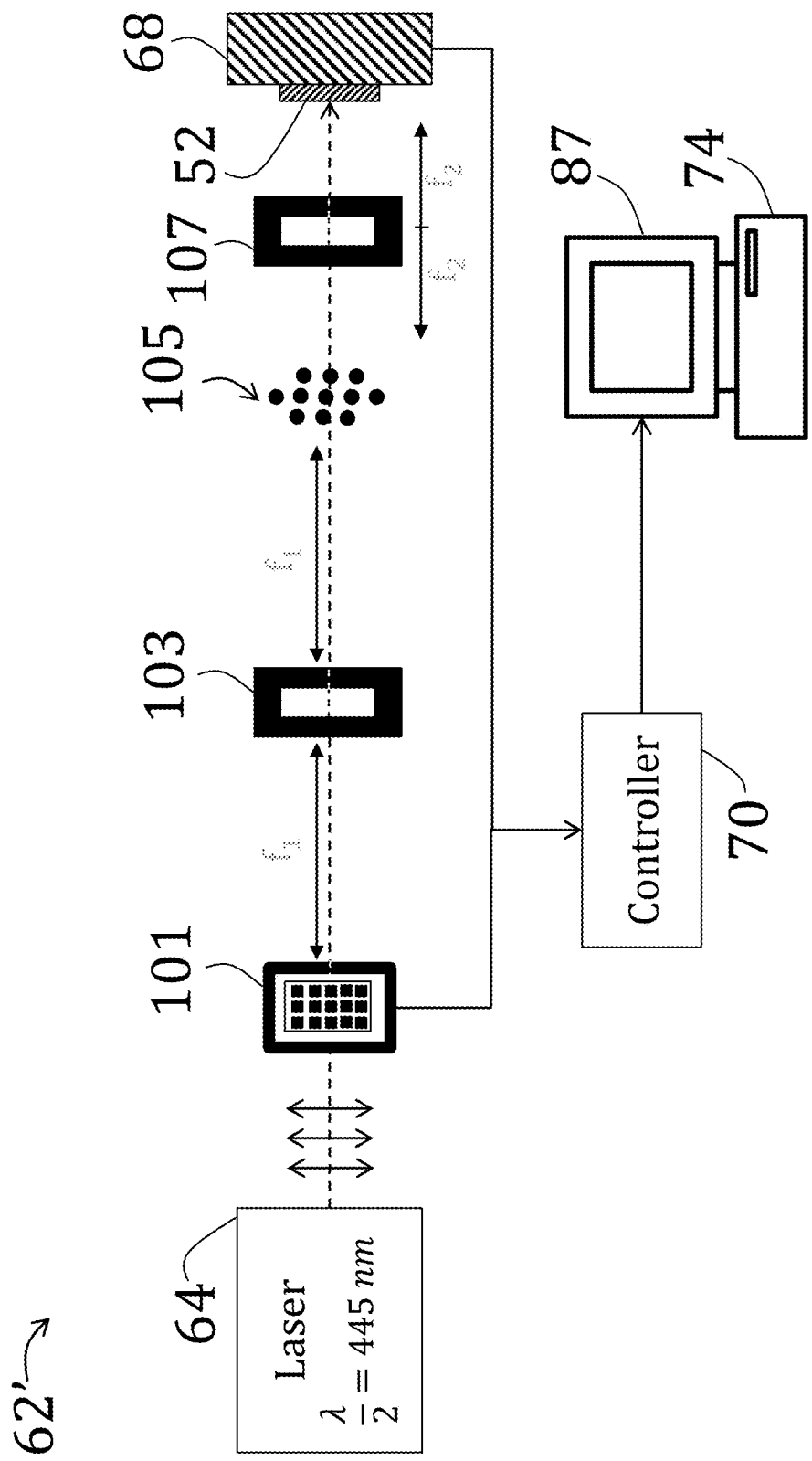
FIG. 3A is a schematic illustration of a system configured to optically pattern the substrate of FIG. 2, in accordance with another embodiment of the present invention.

Alternatively, and as is shown in FIG. 3A, a system 62' is shown and is similar to the system 62 of FIG. 3. In the illustrated system 62', a spatial light modulator 101 replaces the waveplate 66 (FIG. 3). The spatial light modulator 101 imposes a spatial modulation pattern onto light from the laser 64 by altering at least one of amplitude, phase, or polarization of the light. The modulated light may be focused by a first lens 103 to form a Fourier transform at a plane 105. A second lens 107 focuses the Fourier transform at the plane 105 to the image to be patterned. According to an exemplary embodiment, using the spatial light modulation system 62' enables simultaneous writing of 800×600 independent polarizations.

Using the spatial light modulation system 62' of FIG. 3A, it is possible to pattern 10$^6$ pixels, for example, with 15 μm resolution in about 1 second per square centimeter. As such, the spatial light modulation system 62' of FIG. 3A, as compared to the pixel-by-pixel system 62 of FIG. 3, is capable of patterning substrates at a much higher rate.

Referring now again to FIG. 1, if necessary or otherwise desired, alignment of the optically patterned alignment layer 107 (FIG. 2) may optionally be preserved (Block 106). For instance, polymerizing a thin layer of liquid crystal monomer (generally, several hundred nanometers thick, such as ranging from 300 nm to 500 nm) atop the patterned alignment layer 107 (FIG. 2) may be used.

Figure 5:
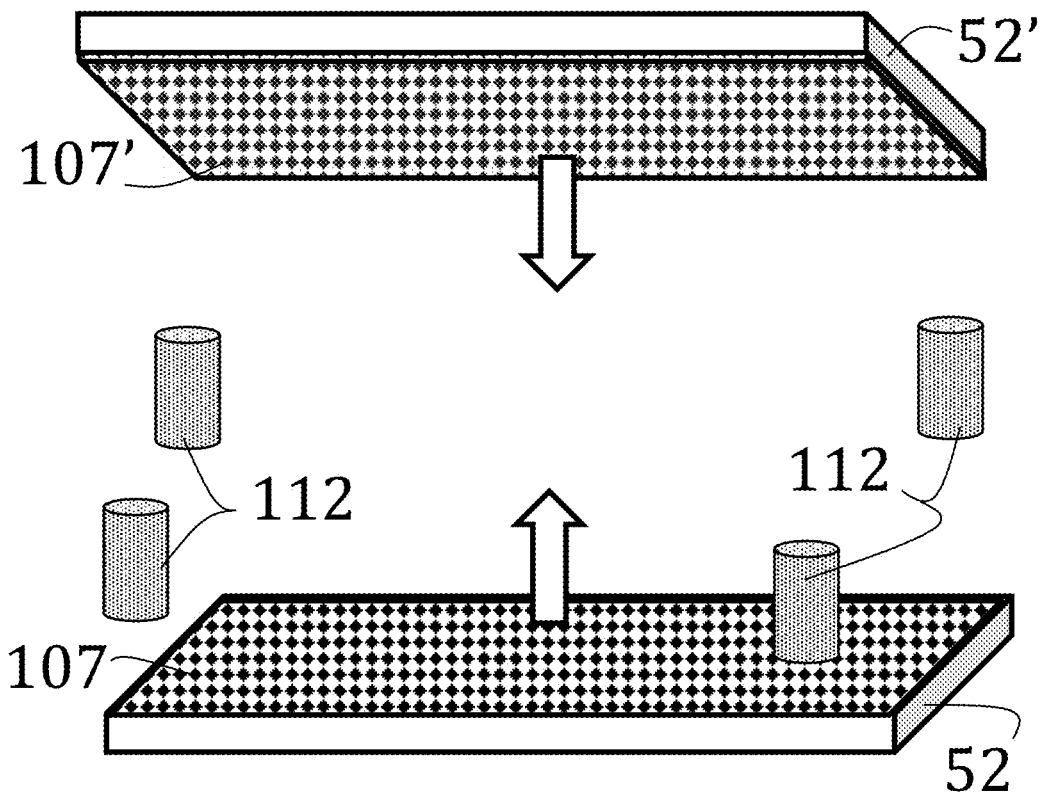
FIGS. 5 and 6 are schematic representations of patterned substrates, exploded and side elevation views, respectively, forming a liquid crystal cell according to an embodiment of the present invention.
Figure 6:
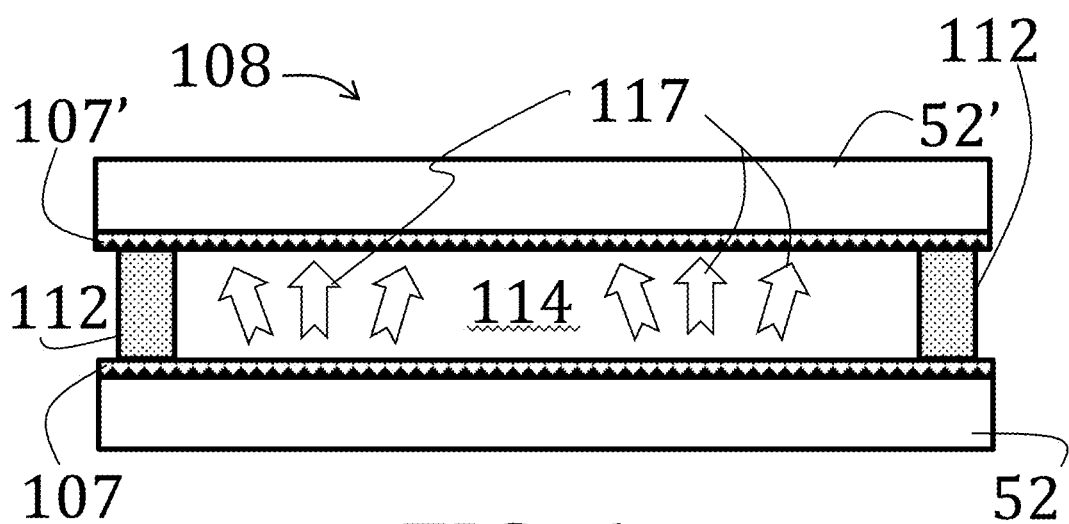

Turning now to FIGS. 5 and 6, with continued reference to FIG. 1, a liquid crystal cell 108 may then be constructed (Block 110). In that regard, prepared substrates 52, 52' may be arranged such that the patterned alignment layers 107, 107' of each are facing inwardly, separated with spacers 112, and at least partially secured and/or sealed so as to form a cavity 114 there between. Additionally, or alternatively, spacers (not shown), such as micro-sized glass spheres, may be mixed into an adhesive (for example, an epoxy) such that the layers 107, 107' may be simultaneously spaced and secured and/or sealed. Size of the spacers 112 or micro-sized glass spheres may determine the final thickness of a resultant LC film and may range generally from tens of microns to hundreds of microns, or more particularly, for example, spacers 112 having a maximum dimension of 50 μm may be used.

The cavity 114 may then be filled with a nematic mixture of liquid crystal monomers configured to cross-link and to reversibly shape change according to a complex programming using surface alignment, (Block 112). Exemplary monomer includes acrylates, methacrylates, thiols, vinyls, epoxides, amines, and others. Furthermore, monomer solutions that undergo sequential reactions may be utilized, for example, mixtures of diacrylates, amines, alkenes, and thiols.

Figure 7A:
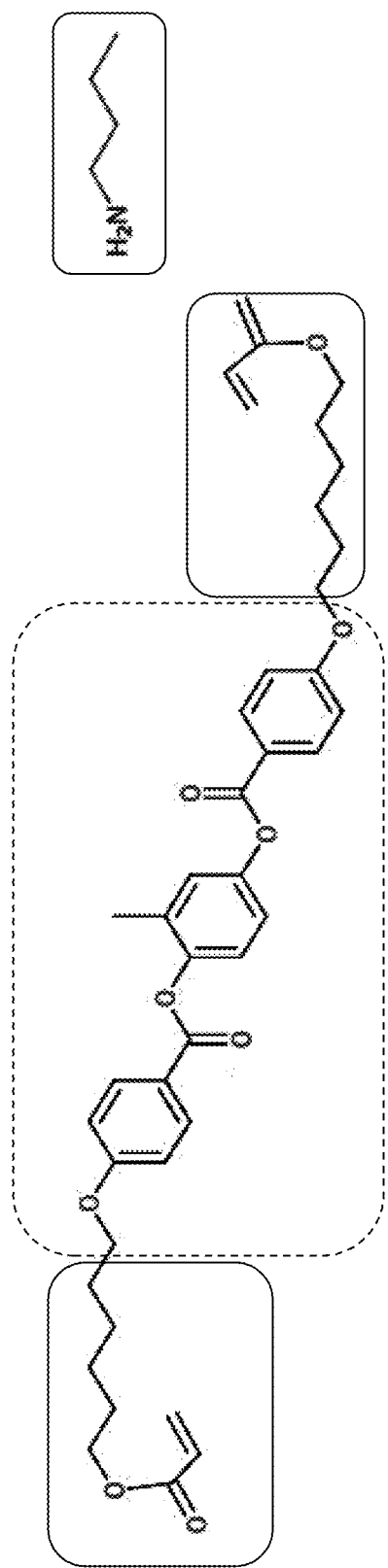
FIGS. 7A-10 are representative chemical structures suitable for preparing liquid crystal elastomers according to embodiments of the present invention.
Figure 7B:
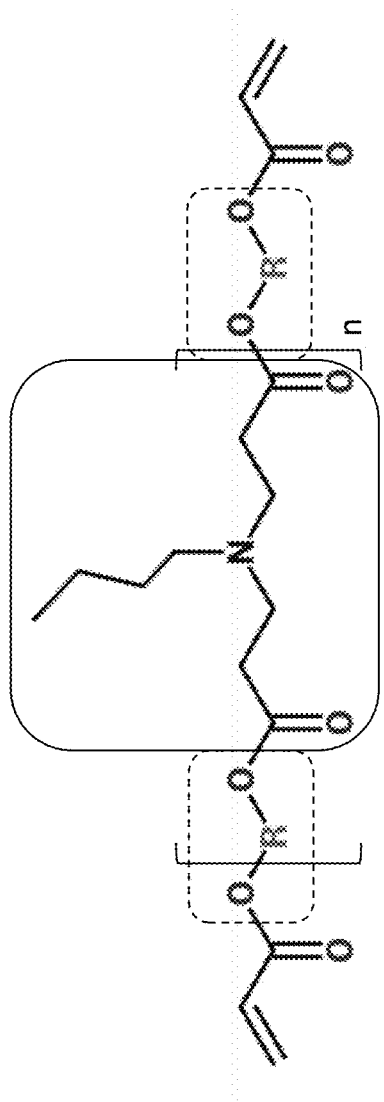
Figure 7C:
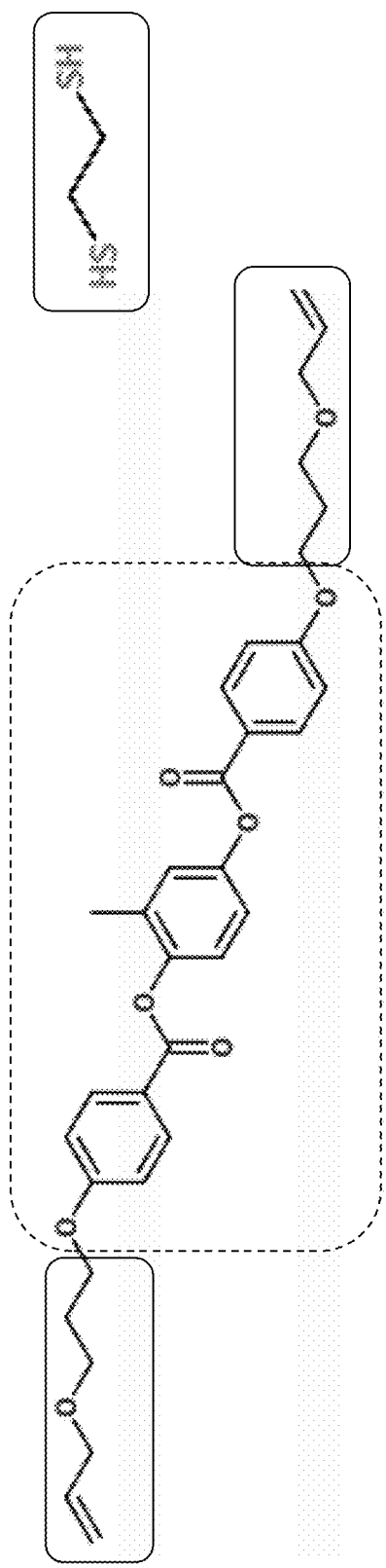
Figure 7D:
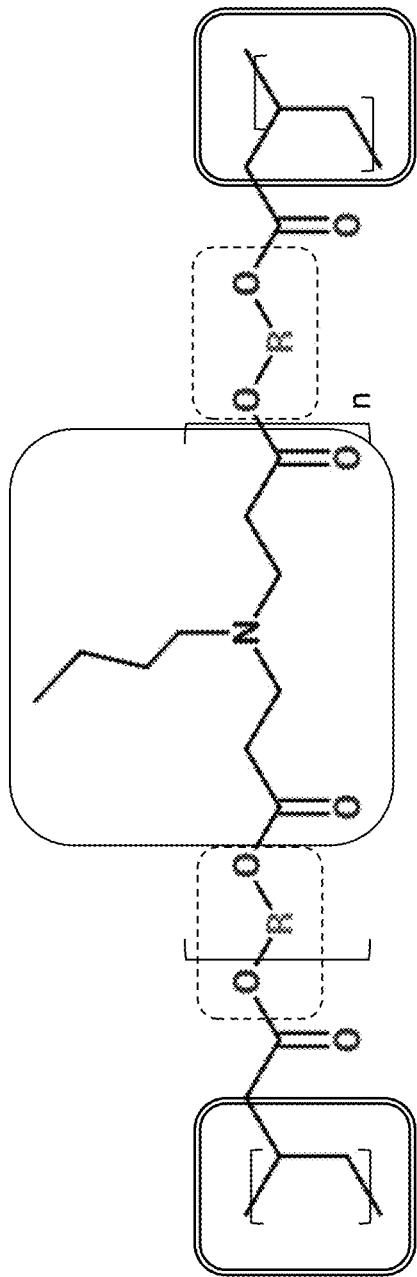
Figure 7E:
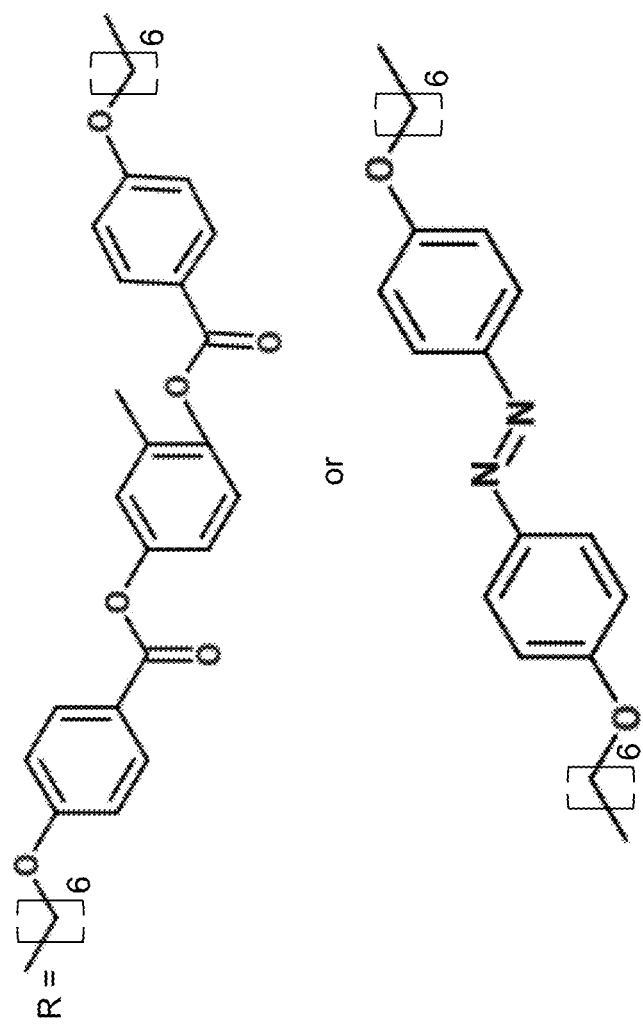

More particularly, and with reference to FIGS. 7A-7E, components and mechanisms for coupling a macromolecular order to an elastic network are shown according to various embodiments of the present invention are shown. To strengthen response of the LCE, the mesogen of the liquid crystal is placed directly in a main chain of the elastomer. In FIGS. 7A-7D, the illustrative elastomers comprise the mesogen (enclosed with a solid outline), the chain extender (enclosed with a dashed outline), and, in some instances (as in FIG. 7D), cross-linkages (enclosed with a double outline). FIG. 7E illustrates exemplary repeat mesogen groups ("R"), in which the mesogens are within the main-chain of the polymeric material. One of two strategies may be employed to yield main-chain nematic networks: (1) the radical polymerization of nematic diacrylates leading to densely cross-linked networks and (2) hydrosilation of divinyl mesogens to reactive silane-containing oligomers leading to lightly cross-linked networks. In some instances, such as acrylates, an intermediate step may be included, which is described in greater detail below.

In accordance with an embodiment, nematic diacrylates may be chain extended through "Michael Addition," a nucleophilic addition of a carbanion to an unsaturated carbonyl compound. The resulting macromer may then be cross-linked through radical polymerization. By varying a ratio of amine-to-diacrylate, a molecular weight of the macromer is controlled. More particularly, by limiting the ratio to be greater than 1:1, each macromer retains at least two acrylate functionalities. According to other embodiments, a radical photoinitiator may be incorporated into formation of the macromer, which permits subsequent cross-linking to yield the polymer network. The resulting polymer network is insoluble in a variety of organic solvents, has a $T_g$ depending on a concentration of amine in the monomer mixture, and behaviorally depends strongly on the phase present during polymerization.

Figure 8A:
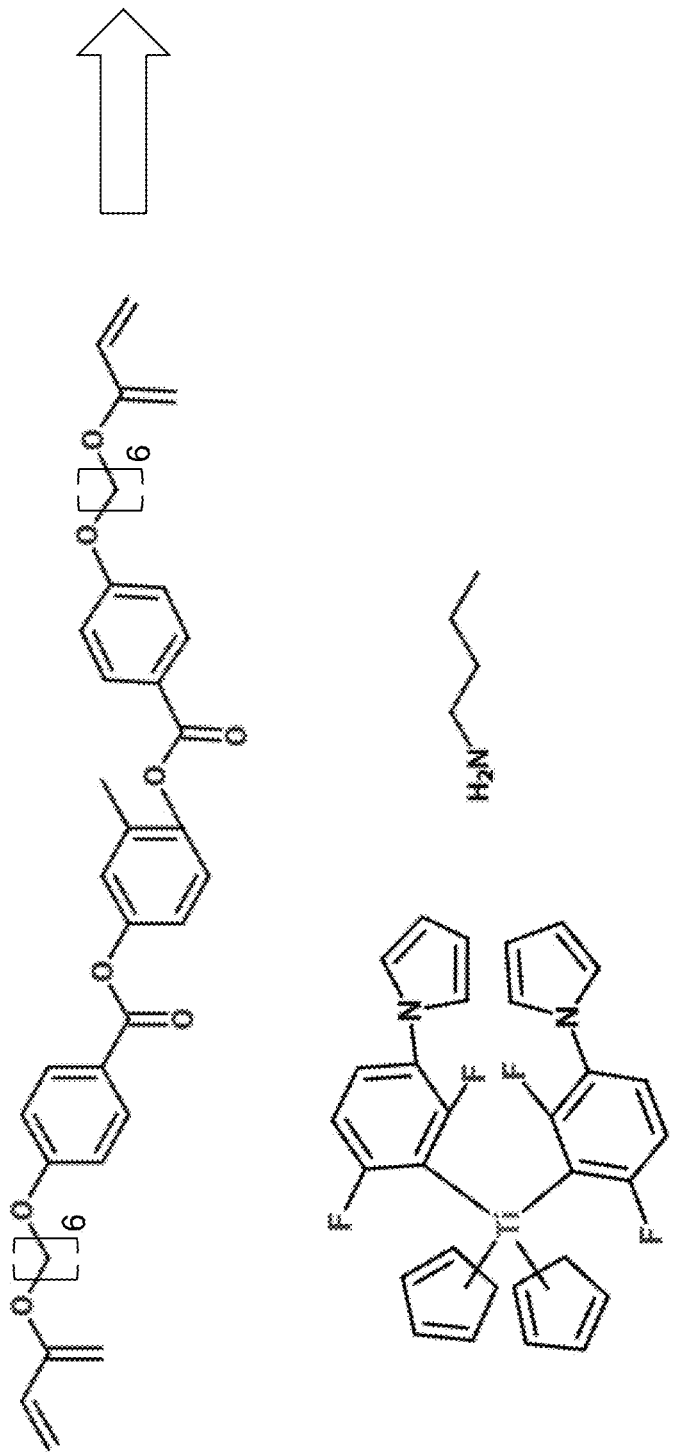
Figure 8B:
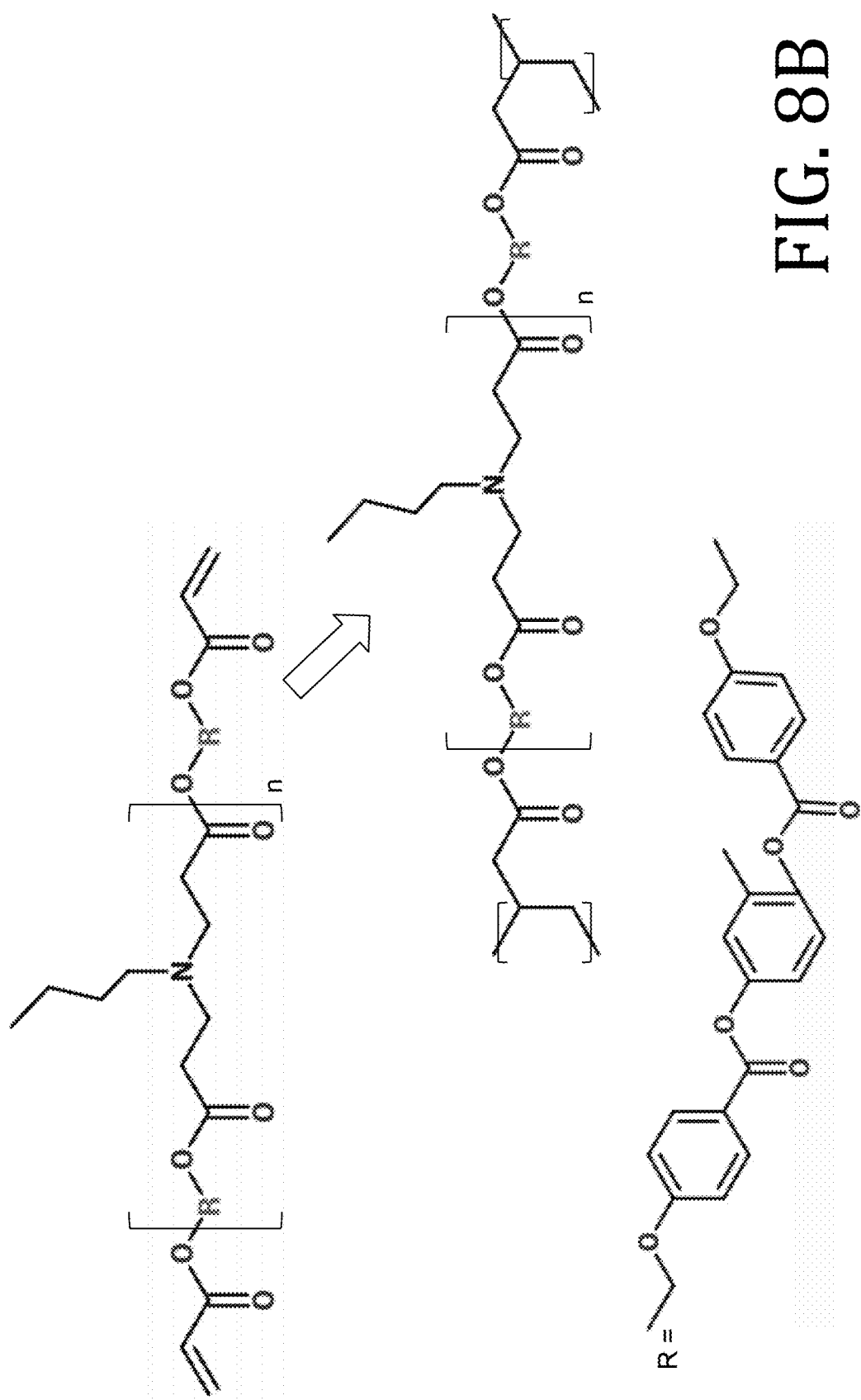

FIGS. 8A and 8B specifically illustrate such a polymerization mechanism, according to one embodiment of the present invention. As shown in FIG. 8A, the diacrylate (here the commercially-available 1,4-bis-[4-(6-acryloxyloxy-hexyloxy)benzoyloxy]-2-methylbenzene, which may be referred herein as "RM82") and, n-butyl amine (the chain extender), and Irgacure 784 (one example of the optional photoinitiator by BASF, Florham Park, N.J.) are mixed, poured into the cavity 114 (FIG. 6), and the liquid crystals are polymerized by Michael Addition to form nematic macromers. Then, as shown in FIG. 8B, the nematic macromers are photopolymerized to form cross-linked, LCEs, which traps monomer alignment provided by the alignment layers 107, 107' into a low modulus and elastic solid (Block 116 of FIG. 1).

Figure 9A:
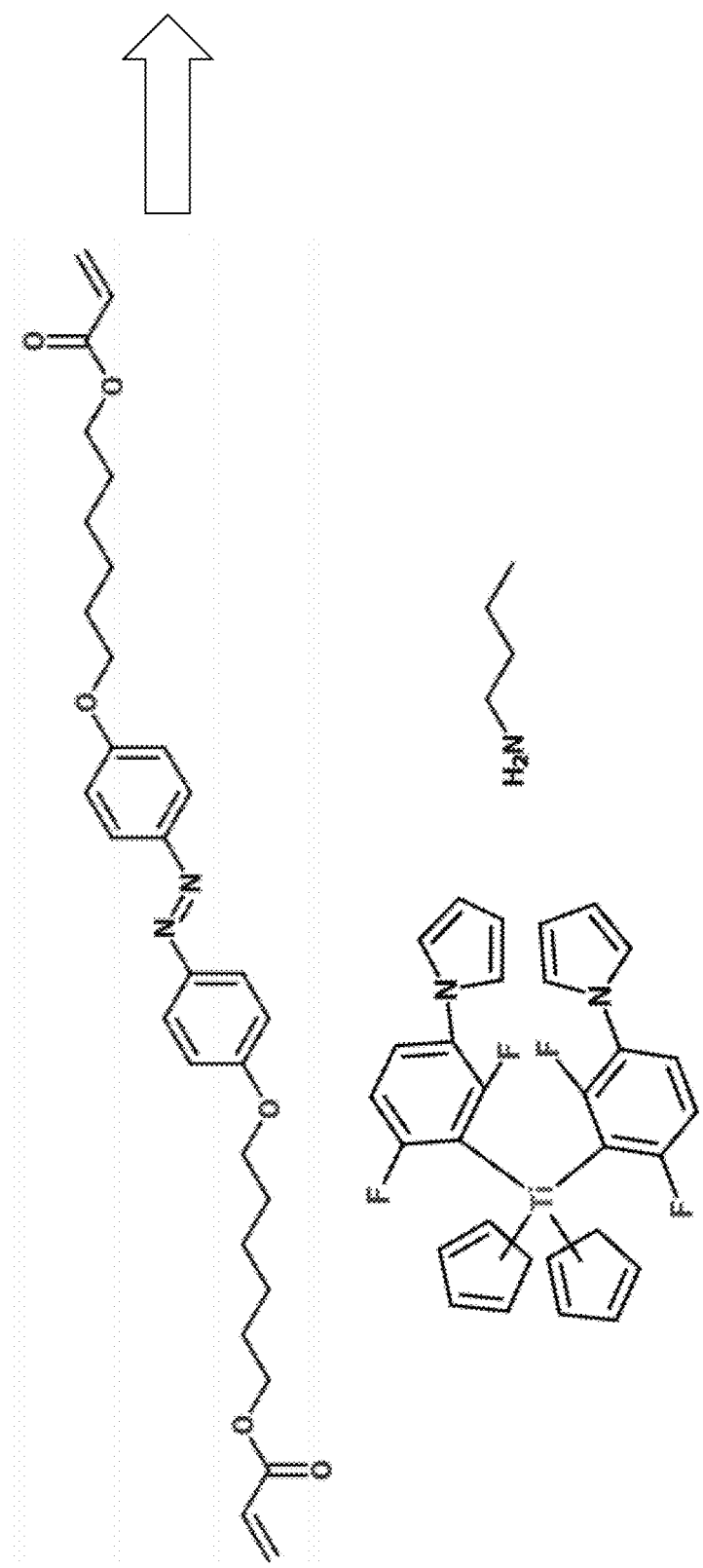
Figure 9B:
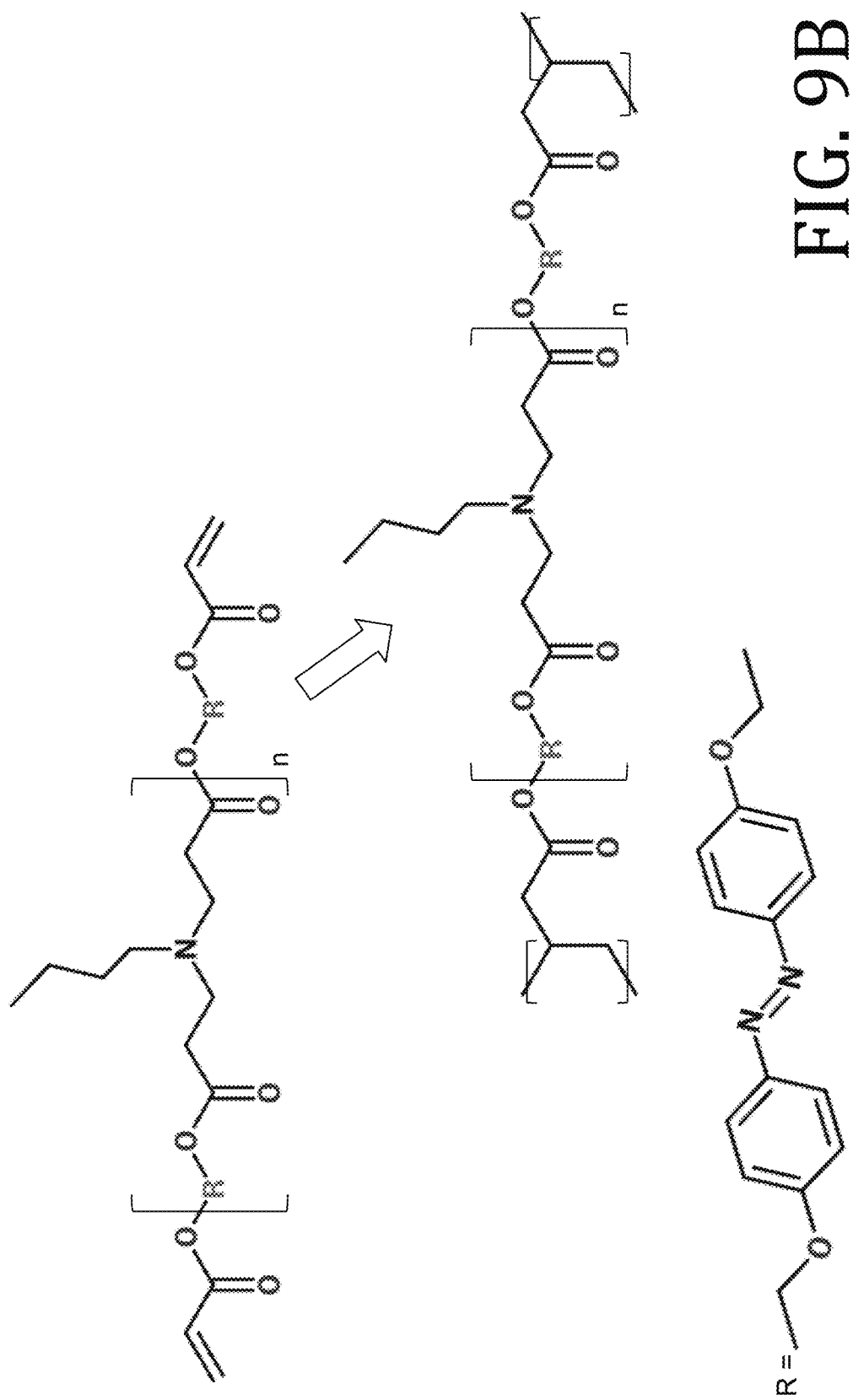

FIGS. 9A and 9B illustrate a polymerization mechanism according to another embodiment of the present invention. As shown in FIG. 9A, the diacrylate functionalized azobenzene, n-butyl amine (the chain extender), and Irgacure 784 (the photoinitiator) are mixed, poured into the cavity 114 (FIG. 6), and the liquid crystals are polymerized and cross-linked as described previously.

Figure 10:
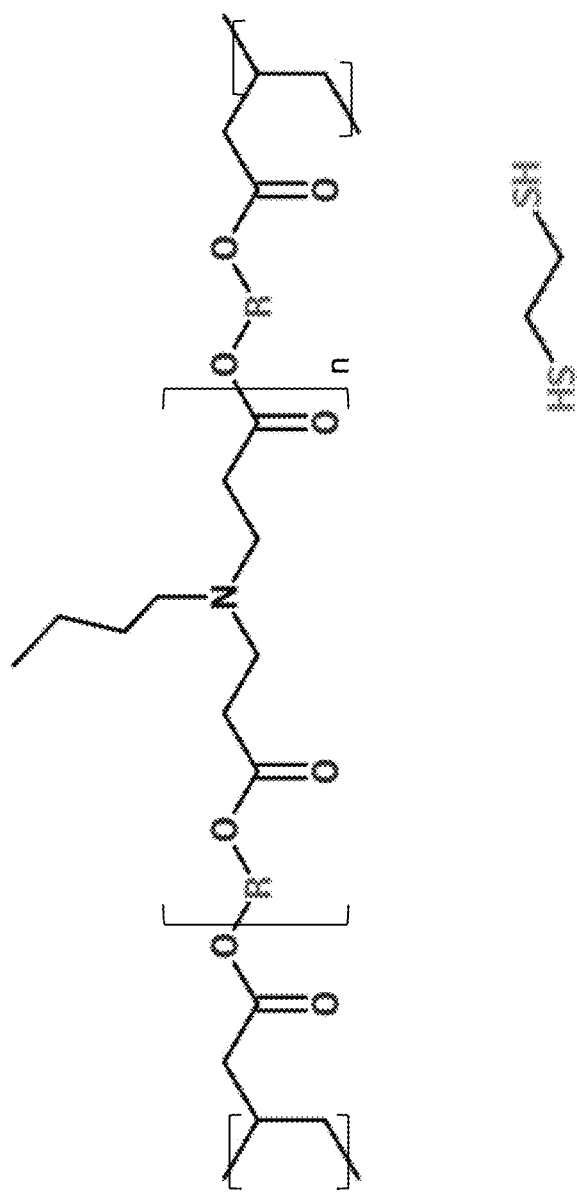

According to another embodiment of the present invention, as illustrated in FIGS. 10A and 10B, alkenes (such as 2-methyl-1,4-phenylene bis(4-3-(allyloxy)propoxy)benzoate, which may be referred herein as "RM2AE") and a thiol (illustrated as EDT) are chain extended through radical reaction. The material may be concurrently cross-linked, such as by a radical reaction with 1,4-bis[4-(6-acryloxyloxy-hexyloxy)benzoyloxy]-2-methylbenzene.

In those embodiments in which radical polymerization is used, exposure to UV or visible light cause activation of the free-radical initiator. Alternatively, other mechanisms, such as thermal initiation, may be used to cause radical polymerization. Other polymerization mechanisms, such as thermal step-growth mechanisms, may alternatively be used.

A director (represented as arrows 117) of the liquid crystal aligns to the local surface orientation of the alignment layer 56, which is translated through the liquid crystal thickness within the cavity 114. Thus, as liquid crystalline monomers the cavity 114, the monomers interact with the alignment layer 56 and form so-called voxels.

Figure 11:
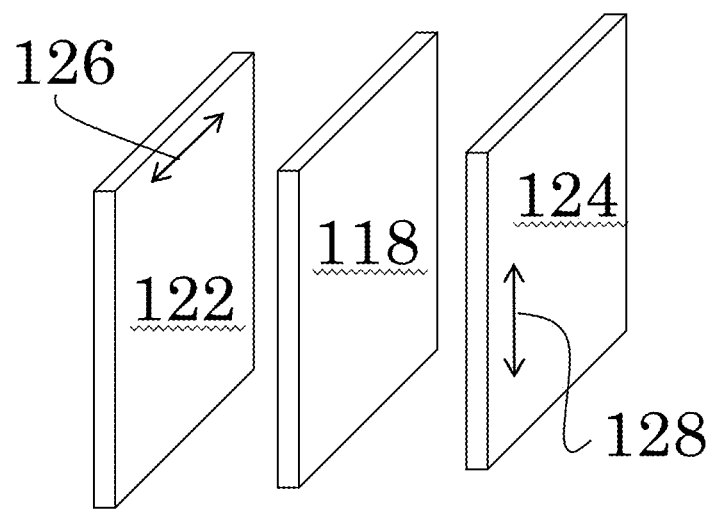
FIG. 11 is a schematic representation of a liquid crystal, prepared in accordance with embodiment herein, positioned between crossed polarizers.
Figure 12A:
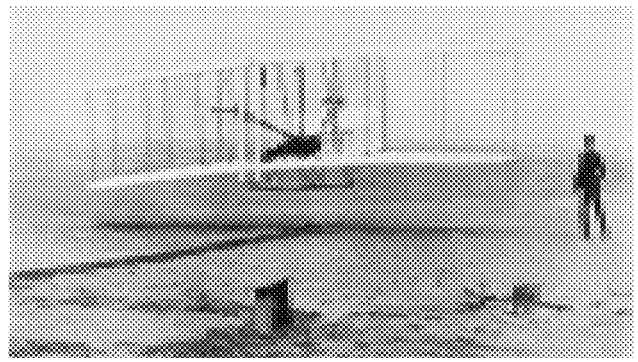
FIG. 12A is a black and white photograph of the Wright brothers flight.
Figure 12B:
FIG. 12B is an image acquired from a liquid crystal, patterned according to embodiments provided herein and corresponding to the Wright brothers flight photograph of FIG. 12A.

Turning now to FIG. 11, after polymerization, a resultant LCE 118 is removed from the liquid crystal cell 108 (FIG. 67) (Block 120) and a grayscale pattern may be visualized between crossed polarizers 122, 124. For example, the LCE 118 may be arranged between crossed polarizers 122, 124 (direction of polarization shown by arrows 126, 128, respectively) to visualize 226 distinct director orientations patterned into 21,350 voxels, each 100 μm×100 μm in area and 0.0005 mm³ in volume. FIG. 12A is an exemplary photograph that is reproduced in FIG. 12B as an LCE 118 and in accordance with an embodiment of the present invention. In FIG. 12B, the grayscale pixel values of the image are converted to the orientation angle of the surface-alignment pixels and range from 0° for dark pixels to 45° for bright pixels (noting that each pictorial pixel corresponds roughly to each voxel). A resolution of such pixels, or of the voxels, using the patterning methods described herein may be diffraction limited and scalable across length scales (such as ranging from nanometer scales to meter scales).

According to some embodiments of the present invention, the alignment layer 56 may additionally or alternatively be patterned so as to prepare complex topologically-imprinted monoliths configured to form three-dimensional shapes. For instance, and with reference now to FIGS. 13A and 13B, the LCE 129 includes one or more topological defects, such as points of Gaussian Curvature, may be introduced. It would be readily appreciated by those of ordinary skill in the art that any number of defects and, in fact, the curvature of the defect, may vary. In the particular, illustrative embodiment of FIG. 13A, nine, +1 defects with 130$_a$, 130$_b$, 130$_c$, 130$_d$, 130$_e$, 130$_f$, 130$_g$, 130$_h$, 130$_i$ are created, whereby the director orientation surrounding each +1 defect center varies azimuthally by 360° (one defect 130$_a$ is illustrated in FIG. 13B). It should be noted that the LCE 129 is monolithic and continuous in composition.

Figure 13A:
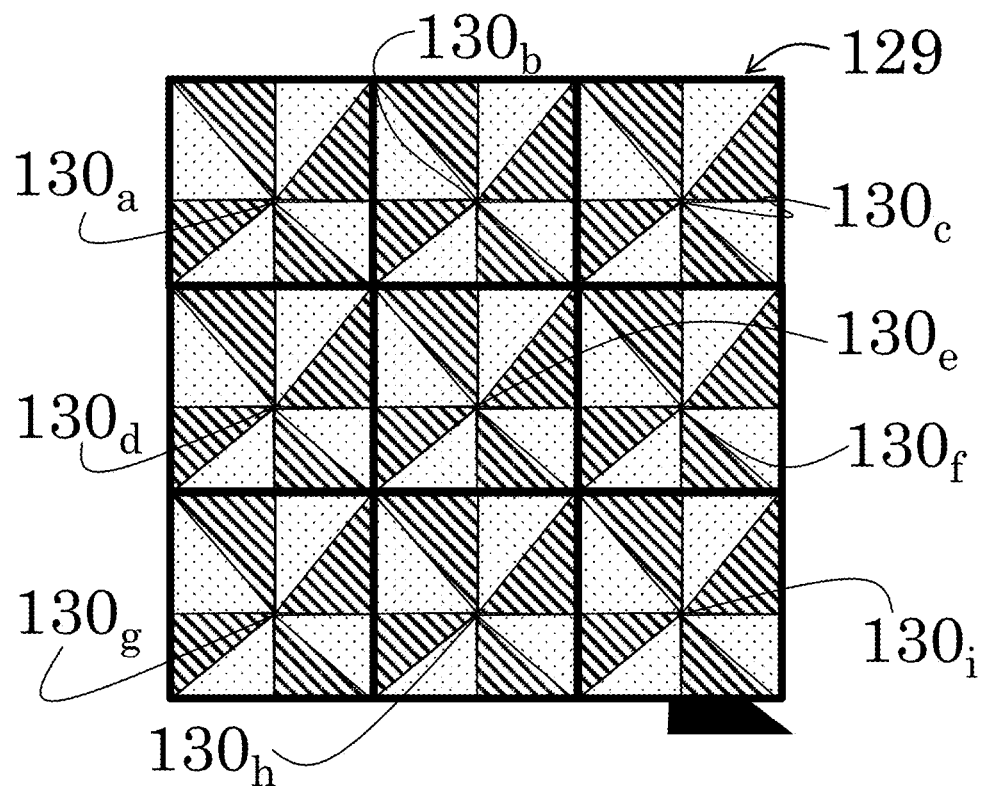
FIG. 13A is a schematic representation of an LCE pattern having a plurality of Gaussian Curvature topological defects.
Figure 13B:
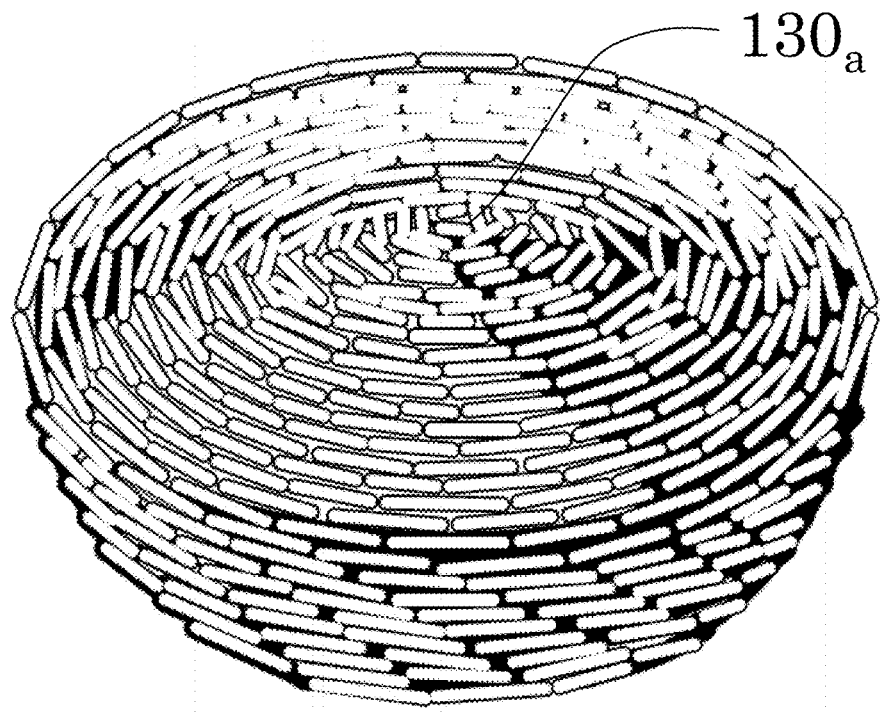
FIG. 13B is an enlarged, perspective view of one of the Gaussian Curvature topological defects of FIG. 13A.
Figure 14:
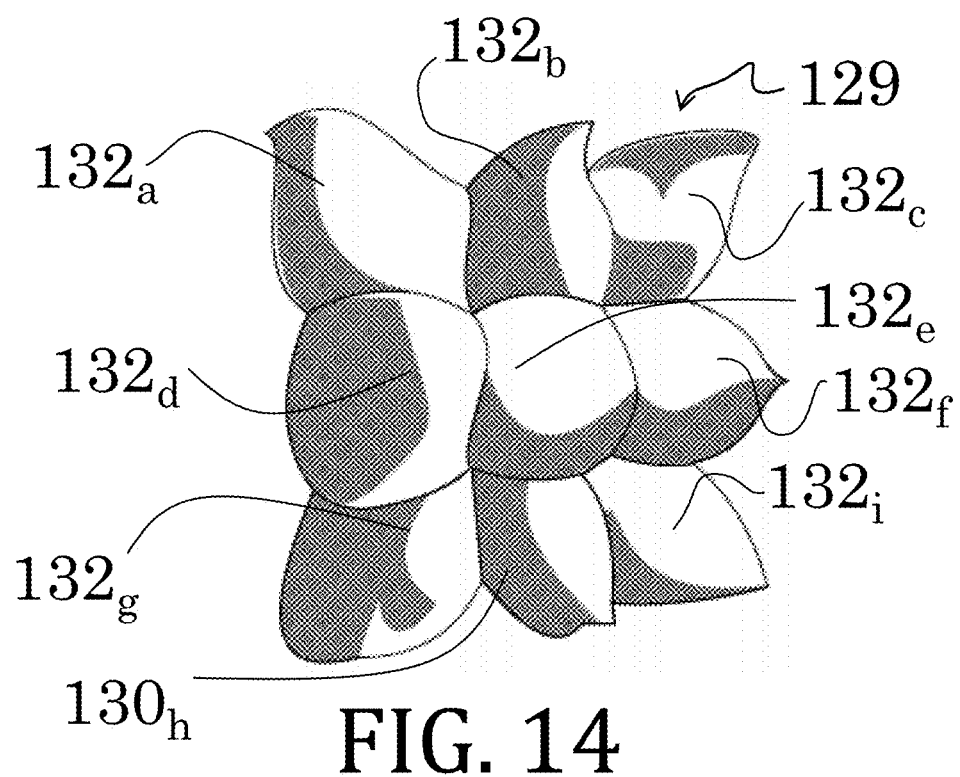
FIG. 14 is a top view of an exemplary LCE imaged with the pattern of FIG. 13A and activated with heating.

Macroscopic, azimuthal contraction and radial expansion around each defect 130$_a$, 130$_b$, 130$_c$, 130$_d$, 130$_e$, 130$_f$, 130$_g$, 130$_h$, 130$_i$ of FIG. 13A leads to an emergence of nine, respective cones 132$_a$, 132$_b$, 132$_c$, 132$_d$, 132$_e$, 132$_f$, 132$_g$, 132$_h$, 132$_i$, shown in FIG. 14 by heating (for example, to 175°). The height of each cone 132$_a$, 132$_b$, 132$_c$, 132$_d$, 132$_e$, 132$_f$, 132$_g$, 132$_h$, 132$_i$ is more than 100 times the initial LCE thickness (although not shown, the initial LCE is approximately square and flat) of about 50 μm.

Figure 15:
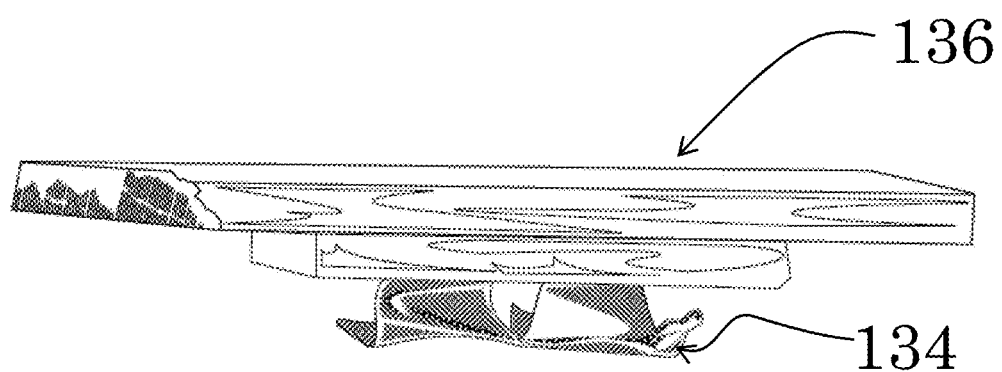
FIG. 15 is a side elevational view of an exemplary LCE according to another embodiment of the present invention and prepared with four, +1 defects and configured to lift a load.
Figure 16:
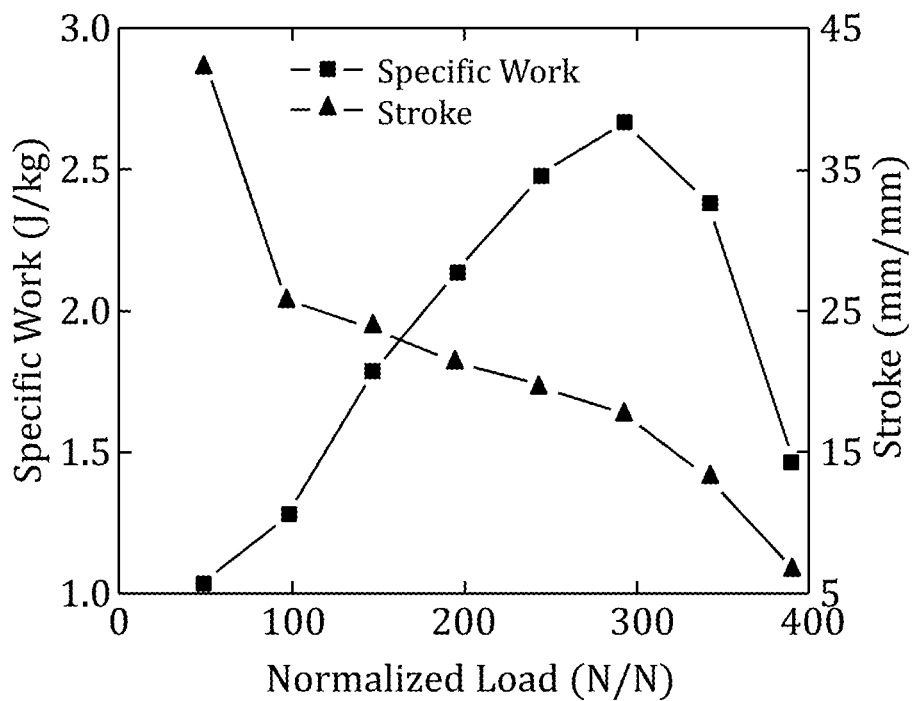
FIG. 16 is a graphical representation of work accomplished by the exemplary LCE of FIG. 15.

According to yet other embodiments of the present invention, as illustrated in FIG. 15, an LCE 134 configured to do work is shown. For instance, the LCE 134 of FIG. 15 was prepared in accordance with embodiments herein and having four, +1 defects in the manner provided above with respect to FIG. 13A. The LCE 134 is illustrated lifting a load 136 that is about 147 times heavier than a weight of the LCE 134. FIG. 16 is a graphical representation of work accomplish by the LCE 134 and demonstrates a stroke of about 3000% and a specific work capacity of about 2.6 J/kg by heating (for example, to 175°). While not wishing to be bound by theory, it is believed that the specific work capacity may be attributed to a high energetic cost of preventing emergence of Gaussian curvature at a center of each defect, which may be equivalent to introducing a stretch in a flat film.

Figure 17A:
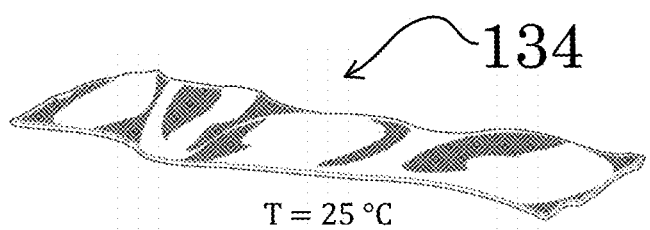
FIGS. 17A-17D are side elevational views of an exemplary LCE according to another embodiment of the present invention and prepared with defects configured to spontaneously select upwardly- or downwardly-directed orientations with an applied mechanical stress.
Figure 17B:
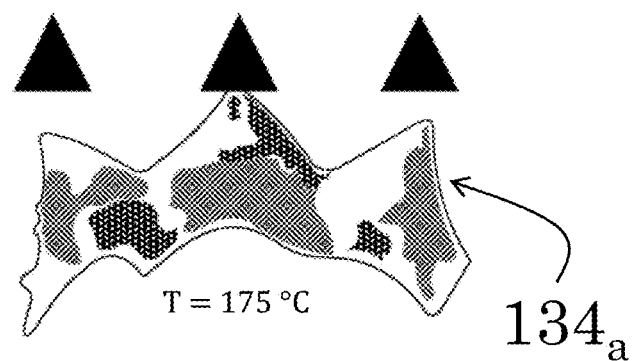
Figure 17C:
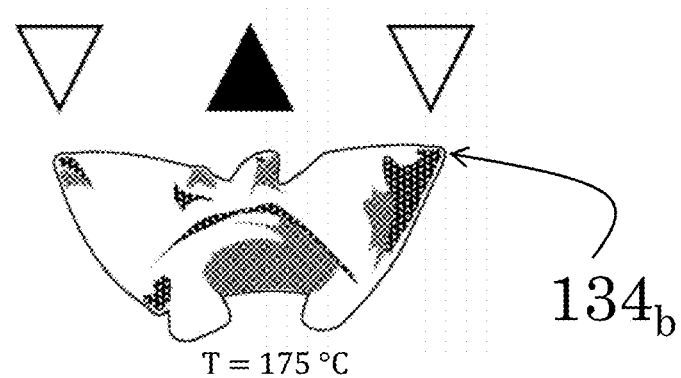
Figure 17D:
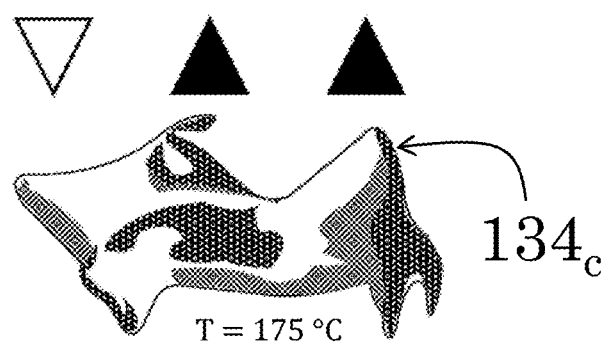

Another exemplary LCE embodiment 138 is illustrated in FIGS. 17A-17D and includes defects configured to spontaneously select an upwardly- or downwardly-directed orientation. The LCE 138 is patterned with three defects and is shown at room temperature in FIG. 17A (temperature being about 25° C.). Assuming each defect will acquire one of two states (here, upwardly- or downwardly-directed orientations) with heat, then a total number of LCE configurations is 2³ (here, a total of 8 configurations, of which three configurations 134$_a$, 134$_b$, 134$_c$ are shown). A first state may be selected or more probable than a second state by applying an amount of mechanical stress to the particular defect in the direction of the selected state. Results of such selection is illustrated in FIGS. 17B-17D, wherein a darkly-shaded, upwardly-directed arrow indicates an upwardly-directed orientation of the applied mechanical stress while a lightly-shaded, downwardly-directed arrow indicates a downwardly-directed orientation of the applied mechanical stress. In each of FIGS. 17B-17D, heat was also applied (temperature being about 175° C.) while applying the mechanical stress.

Figure 18:
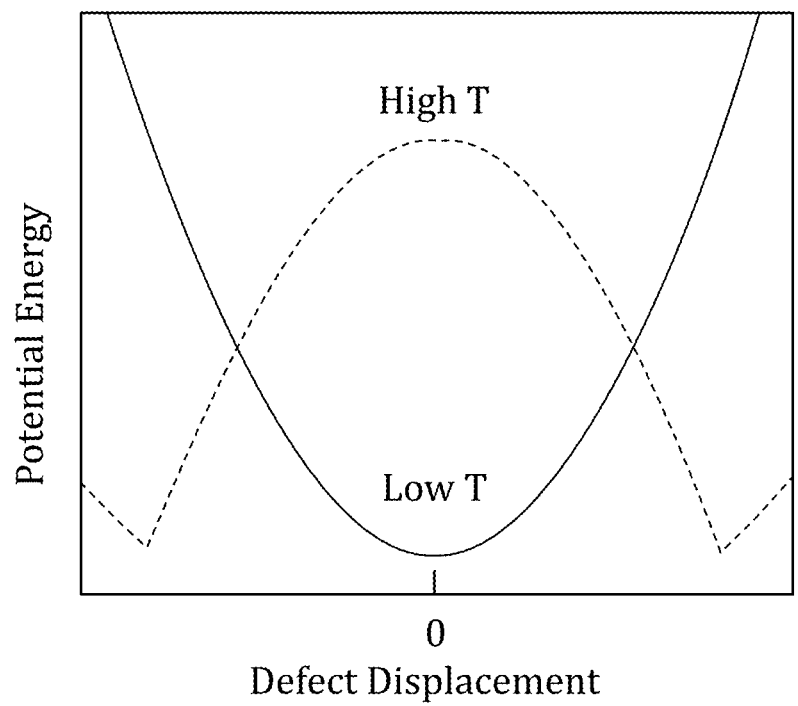
FIG. 18 is a graphical representation of defect displacement of the exemplary LCE of FIGS. 17A-17D.

FIG. 18 is a graphical representation of potential energy associated with cone displacement. In absence of a supercritical mechanical stress, temperature cycling does not alter orientation of a particular defect once the defect is programmed. Accordingly, the LCE 134 (FIG. 17A) may reversibly form the selected state during repeated thermal cycling. Again, while not wishing to be bound by theory, it is believed that this repeating of the selected state with thermal cycling may be due to a small, irreversible strain, which may be observed when the stimulus is removed (See FIG. 17A).

With reference now to FIGS. 19A-19D, an exemplary LCE 140 according to still another embodiment of the present invention is shown. The LCE 140, without stimulus, in shown in FIG. 19A. In FIGS. 19B-19D, solvent, the stimulus, is applied to each LCE 140$_a$, 140$_b$, 140 including, respectively, acetone, tetrahydrofuran, and chloroform. Again, while not wishing to be bound by theory, it is believed that differences of solvent lead to reduction of order in the LCE 140, which trigger complex, reversible shape changes.

Figure 20:
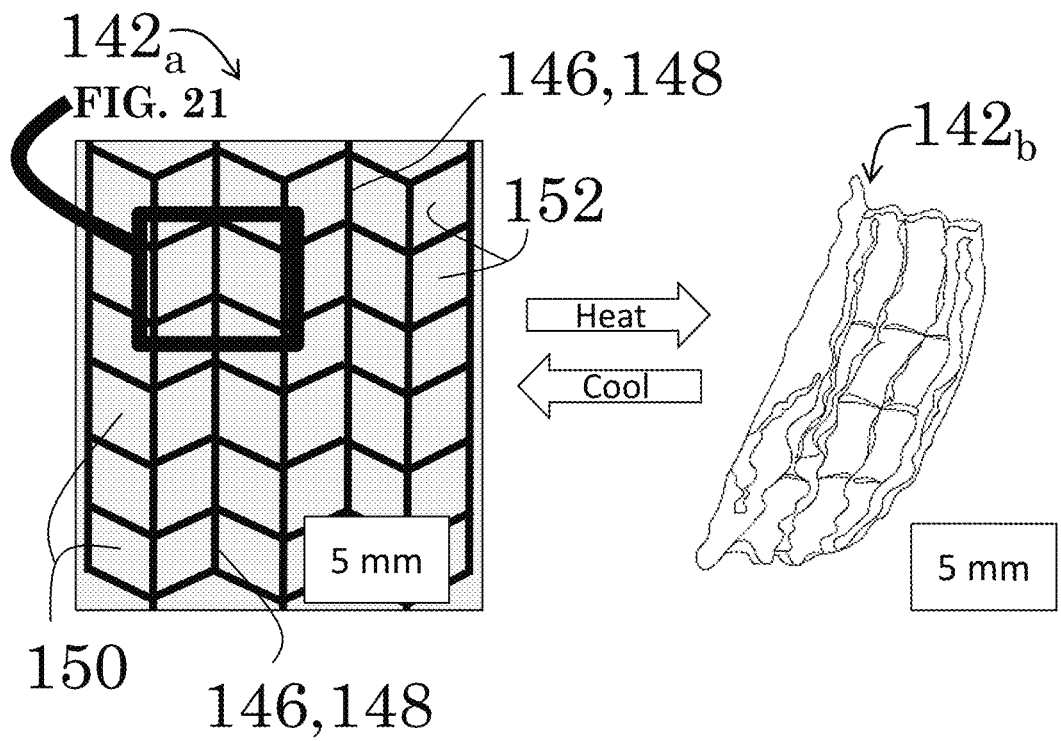
FIG. 20 is a schematic representation of an exemplary LCE patterned with origami-style topology and responsive to a thermal stimulus.
Figure 21:
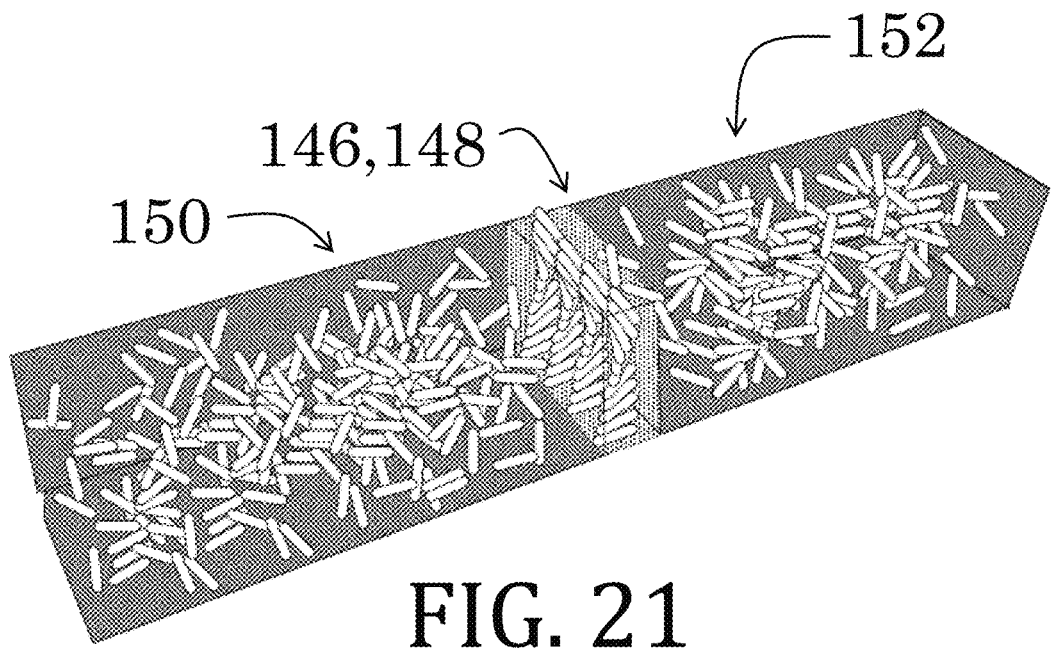
FIG. 21 is an enlarged view of an enclosed area 21 of FIG. 20.

Referring now to FIG. 20, an exemplary LCE 142$_a$ according to another embodiment of the present invention is shown. The LCE 142$_a$ is prepared using a non-uniform director profile such that an origami-inspired topology is written. Mountain and valley folds 146 are prepared by writing a twisted nematic region 148 (FIG. 21), wherein monomers are in a twisted alignment, bound by first and second unordered regions 150, 152, wherein monomers are randomly directed. In other words, the pattern includes faceted regions 150, 152 having no preferential actuation direction bound by twisted nematic regions 148 (so-called "hinges").

When a stimulus is applied (here, the stimulus being heat), the LCE 142$_b$ is reversibly bent, out-of-plane and flattened. It is believed that the bending is caused by a gradient in strain through the material thickness, which is analogous to a bimetallic strip used in conventional thermostats.

Figure 22A:
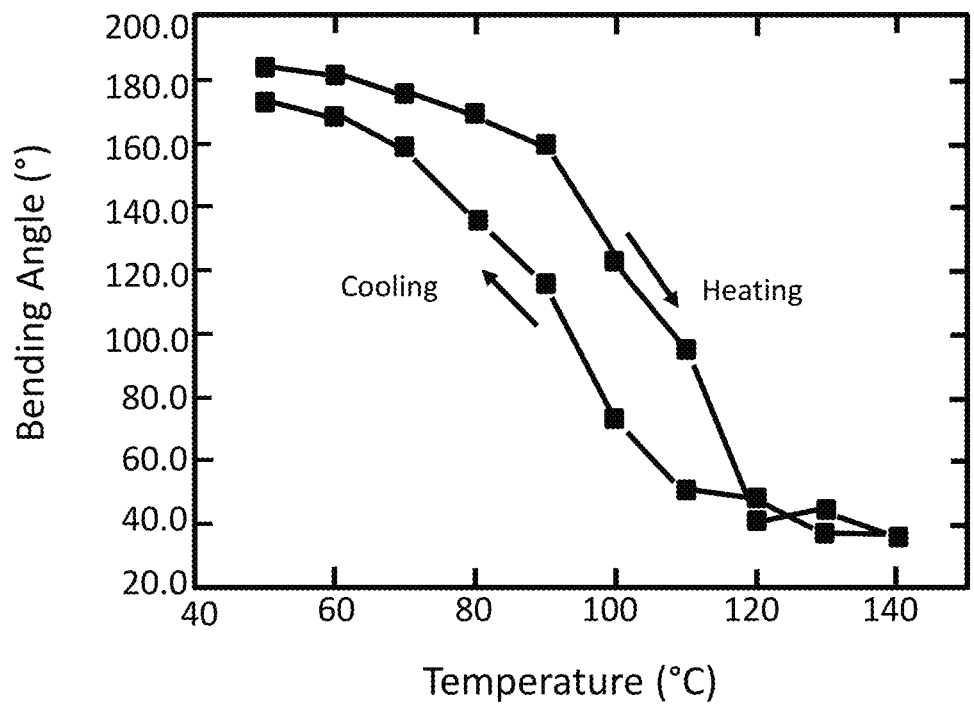
FIGS. 22A-22C are graphical representations of temperature-dependent bending, thermal cycling, and normalized area/Poisson's ratio of the LCE of FIG. 20, respectively.
Figure 22B:
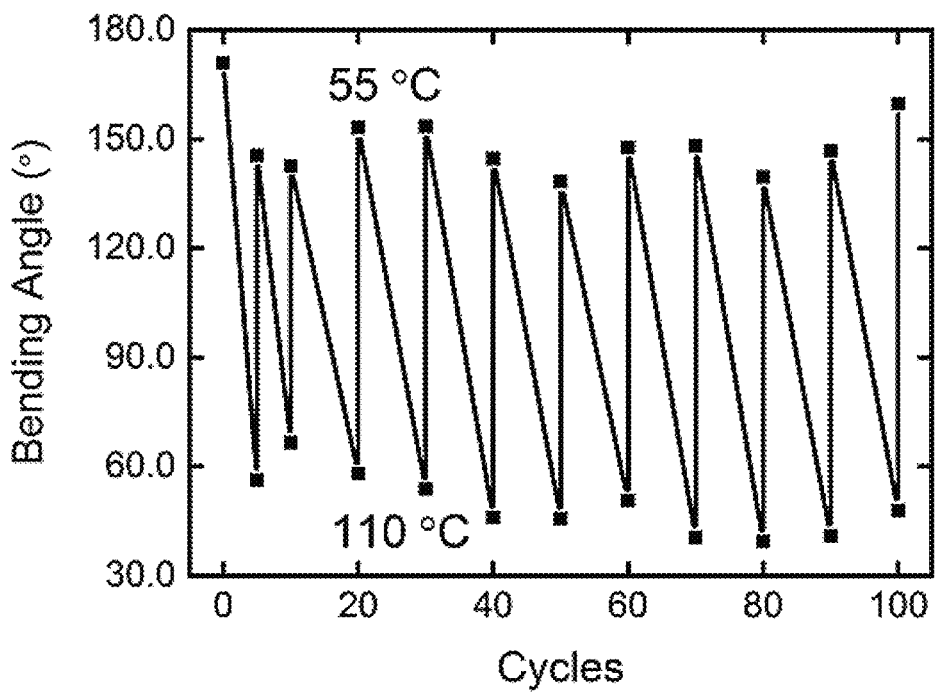
Figure 22C:
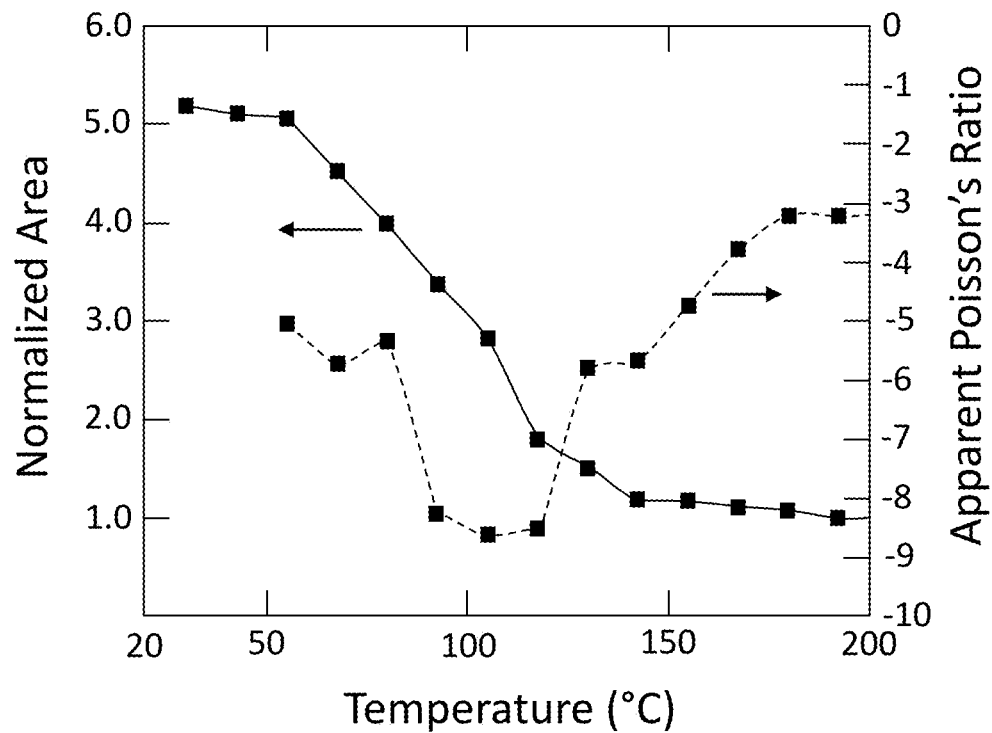

The direction of the mountain or valley folds 146 is determined by aligning the mesogens, on the desired interior fold surface, perpendicular to a short axis of the hinge 148. For example, the bending performance of a 2 mm wide strip containing a single 500 µm hinge and loaded with a 3 mg weight at a free end of the strip is graphically represented in FIG. 22A. According to some embodiments, a 500 µm wide hinged, loaded with a weight that is about 45 times heavier than the active region, bends reversibly over 130° when the heat stimulus shifts between 50° C. and 100° C. FIG. 22B is a graphical representation of 100 thermal cycles of the LCE 142$_a$, 142$_b$ (FIG. 20), showing no appreciable change in bending performance. Ignoring the weight of the inactive portion of the actuator and normalizing to the weight of the active hinge, the hinge applies a maximum torque of about 0.98 Nm/kg. FIG. 22C is a graphical representation of an exemplary, five-fold reduction in area of the second state LCE 142$_b$ (FIG. 20) as compared to the first state LCE 142$_a$ (FIG. 20). On heating (from room temperature to 140° C., for example), each nematic region 148 (FIG. 21) may fold, leading to a five-fold reduction in total surface area. While the LCE 142$_a$, 142$_b$ (FIG. 20) may have a Poisson ratio of about 0.5, the in-plane apparent Poisson ratio may be negative throughout the actuation (for example, about −3).

Figure 23A:
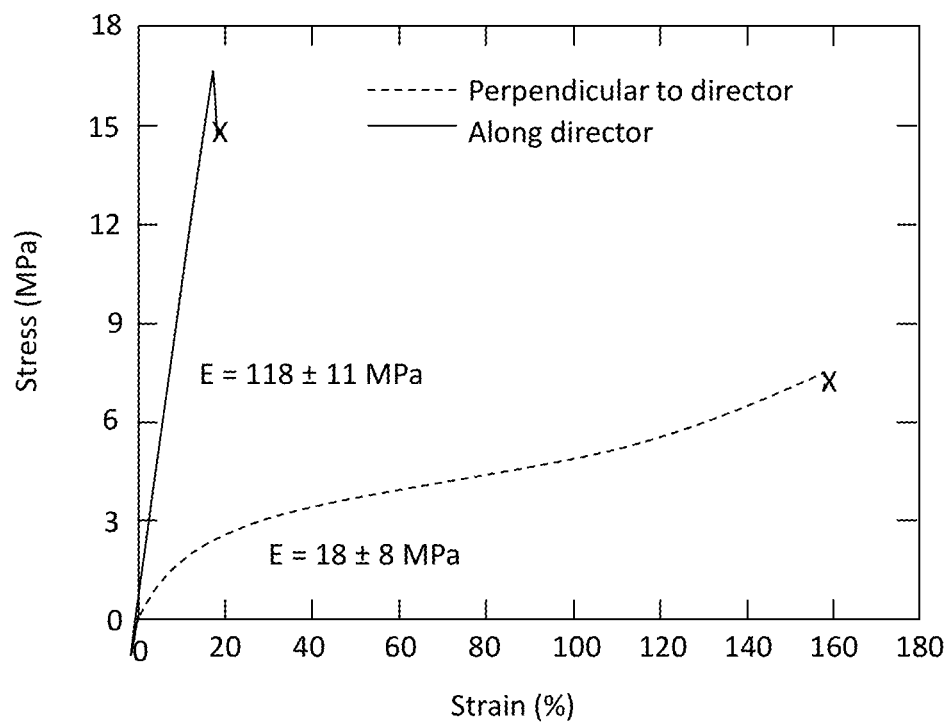
FIG. 23A is a graphical representation of the elastic modulus of an exemplary LCE according to an embodiment of the present invention.
Figure 23B:
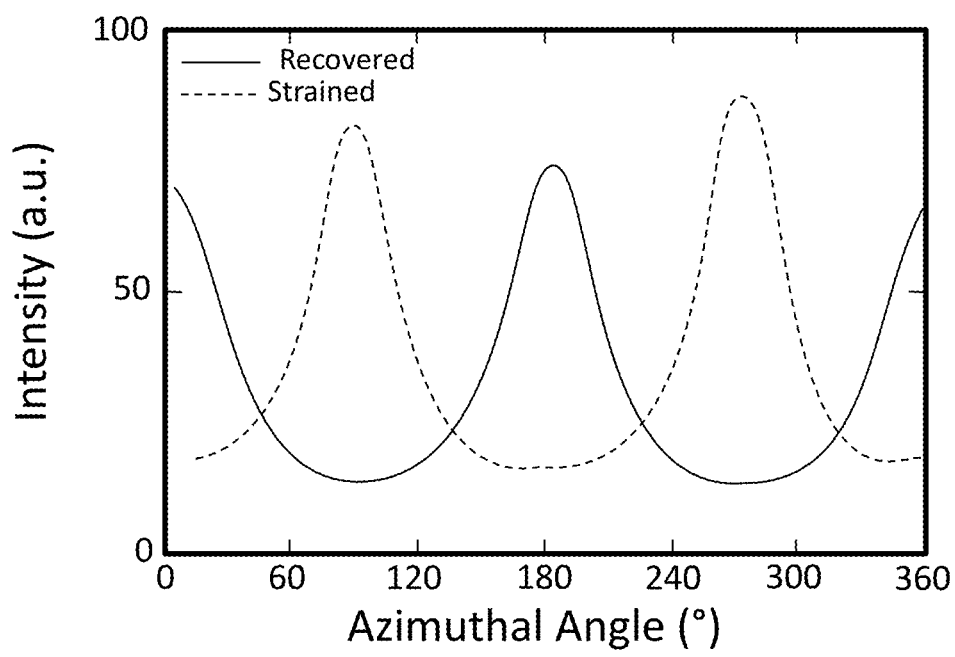
FIG. 23B is a graphical representation of cyclical director orientation of the LCE of FIG. 23A.

In addition to designing voxelated actuating materials, LCEs according to various embodiments of the present invention may be used to spatially control the mechanical behavior of an elastomeric film. Specifically, a localize orientation of the polymer network may directly control a stress-strain response of a particular voxel or domain of a LCE prepared in accordance with embodiments of the present invention. FIG. 23A is a graphical representation of an exemplary elastic modulus of a homogeneously-aligned sample, which is highly dependent on a direction of the applied load as compared to the director orientation. While this property of aligned liquid crystal polymer networks may be known, FIG. 23A demonstrates that when the LCE is strained at some non-zero angle to the director of the material, a "semi-soft" deformation may be observed. As such, a non-linear stress-strain response may be attributed to director reorientation. Reorientation of the director has been confirmed using wide angle X-ray scattering, an example of which is graphically shown in FIG. 23B. Therefore, resulting monoliths may be configured to control both a "global" mechanical response and a "local" mechanical response, which are in response to directional mechanical loads, including uniaxial tension, multi-axial tension, and buckling. These changes in properties may be based on only the order of the voxelated LCE and do not change with temperature, environmental or composition.

Figure 24B:
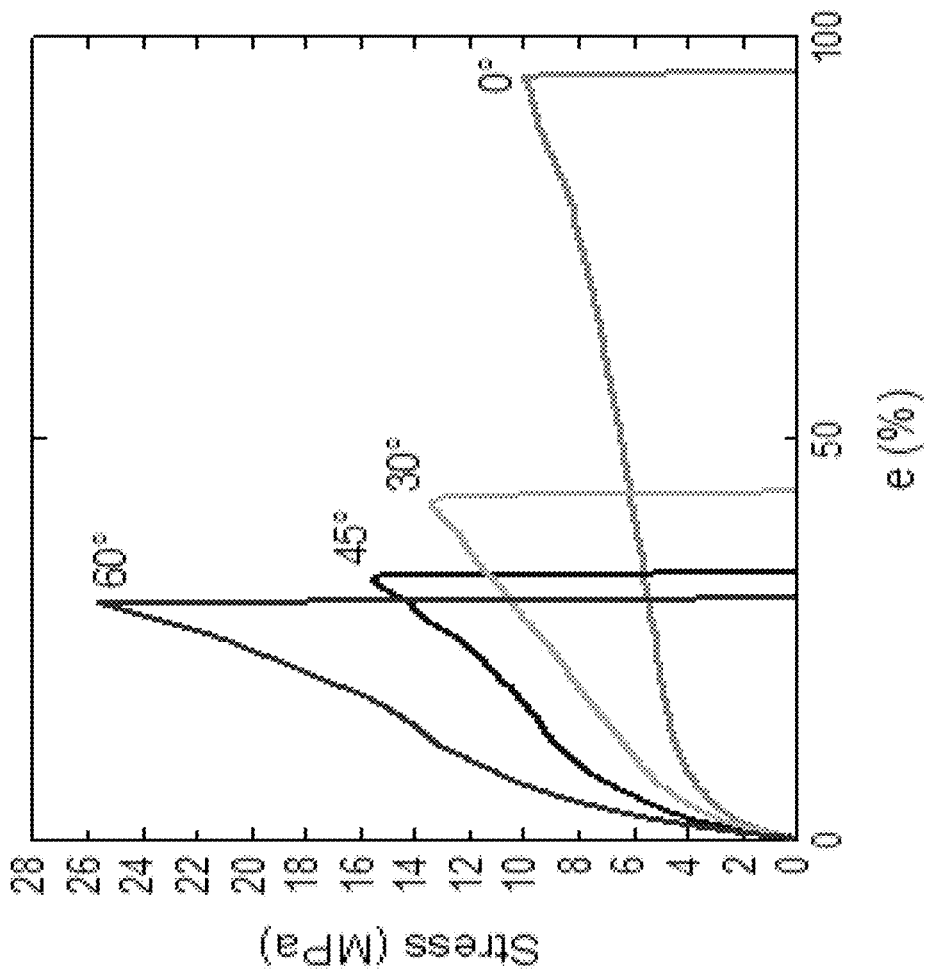
FIG. 24B is a graphical representation of stress-strain curves for four LCE films prepared according to FIG. 24A and having second domain directors oriented 0°, 30°, 45°, and 60° to the short axis of the film.
Figure 24A:
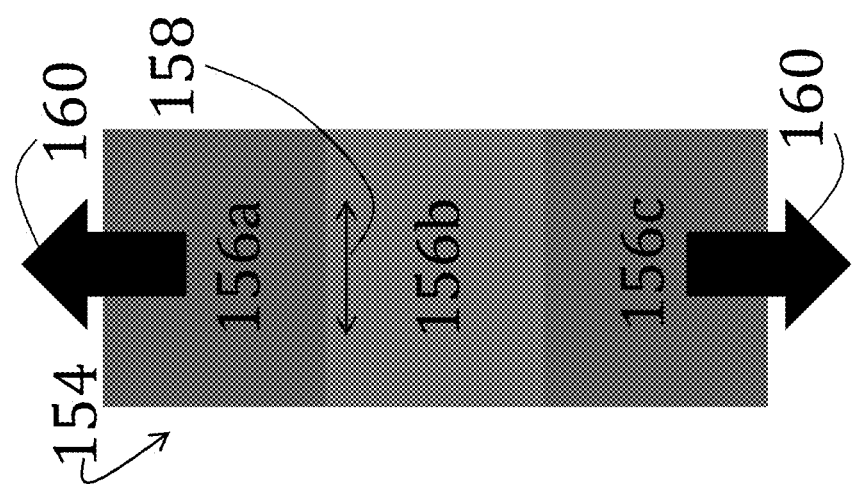
FIG. 24A is a schematic representation of LCE films prepared in accordance with embodiments of the present invention.

With reference now to FIGS. 24A and 24B, tuning a "global" mechanical response of LCEs prepared in accordance with embodiments of the present invention is shown. FIG. 24A schematically illustrates such an LCE film 154 having three domains 156a, 156b, 156c of similar dimensions, wherein the first and third domains 156a, 156c are identical with directors oriented 90° to a short axis of the film 154 (herein, transverse direction indicated by arrow 158). A director of the second domain 156b varies from 0° to 60° to the short axis. FIG. 24B is a graphical representation of a modulus and a strain tensile response of four films represented by the film 154 of FIG. 24A when stretched longitudinally (i.e., in the directions of arrows 160), wherein the second domain directors were oriented 0°, 30°, 45°, and 60°. As shown, the modulus and strain tensile response may be controlled or at least partially determined by the director orientation of the voxelated LCE film.

Figure 25B:
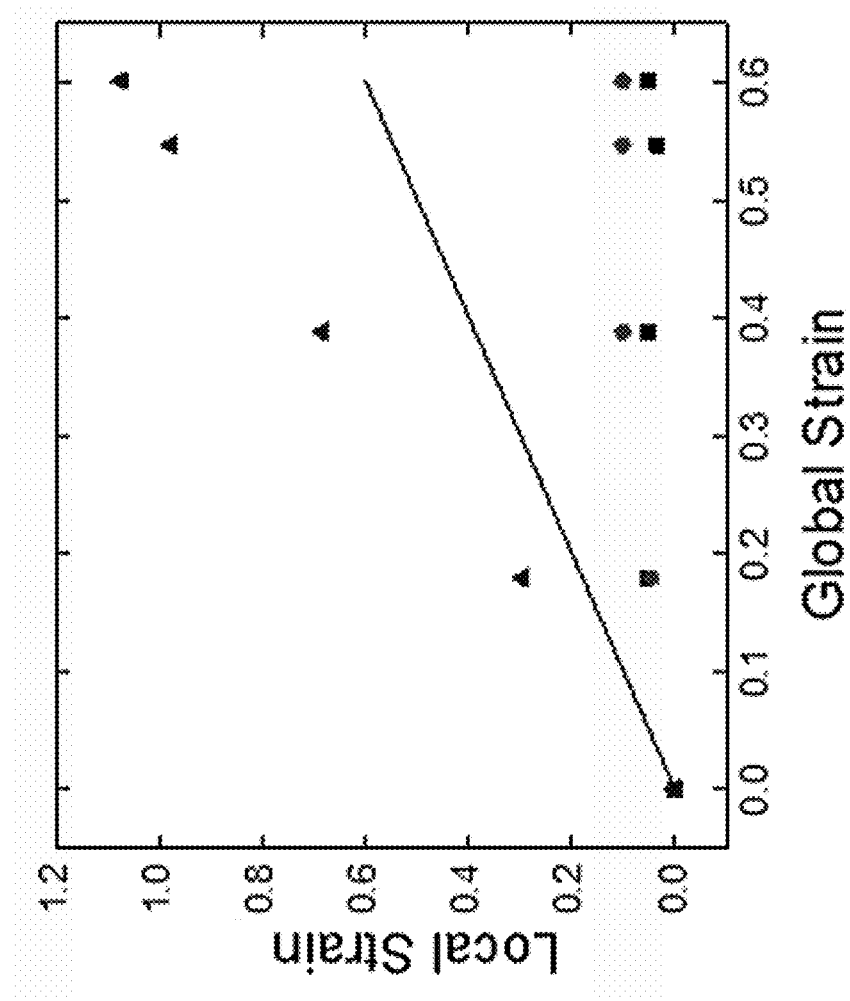
FIG. 25B is a graphical representation of strain within each domain of the LCE film of FIG. 25A.
Figure 25A:
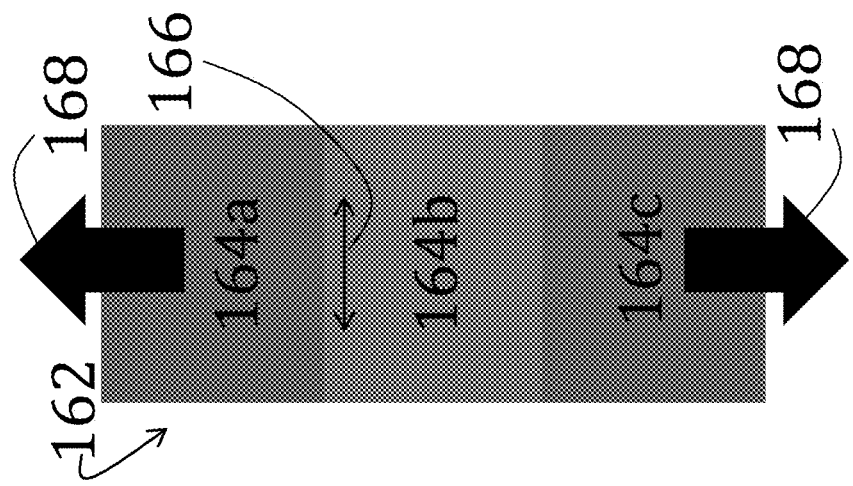
FIG. 25A is a schematic representation of an LCE film prepared in accordance with another embodiment of the present invention.

In other embodiments of the present invention, strain in LCE film may be heterogeneously distributed. For example, FIG. 25A schematically represents an LCE film 162 having three domains 164a, 164b, 164c of similar dimensions. The first and third domains 164a, 164c of the LCE film 162 are identical with directors oriented 90° to a short axis of the film 162 (herein, transverse direction indicated by arrow 166). A director of the second domain 164b is oriented to be parallel with the short axis. Upon stretching outwardly (illustrated by arrows 168), the second domain 164b preferentially deforms as compared to the first and third domains 164a, 164c. Such strain may be quantified, as the graphical representation of local strain illustrated in FIG. 25B, wherein square and circle representative data correspond to the first and third domains, triangle representative data corresponds to the second domain, and the line represents a homogeneous sample.

Figure 26B:
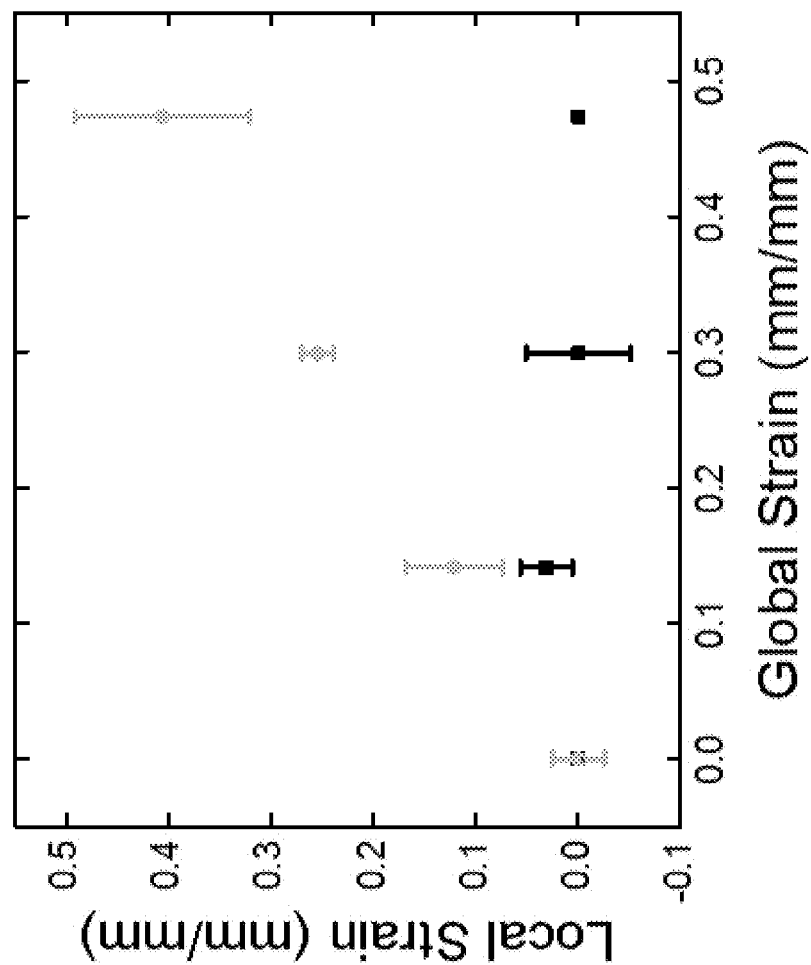
FIG. 26B is a graphical representation of strain within each domain of the LCE film of FIG. 26A
Figure 26A:
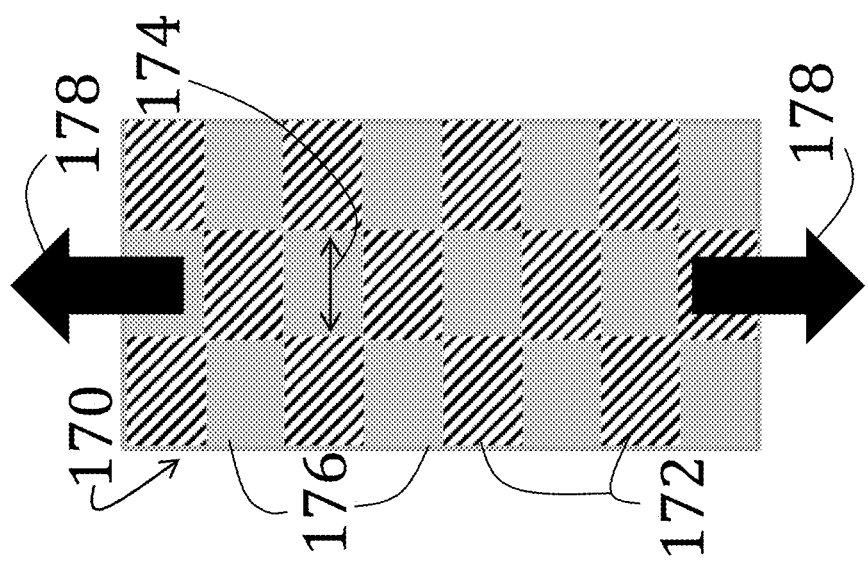
FIG. 26A is a schematic representation of an LCE film prepared in accordance with another embodiment of the present invention.

According to still another embodiment of the present invention, an exemplary LCE 170 according to one embodiment of the present invention is patterned to limit localized strain and is shown in FIG. 26A. The illustrative pattern is checkered with a first plurality of domains 172 (diagonally-striped domains) aligned parallel to a director (illustrated as arrow 174) and a second plurality of domains 176 (solid colored domains) aligned perpendicular to the director. Localized strain is graphically illustrated in FIG. 26B. When the film 170 is stretch outwardly (illustrated by arrows 178), strain is largely contained within the so-called "soft domains" (i.e., the second plurality of domains 176, graphically illustrated with grey error bars) as compared to the so-called "hard domains" (the first plurality of domains 172, graphically illustrated with black error bars). Such ability to localize strain within elastomeric materials may be particularly useful as substrates for stretchable or flexible electronics.

Yet other embodiments of the present invention may be directed to reconfigurable network chemistries enabling the re-patterning of an LCE.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1

1,4-bis-[4-(6-acryloyloxyhexyloxy)benzoyloxy]-2-methylbenzene ("RM82") and 1,4-Bis-[4-(3-acryloyloxypropyloxy)benzoyloxy]-2-methylbenzene ("RM257") were purchased from Merck & Co., Inc. (Kenilworth, N.J.). A proprietary, photoalignment material, PAAD-22, was purchased as a solution in dimethylformamide ("DMF") from BEAM Co. (Winter Park, Fla.) and diluted to ⅓ of initial concentration by adding DMF. N-butylamine was purchased from Sigma-Aldrich Corp. (St. Louis, Miss.). Radical photoinitiators, DAROCUR TPO and I-784, were provided by Ciba Specialty Chemicals (Basel, Switzerland), a subsidiary of BASF SE (Ludwigshafen, Germany). Unless otherwise mentioned, all chemicals were used as received without further purification or modification.

Glass microscope slides (50 mm×25 mm×1 mm) were first cleaned by successive washes of acetone and isopropanol to remove unwanted particulates. The clean slides were then plasma treated utilizing atmospheric air at a pressure of about 40 Pa to further clean the surface and to create a highly polar surface. An alignment layer comprising 25 µL of solution of the diluted PAAD-22 solution was dispensed, using a micropipette, and mechanically spread to cover the surface of the slide. The slide was then subjected to spinning at about 2000 RPM with an acceleration of 500 RPM/s for about 60 s and baked at 100° C. for 10 min to remove any residual solvent.

Optical patterning was performed using a system similar to the embodiment illustrated in FIG. 3. The solid state laser was diode pumped, 445 nm. The beam passed through a computerized shutter, a λ/2 waveplate mounted on a computer-controlled rotation stage, expanded, collimated, and focused to a point with a radius of approximately 50 µm onto the alignment layer on the surface of the slide.

The computer-controlled rotation stage consisting of two stepper motors connected to a sample holder and configured so as to generate X-Z rotation, wherein the y-axis is along the path of the beam.

A LabVIEW program (National Instruments, Corp., Austin, Tex.) was utilized to operate control of the shutter, the waveplate, and a sample positioning stage. A text file was utilized to input desired polarization and location of each point.

Prior to the focusing, the light intensity was 6.5 mW/cm$^2$ with a beam diameter of 1.6 cm. The expected writing intensity at the sample is 41.6 W/cm$^2$.

The alignment layer was exposed after the waveplate, and sample positioning stage were moved to the proper position and lasted for about 10 msec per point (with a total exposure energy of about 4.16 J/cm$^2$). Write time was largely controlled by the rotational speed of the waveplate and, therefore, varied with the input pattern. Average write speeds of 5 points/sec were observed with patterns taking around 1 hour to complete.

Stability of the photoalignment was determined to be approximately 12 hrs. As such, alignment was preserved by polymerizing a thin layer of liquid crystal monomer, such as a mixture of 99 wt % RM 257 (reactive mesogen) and 1 wt % I-784 (visible light initiator) dissolved in chloroform (4 wt % solids). To do so, the patterned alignment layer was flooded with the monomer solution and subjected to spinning at 2000 RPM with an acceleration of 500 RPM/s for about 60 s. After coating, the RM257 layer liquid crystalline was polymerized under reduced pressure (about 4 kPa) utilizing a green laser (532 nm, 35 mW/cm$^2$) for 10 min.

Figure 27:
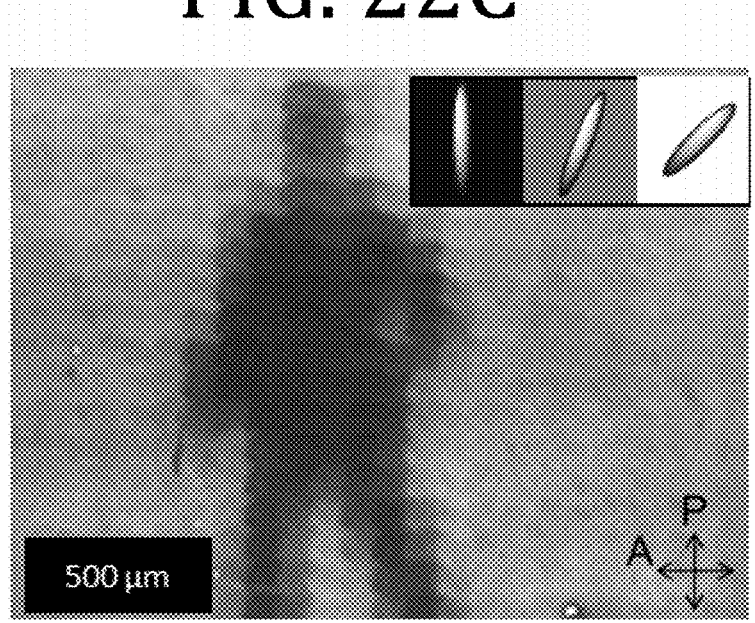
FIG. 27 is an exemplary optical micrograph of a patterned RM 257 alignment layer visualized between crossed polarizers, wherein gray scale pixilation depends on mesogen alignment with respect to a director orientation.

FIG. 27 is an exemplary optical micrograph visualized between crossed polarizers of a portion of the patterned RM 257 alignment layer and demonstrating a plurality of gray tones with pixilation on the scale of 100 µm. Specifically herein, dark pixels correspond to mesogens aligned with either the polarizer or analyzer; light pixels correspond to mesogens aligned 45° to the polarizer or analyzer.

Example 2

After preparing, patterning, and optionally coating two substrates as described in Example 1, the two substrates are arranged to be facing, spaced by 50 µm cylindrical spacers, and two edges were secured using a two-part epoxy to form a cavity therebetween. Alignment of the two substrates was performed under a polarizing optical microscope to ensure matching alignment of patterns of the substrates, and the two-part epoxy was cured at room temperature.

The cavity was then filled will liquid crystal comprising a mixture of 1.01:1 moles of RM82 to n-butylamine with 1 wt % of photoinitiator (DAROCURE® trimethylbenzoyl diphenylphosphine oxide ("TPO"), BASF SE, Ludwigshafen, Germany) by total monomer concentration. The solution, while being shielded from fluorescent light, was heated to melt solid components (temperature of about 70° C.) and mixed vigorously by vortex. The process was repeated at least three times and the resulting nematic mixture crystallized slowly at room temperature (over 30 min). The cavity of the liquid crystal cell was filled via capillary action at 80° C.

The monomer mixture filled the cavity over approximately 10 min and quickly aligned to the patterned alignment layers (with or without the alignment preserving polymer). While the reaction of primary amines and acrylates of the polymerization reaction, which is described in detail above, proceeds very quickly, the reaction of the resulting secondary amine was much slower than a time required to fill the cell. Such difference in reaction times prevents a competitive process between reaction induced increase in viscosity and liquid crystal alignment. The filled liquid crystal cell was then transferred to an oven and baked at 75° C., overnight, for oligopolymerization.

One such cell was prepared with N-butylamine, used to chain extend a commercially-available nematic diacrylate (here, for example, being RM82) through a self-catalyzed reaction, e.g., the aza-Michael Addition. The monomer mixture rapidly aligned to match the patterned alignment layer. Over the course of 18 hr, a step-growth reaction proceeded and resulted in a telechelic acrylate-terminated main chain liquid crystal macromer with a weight average molecular weight of approximately 6000 Da and a PDI of 2.1, as measured by gel permeation chromatography.

Figure 28A:
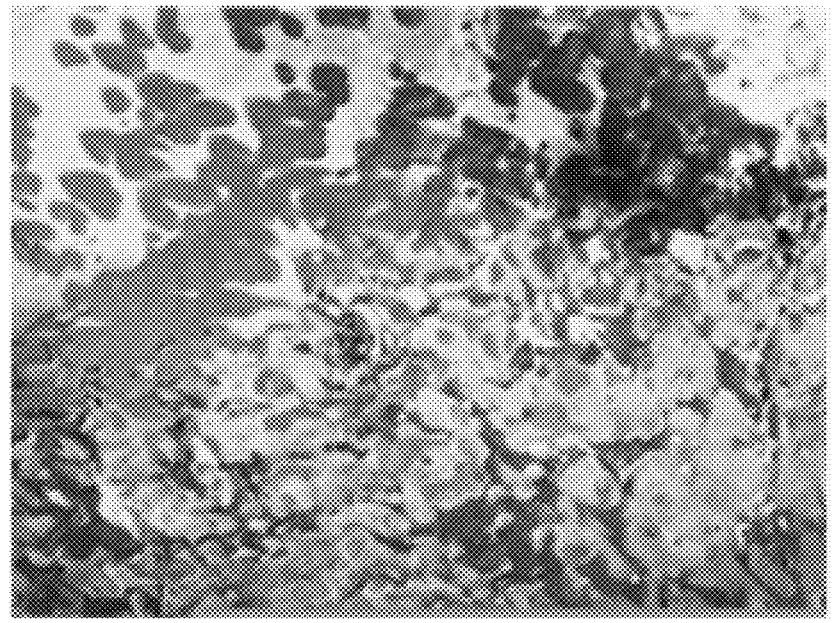
FIGS. 28A and 28B are images produced by differential scanning calorimetry and polarizing optical microscopy ("POM") of an oligomer having a wide nematic window, at 50° C. and 101° C., respectively.
Figure 28B:
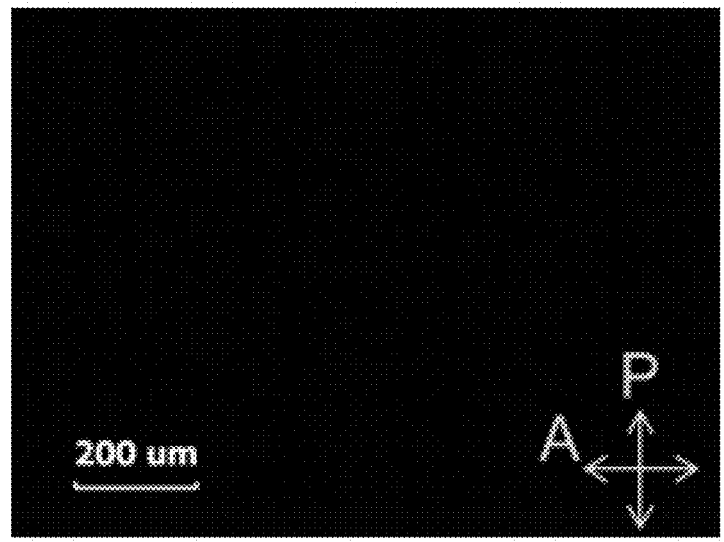

The particular oligomer exhibited a wide nematic window, extending through room temperature, as shown by differential scanning calorimetry and polarizing optical microscopy ("POM") in FIGS. 28A and 28B, respectively. The POM images were acquired using a POM (Nikon Corp., Tokyo, Japan) fitted with a heating accessory (Mettler-Toledo International, Inc., Columbus, Ohio) was utilized to characterize optical behavior of the nematic samples and to monitor dimensional change of monodomain LCEs. Nematic textures were observed directly in transmission between two untreated glass surfaces. Colors seen in these micrographs (not visible in gray-scale images shown here) are due to dispersion of the liquid crystalline monomer mixture. Actuation was characterized by floating a rectangular piece of aligned LCE on a layer of silicone oil. Images were taken at 5° C. intervals under equilibrium conditions. Dimensional changes were measured by image processing.

After oligomerization, the mixture is a viscous nematic fluid that does not crystallize at room temperature. The cell was cooled to room temperature and polymerized using an EXFO Omnicure S1000 (Omnicare, Cincinnati, Ohio) (about 200 mW/cm$^2$ and ranging from 320 nm to 400 nm) for 30 min. The cell was rotated after 30 sec, 1 min, and 15 min of exposure to provide more uniform crosslink density throughout the cavity. After crosslinking, the resulting liquid crystal elastomer was insoluble in a variety of organic solvents and demonstrated a gel fraction of 84.5%±5.6% after extraction in chloroform.

Example 3

Figure 29:
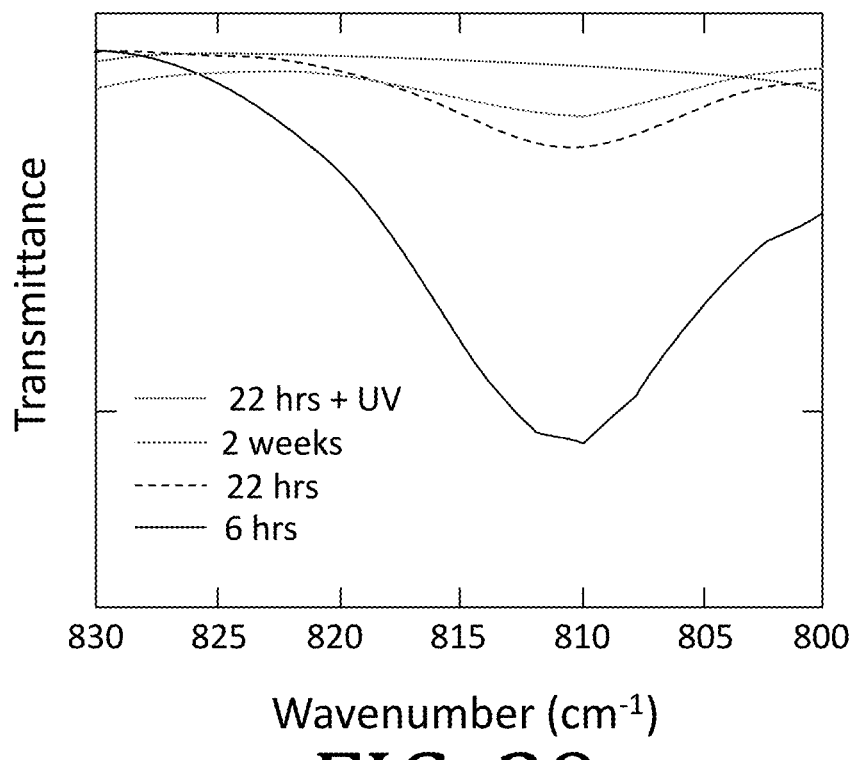
FIG. 29 is an infrared spectrum of polymerization of acrylate groups of an LCE according to an embodiment of the present invention.

A Bruker FTIR (IFS 66v/s) (Bruker Corp., Billerica, Mass.) in transmission mode was utilized to monitor the conversion of acrylate groups within the cavity of the cell of Example 2, after both stages of polymerization. Scans were performed from 400 cm$^{-1}$ to 3200 cm$^{-1}$ with a sampling interval of 4 cm$^{-1}$. Data presented are an average of 32 scans. Oligomer mixtures were first dissolved in chloroform and then cast onto a PTFE IR sample card. Elastomer samples 50 μm thick were tested directly after polymerization. The peak at 812 cm$^{-1}$ was utilized to monitor conversion of the acrylate carbon-carbon double bond and is presented as a function of time in FIG. 29. The first point utilized to monitor the reaction was after 6 hr at 75° C. After 18 hr, the conversion acrylate double bonds increased significantly. Upon further reaction (up to two weeks at 75° C.) the conversion did not significantly improve. As such, 18 hr was chosen for the length of the step-growth reaction.

Example 4

Differential scanning calorimetry ("DSC") was performed using a TA Instruments Q2000 (Texas Instruments, Inc., Dallas, Tex.) with an aluminum hermetic crucible. All tests were performed under nitrogen. All heating and cooling rates were set to 10° C./min. Samples that were tested before polymerization were heated from room temperature to 120° C., cooled to −50° C., and then heated to 200° C. Samples tested after crosslinking were heated from room temperature to 175° C., cooled to −50° C., and then heated to 200° C. Data shown are of the second heating cycle. Both the polymer and oligomer were analyzed using DSC.

Figure 30:
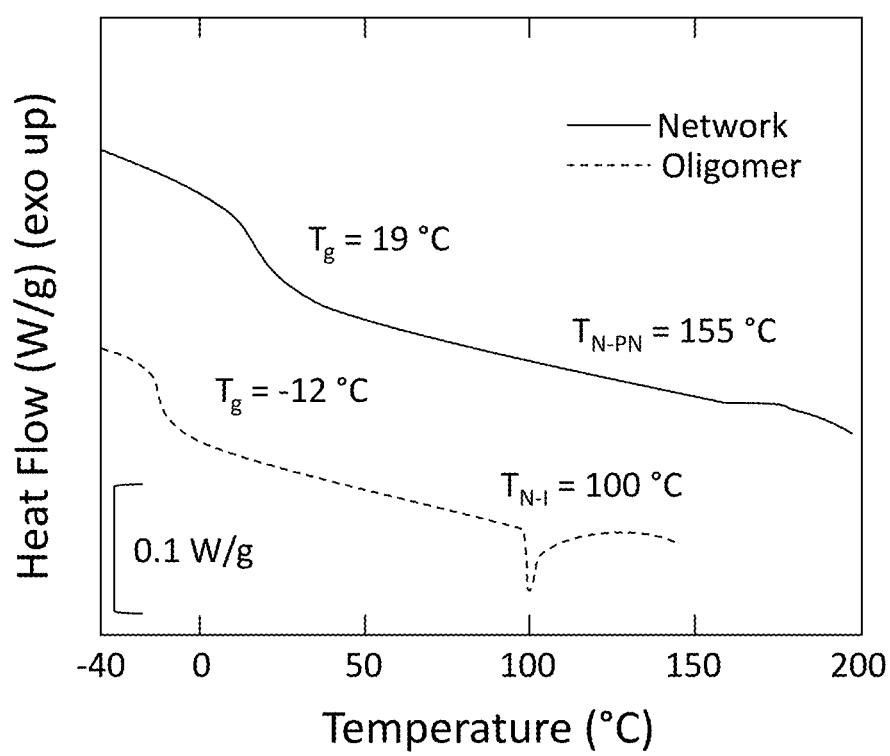
FIG. 30 is a graphical representation demonstrating a glass transition temperature for a polymer network and oligomers according to embodiments of the present invention.

The oligomer exhibits a glass transition at −12° C. and was not observed to crystallize over several months of storage at 4° C. A nematic-isotropic transition temperature was observed starting at 100° C. and was confirmed by POM. An unaligned sample, with a characteristic polydomain texture was cross-linked and then tested utilizing DSC. The resulting polymer network was viscoelastic at room temperature, with a glass transition of 19° C. (FIG. 30). A slight endothermic shift is observed at 155° C. This shift is characteristic of supercritical behavior of liquid crystal elastomers incapable of exhibiting complete clearing. This result is supported by POM observation of remnant order at 200° C.

Example 5

Figure 31:
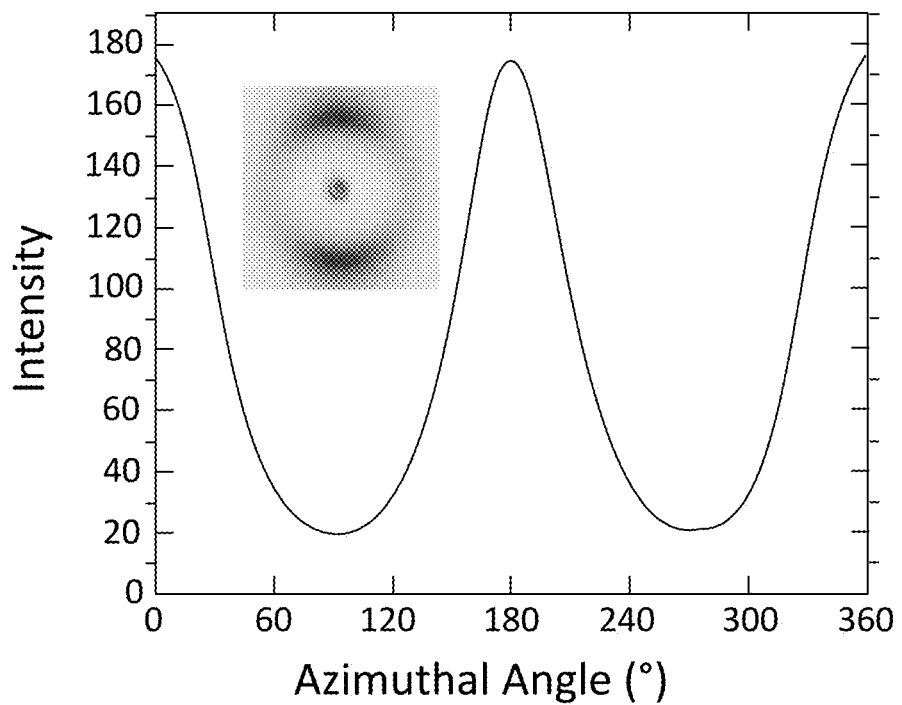
FIG. 31 is a wide angle X-ray diffraction pattern of an LCE according to an embodiment of the present invention.
Figure 32:
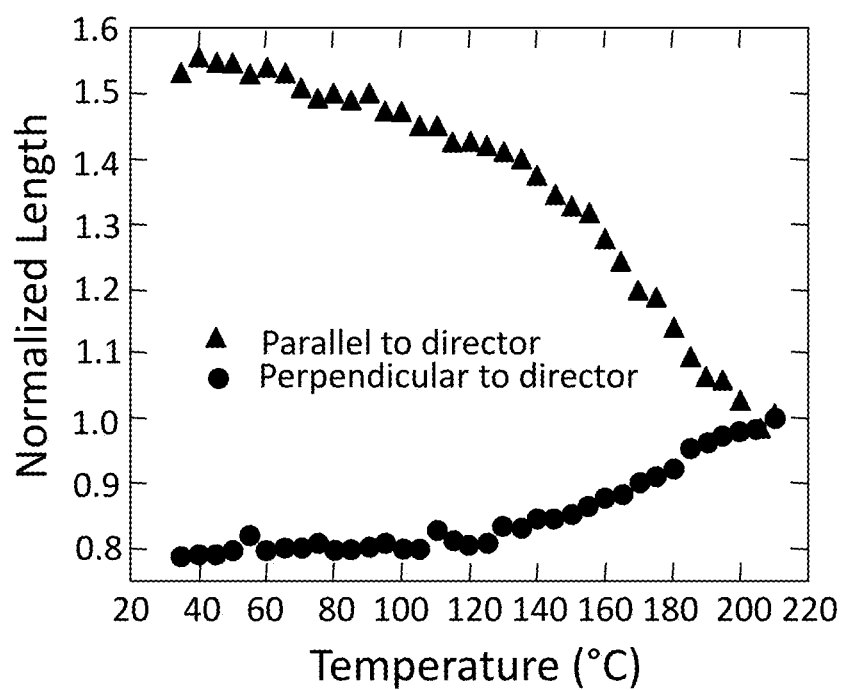
FIG. 32 is a graphical representation of birefringence monitored by light transmission of the LCE between crossed polarizers, parallel and perpendicular to the director.
Figure 33:
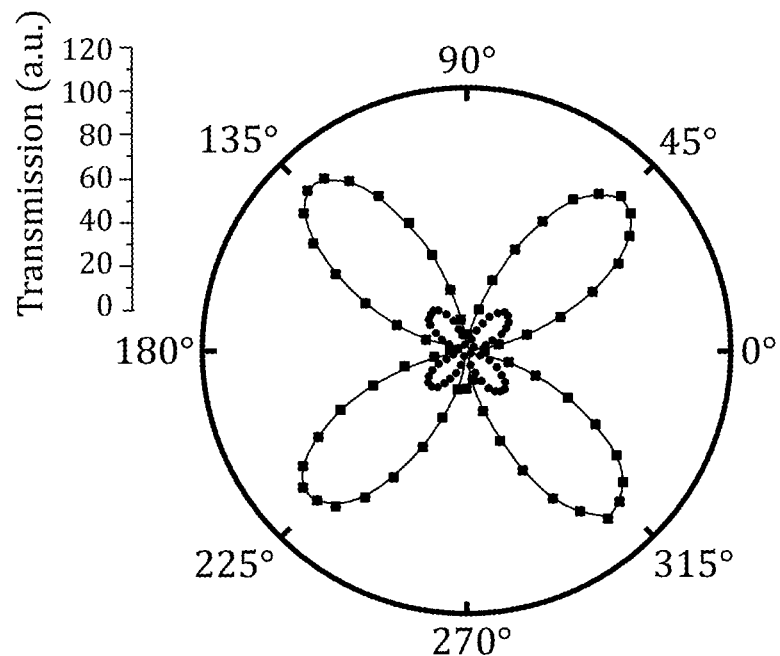
FIG. 33 is a graphical representation of biaxial actuation of a homogenously aligned LCE in the absence of mechanical load.

Wide Angle X-Ray Scattering ("WAXS") experiments were carried out by a Ultrax18 (Rigaku Corp., Tokyo, Japan) using CuK$_\alpha$ on a Stratton box camera (Stratton Camera, Inc., Farmington, Mich.) at 53 mm sample to image plate distances. Two-dimensional scattering patterns were analyzed to provide nematic order parameter. Wide angle X-ray diffraction was used to verify that the alignment of an anti-parallel rubbed cell dictates the alignment of the final LCE (FIG. 31). Herman's orientational order parameter was determined to be 0.41 at room temperature. After crosslinking, the birefringence of a surface-aligned uniaxially-ordered elastomer is evident by monitoring light transmission between crossed polarizers (FIG. 32) and through wide angle X-ray scattering. At 200° C., the material is still birefringent (anisotropic) although the magnitude of the light transmission is greatly reduced at all angles. This remnant order is characteristic of a low-order paranematic state that arises from the constraint of crosslinks within the network. As evident in FIG. 33, a spontaneous and reversible contraction on heating and expansion of 55% on cooling along the director is observed. Deformation of the LCEs is expected to be nearly volume conserving and, as such, the two directions perpendicular to the director exhibit contraction on cooling and expansion on heating.

Example 6

Figure 34:
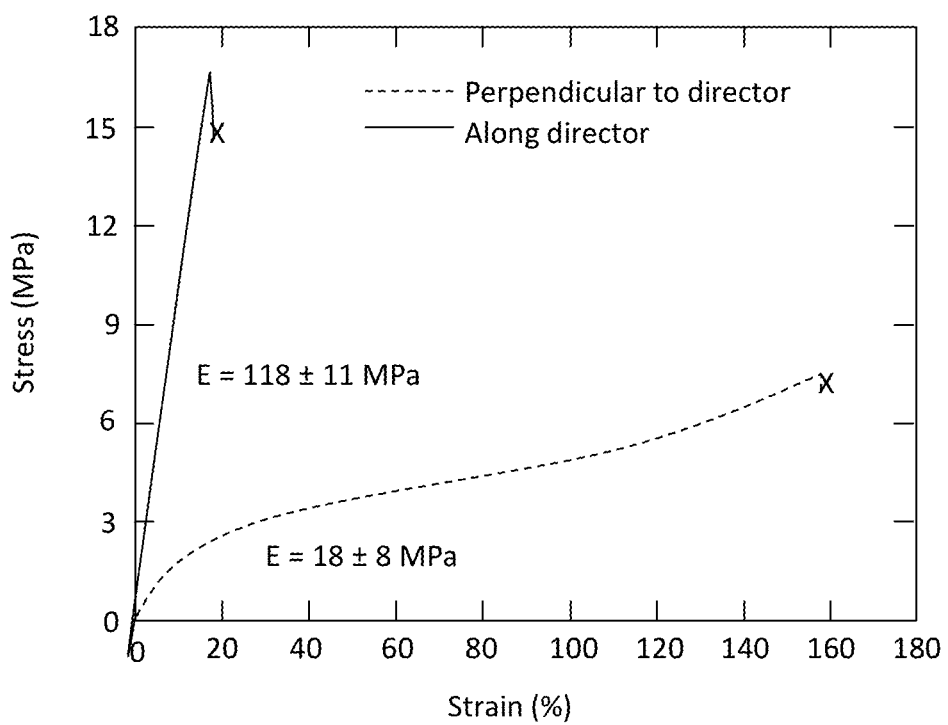
FIG. 34 is a graphical representation of a stress-strain response of a homogenously aligned LCE.

Tensile testing was performed at room temperature utilizing a TA Instruments RSA III (Texas Instruments, Inc.). Rectangular samples (25 mm×5 mm×0.05 mm) were cut from a homogeneously aligned LCE. The effect of molecular alignment on the engineering stress-strain response was tested by aligning the long axis or short axis of the rectangles along the orientation direction. A strain rate of 0.5 min' was used. As seen in FIG. 34 the modulus of the elastomer film is higher along the director than perpendicular to the direction. This is characteristic behavior of an aligned liquid crystalline polymer.

Example 7

Thermal actuation was characterized by a variety of different means. Samples that not externally loaded where characterized using ambient heating. Biaxial actuation of monodomain elastomer films was monitored in POM as described above. Actuation over temperature ranges of shapes was quantified using a hot plate covered in a non-adhesive surface, black paper. The sample was then covered in glass to create a small thermal chamber. The hot plate was set to the desired temperature, allowed to equilibrate for 5 minutes, and photographed. To show qualitative shapes that are achieved through actuation, a small thermal chamber was built using black paper and a glass cover. The paper was then heated with an infrared ("IR") lamp to the desired temperature and verified using an external thermometer. To characterize the actuation of +1 defects under load, IR ambient heating was utilized.

Example 8

Figure 35A:
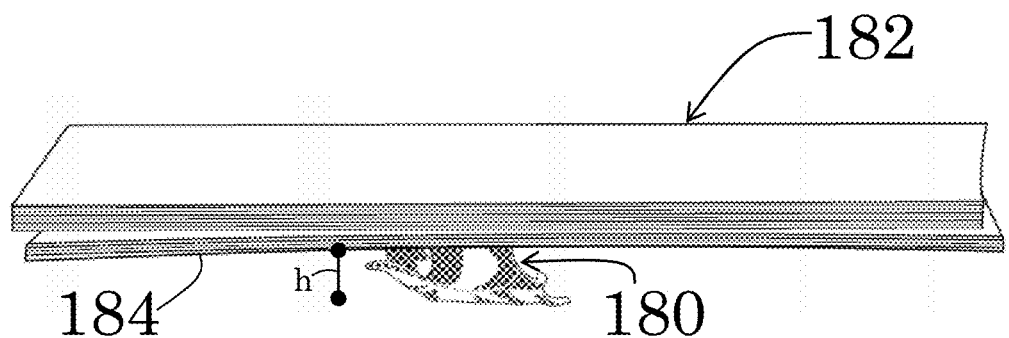
FIGS. 35A-35C are sequential, side elevational views illustrating actuation of an exemplary film having a single topological defect under a load.
Figure 35B:
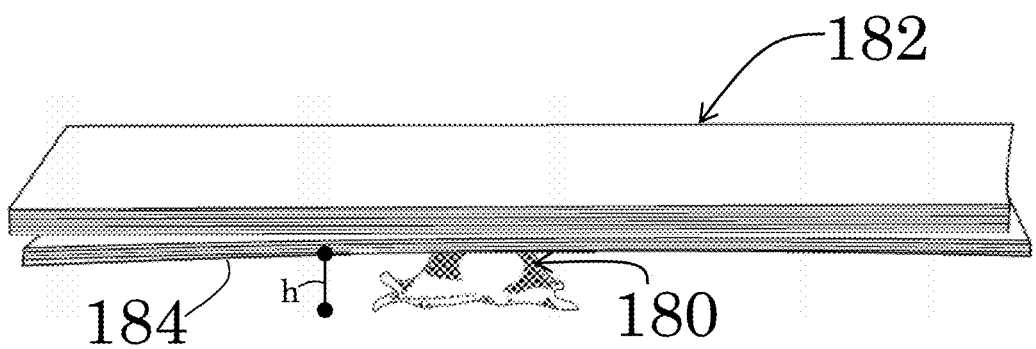
Figure 35C:
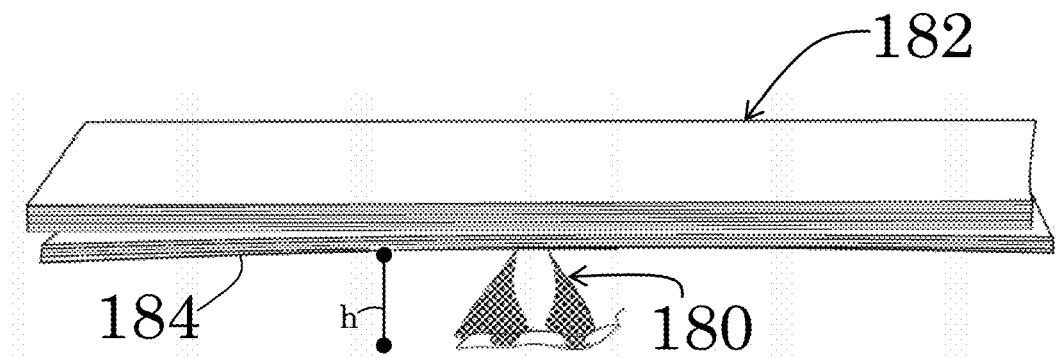

FIGS. 35A-35C demonstrate actuation of a film having a single topological defect (illustrated herein as actuator 180) that is about 7 mg in weight under a load 182 of about 1 g (made of 1 mm thick microscope slides). Characterizing the actuation performance of the single topological defect was difficult because of a need to balance the load 182 without falling off the actuator 180. Thus, the reverse of having the actuator 180 lift one side of glass plates, of varying weight (such as using a stack of 22 mm×22 mm, #1 coverslips), was tested.

Stroke was calculated by using an initial thickness of the actuator 182, 50 and measuring an actuated height (illustrated as line segment "h") to a bottom 184 of the load 182. The maximum force exhibited by the actuator 180 is equal to ½ the weight of the load 182. However, this load 182 is reduced as the angle of the lad 182 increased from parallel with respect to gravity to more perpendicular with respect to gravity. The maximum angle the load 182 makes with the horizontal axis corresponds to the minimum load 182 that was exhibited. To calculate work along the path, an average load was calculated by assuming a linear relationship between displacement and the load 182. Due to the small angles of actuation, actuation height (h) over distance from pivot point of the actuator 180 lead to angles greater than 0.1 rad, the load varied less than 1% over the entire stroke.

Example 9

Figure 36:
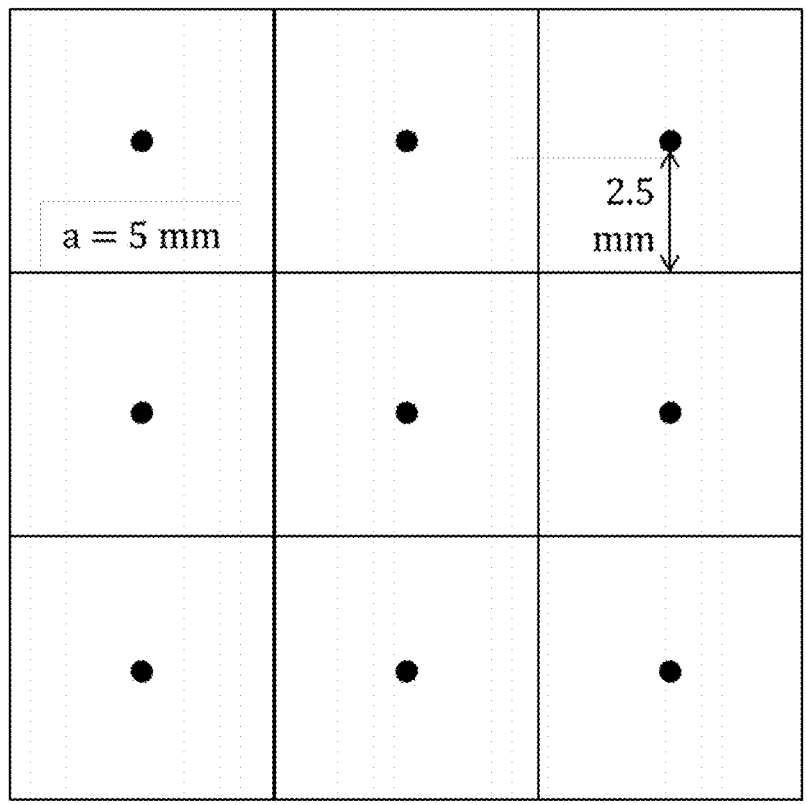
FIG. 36 is a pattern of arrays of azimuthal+1 topological defects for LCE according to embodiments of the present invention.

For testing multi-stable, topical defects, arrays of azimuthal+1 topological defects were arranged, for example, in a square as shown in FIG. 36.

Figures 37A, 37B:
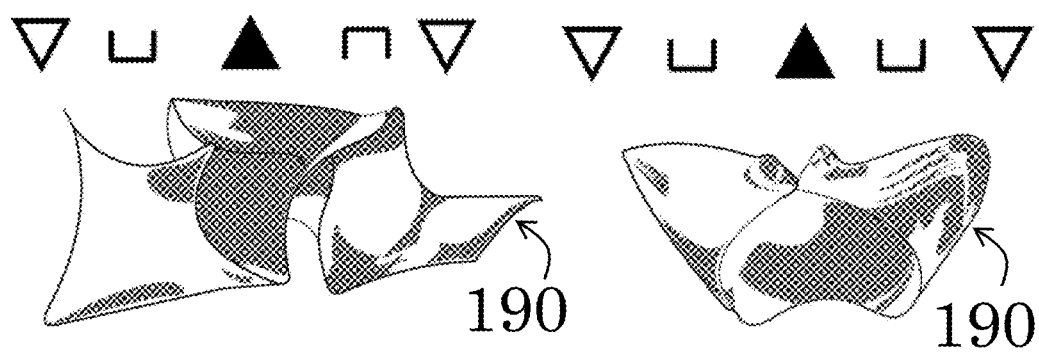
FIGS. 37A and 37B are side elevational views of an LCE patterned with a 1×3 array, multi-stable line defects.

A multi-stable actuator 190, shown in FIGS. 37A and 37B, was prepared using a 1×3 array these two "line defects" are both multistable. The orientation of these defects can either "saddle up" or "saddle down", as demonstrated in FIGS. 37A and 37B, respectively. These two conditions are only possible if the two +1 defects on either side point in opposite directions. That is, if both +1 defects bordering the line are oriented in the same way, then the orientation of the line defect is defined. It is expected that this behavior is highly dependent on the way in which the defects are interfaced and is the focus of ongoing investigation.

Example 10

Figure 38:
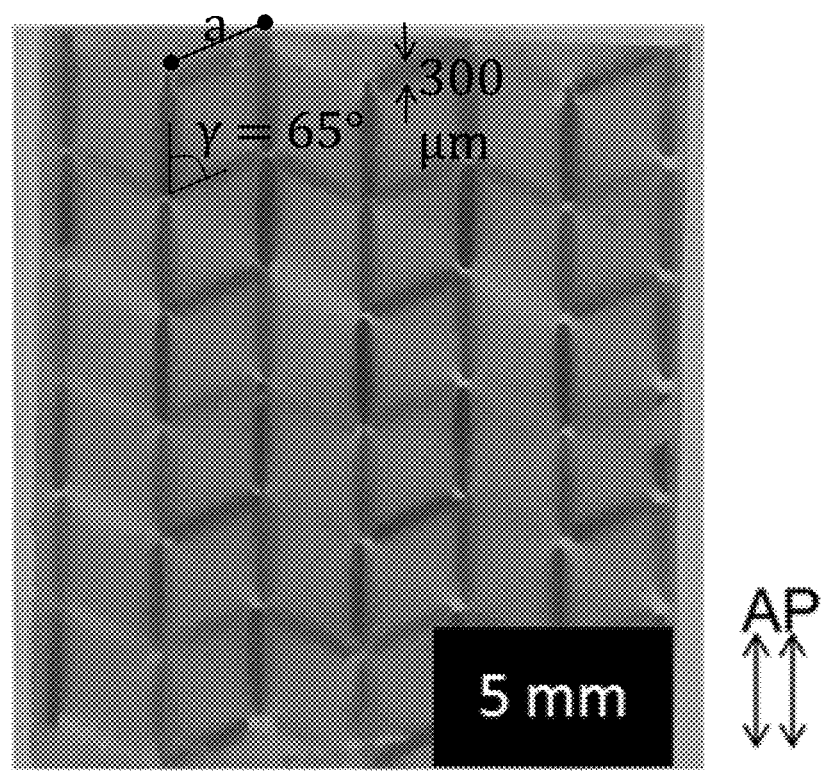
FIG. 38 is a polarized optical photograph of an LCE film patterned as a Miura-ori actuator.

Another exemplary film 192 having folding behavior of a Miura-ori actuator was prepared using a unit cell, the dimensions of which are shown in the polarized optical photograph of FIG. 38. The polarized optical photograph was imaged between parallel polarizers such that hinges are seen as bright or dark lines. FIGS. 39A-39E are sequential illustrations of the actuating movement of the film 192 with increasing temperature (from about 30° C. to about 200° C.).

The primary difference between actuating Miura-ori analogues as compared to other analogues is a non-zero hinge width required to achieve large bending and non-zero thickness. This finite material must be accommodated and likely limits the extent of folding. Additionally, compliance in the facets may lead to bending that is not allowed in rigidly folded Origami models. Despite these significant differences, the effective Poisson ratio due to the actuation, where the axial strain direction is taken to be the long axis of the film, is comparable to an idealized model of similar folding angles.

Figure 40A:
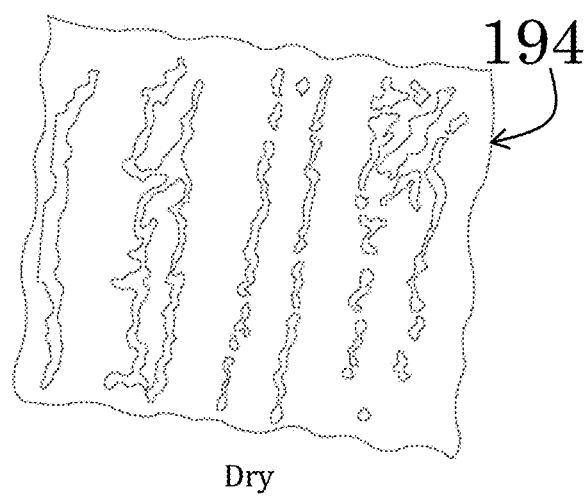
FIGS. 40A and 40B are sequential, top views of actuation of an LCE film with change in solvent environment.
Figure 40B:
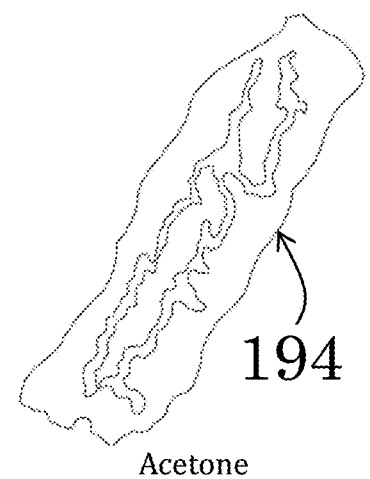
Figure 41A:
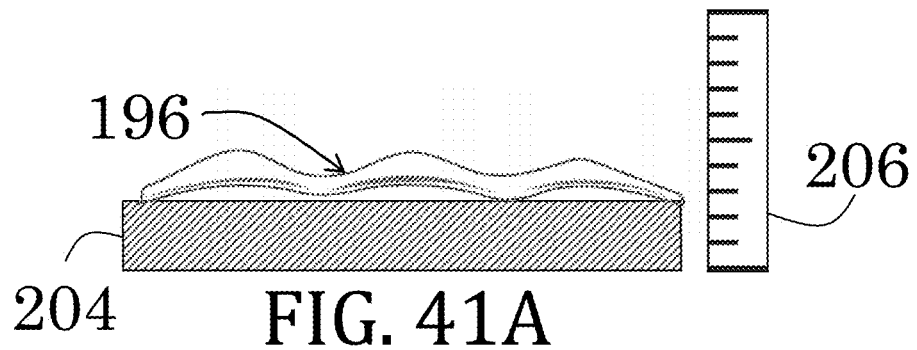
FIGS. 41A-41D are schematic representation of four exemplary films prepared in accordance with embodiments of the present invention and varying a molar ratio of acrylate to amine.
Figure 41B:
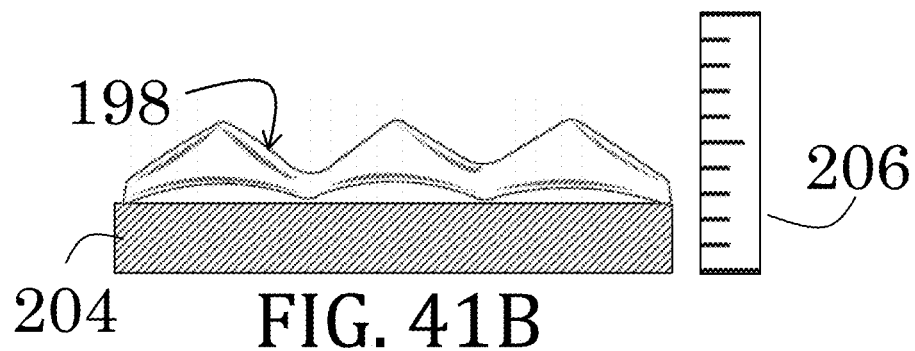
Figure 41C:
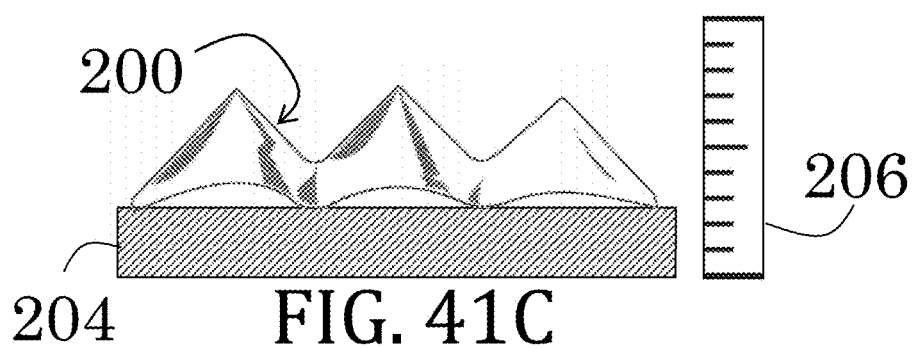
Figure 41D:
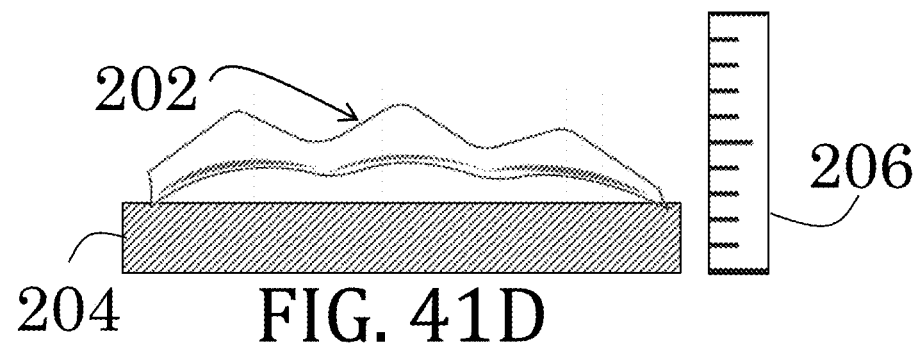

FIGS. 40A and 40B demonstrate a lyotropic response of a Miura-ori actuator film 194 in response to solvent, in the particular illustrated embodiment being acetone. It should be noted that after drying, the film 194 does not return completely to its original flat state. This is to be expected due to the non-zero gel fraction of these networks, which leads to an anisotropic extraction on exposure to solvent and subsequent drying.

Example 11

FIGS. 41A-41D illustrate four azo-LCEs 196, 198, 200, 202 prepared by Michael-addition reaction and cross-linked via photo-polymerization according to embodiments of the present invention and as set forth in Table 1, below. Polymerization was carried out at about 75° C. due to the reaction between acrylate and amine (Michael addition), resulting in nematic macromers. Macromers were photo-polymerized at 75° C. for 2 hr ($\lambda$=532 nm) and formed cross-linked azo-LCEs 196, 198, 200, 202.

As described in detail above, the azo-LCEs 196, 198, 200, 202 were patterned with +1 defects and actuated using irradiating UV source ($\lambda$=365 nm and 100 mW/cm$^2$). Composition, characterization, and photoactuation results of the azo-LCEs 196, 198, 200, 202 are summarized in Table 1, with respect to a base 204 and a ruler 206.

TABLE 1

| Sample | Film No. | Molar Ratio Acrylate:Amine | Diacrylate functionalized azobenzene (wt %) | G (%) | $T_g$ (° C.) | Height of Cone (w.r.t. thickness) |
|---|---|---|---|---|---|---|
| 1 | 196 | 1.20 | 8.8 | 98 | 16.6 | 11x |
| 2 | 198 | 1.24 | 11.9 | 73 | -1.4 | 22x |
| 3 | 200 | 1.25 | 14.9 | 71 | -2.6 | 33x |
| 4 | 202 | 2.10 | 15.5 | 90 | 14.6 | 19x |

Gel fraction ("G") was determined by soaking each sample LCE film in CHCl$_3$ for at least two days without mechanical stirring; $T_g$ was determined from DSC second heating curves at a rate of 10° C./min.

LCEs containing azobenzene in the main-chain were successfully prepared and spatially aligned by surface photoalignment. UV irradiation induced trans-to-cis isomerization of the azobenzene moiety at the molecular level and reduced the order parameter of the azo-LCE, which brought macroscopic shape and optical changes from a yellow, 2D flat film (thermodynamically stable state) to an orange, 3D cone shape (metastable state). The metastable cone shape generated by the cis isomer of azo-LCE slowly returns to a flat shape due to thermal relaxation of the cis-to-trans isomers. The deformation of complex shapes (or sizes) of the cones results from interplay between photochemical processes and thermomechanical properties of the azo-LCEs. These processes and properties may be tuned by adjusting a concentration of azobenzene, a ratio of acrylate-to-amine functionality, or both.

Example 12

LCE films according to embodiments described herein were prepared from 1,4-bis-[4-(6-acryloyloxyhexyloxy) benzoyloxy]-2-methylbenzene, N-butylamine, and a photoinitiator, DAROCURE TPO (Ciba Specialty Chemicals, Co., Basel, Switzerland). The photoalignment material, PAAD-22, was purchased from Beam Engineering for Advanced Measurements, Co. (Winter Park, Fla.). All materials were used as received unless otherwise noted. All compositions are based on weight ratios of monomers added. Monomer purity was not taken into account to determine molar ratio. Specific compositions are provided, below, in Table 2:

TABLE 2

| RM82 (mole parts) | mBA (mole parts) | nBA (weight fraction) |
|---|---|---|
| 1 | 1 | 0.098 |
| 1.25 | 1 | 0.08 |
| 1.5 | 1 | 0.068 |
| 3 | 1 | 0.035 |
| 1 | 0 | 0.000 |

Alignment layers of LCEs prepared according to embodiments described herein used either ELVAMIDE (E.I. du Pont de Nemours and Co., Wilmington, Del.) or photoalignment dye (PAAD-22). Elvamide was coated onto plasma cleaned glass substrates by spinning a solution of 0.125 wt % Elvamide in methanol. After drying, each substrate was then rubbed using a felt cloth.

For photoalignment, a solution of 0.33 wt % PAAD-22 in dimethylformamide was spin coated onto the alignment layer and baked at 100° C. After patterning or rubbing, two alignment layers were glued together using a mixture of two-part epoxy adhesive and glass spacers (50 μm thick) to set the desired thickness. The cells were filled with monomer precursors by capillary action.

Each monomer precursor mixture with appropriate ratio of acrylate-to-amine was prepared and photoinitiator added at 1.5 wt % of total monomer concentration. The mixture was heated and vortexed continuously at 85° C. to ensure complete mixing. The polymerizations for all materials containing amine were performed in a two-step reaction procedure: the mixture was filled into a liquid crystal cell at 80° C. and then left for 16 hrs at 75° C. During this time the Michael Addition reaction proceeds. Following this reaction, the sample was exposed to broadband UV light (wavelength ranging from 320 nm to 500 nm) from a mercury-arc lamp for 30 min at an intensity of about 100 mW/cm².

Polymerization temperature was selected based on the desired phase of polymerization. For "isotropic genesis" polymerization, samples were polymerized at 135° C. For "nematic genesis" polymerization, samples without amine and with a ratio of 3:1 acrylate-to-amine were polymerized at 80° C. The other formulations reported in Table 2 were polymerized at 40° C.

A Nikon polarizing optical microscope fitted with a thermal state (Mettler-Toledo International, Inc.) was used to identify the phase diagram of each sample. The nematic to isotropic transition temperatures reported were collected on cooling. Melting temperatures were collected on heating. Heating and cooling rates of about 2° C./min were used.

Figure 42:
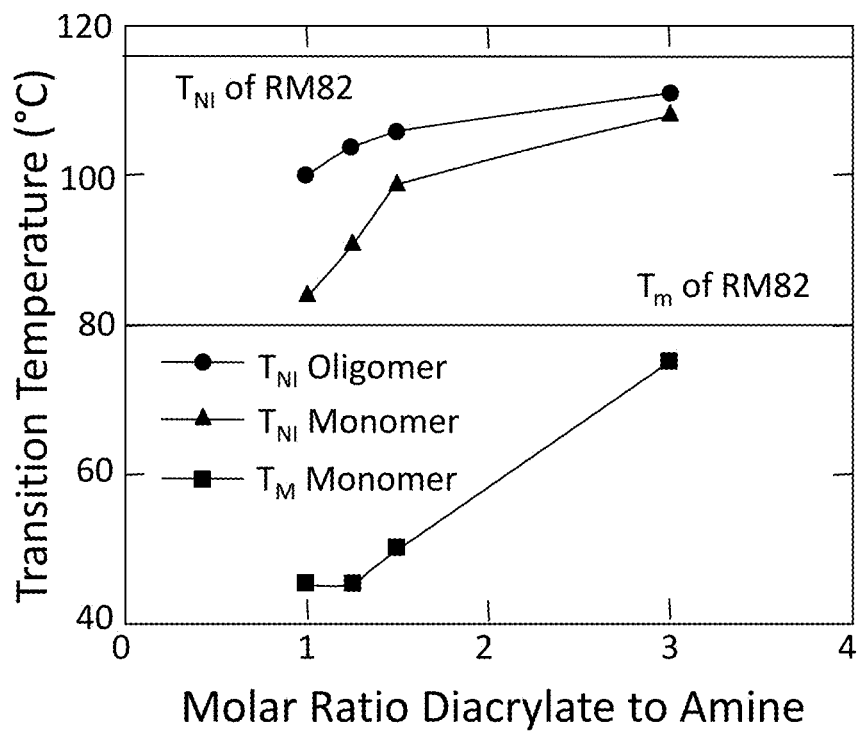
FIG. 42 is a graphical representation of a phase behavior of a reactive mixture prepared in accordance with an embodiment of the present invention.
Figure 43:
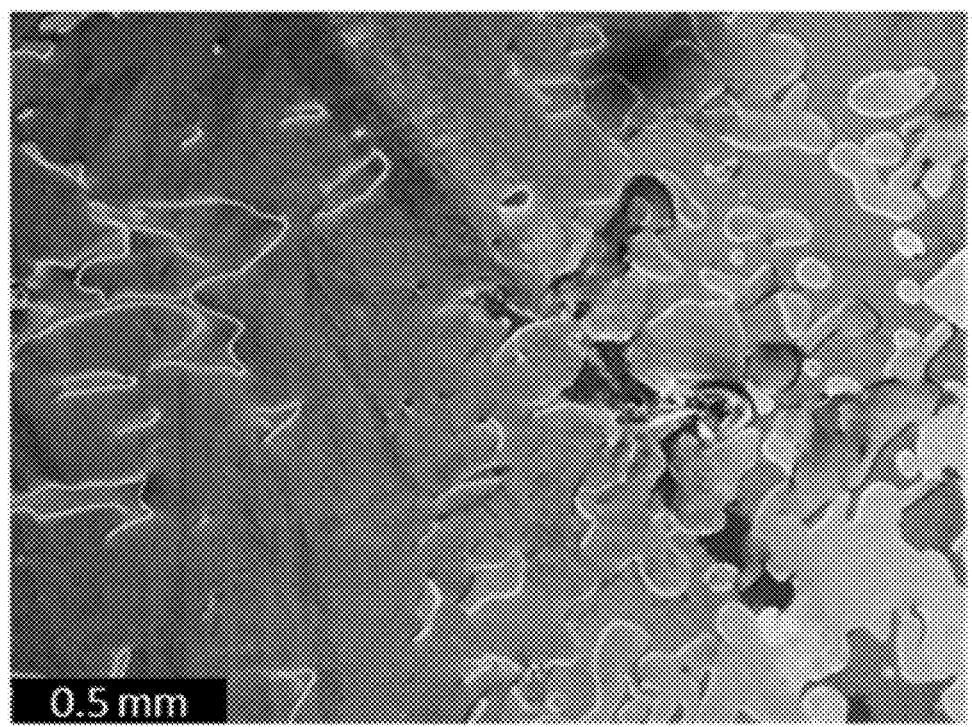
FIG. 43 is a gray-scale photograph of one nematic texture after oligomerization of one of the reactive mixtures of FIG. 42.

FIG. 42 graphically illustrates a phase behavior of the reactive mixtures. Each mixture exhibited a wide nematic phase before and after step-growth oligomerization. Retention of the nematic phase is enabled by the selection of a nematic monomer with a significantly larger molecular weight per functionality than the corresponding chain extender. The resulting mixtures are largely RM82 by weight. FIG. 43 is a representative grey-scale photograph of a nematic texture after oligomerization.

While addition of near stoichiometric amounts of n-butylamine to RM-82 drops the nematic to isotropic transition temperature over 30° C., the nematic phase persists at a temperature suitable for the Michael Addition reaction to proceed. After the chain extension reaction is complete, only the 3:1 diacrylate to amine and control samples show evidence of crystallization after storage for time periods of greater than 3 months at 4° C. Thus, by limiting the ratio of diacrylate-to-amine to greater than 1:1 each macromer retains two acrylate functionalities.

Figure 44:
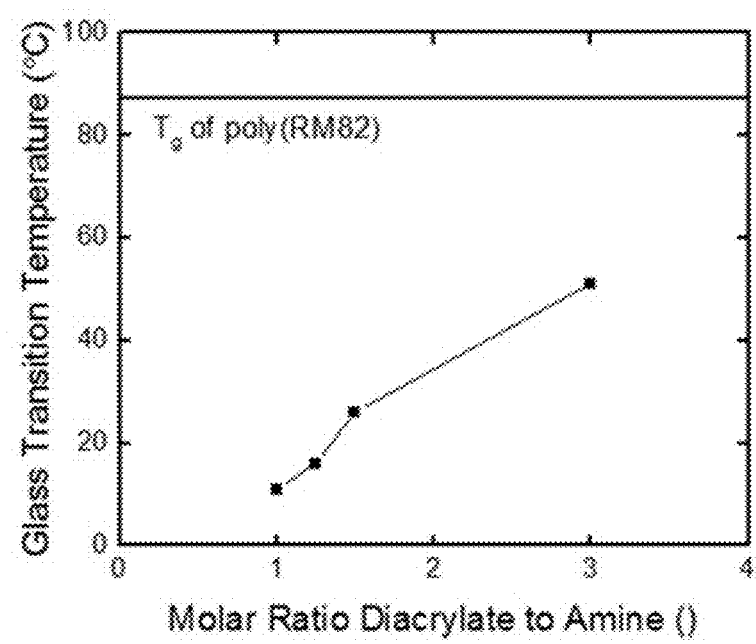
FIG. 44 is a graphical representation of a dependence of glass transition temperature of films prepared in accordance with the present invention on concentration of amine.
Figure 39A:
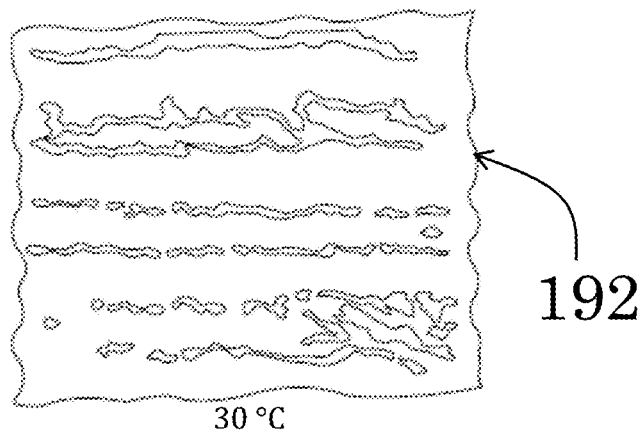
FIGS. 39A-39E are sequential, top views of actuation of the LCE film of FIG. 38 with increasing temperature.
Figure 39B:
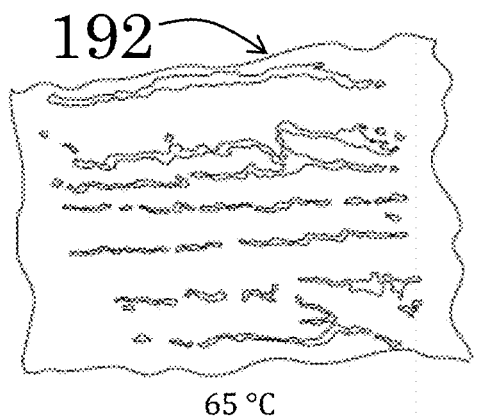
Figure 39C:
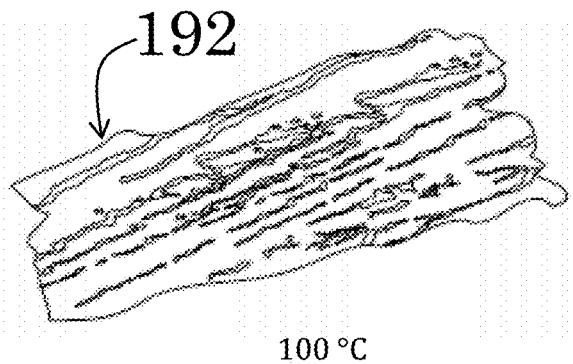
Figure 39D:
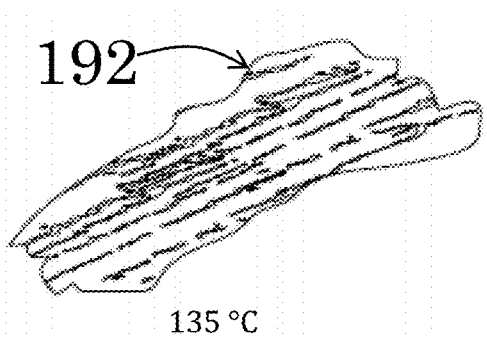
Figure 39E:
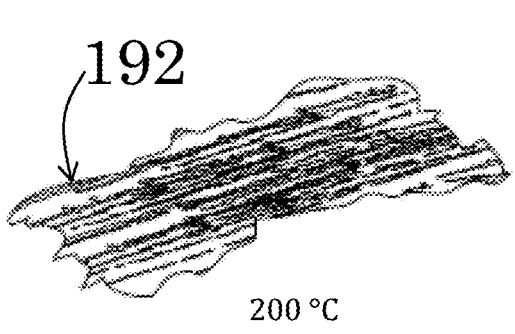

The inclusion of a radical photoinitiator in the formulation allows for the macromers to be subsequently cross-linked to yield a polymer network. After polymerization, the resulting materials were insoluble in a variety of organic solvents. The $T_g$ of the network depends strongly on the concentration of amine in the monomer mixture, as seen in FIG. 44. It has been shown that the behavior of nematic polymer systems depends strongly on the phase present during polymerization.

Example 13

Figures 45A, 45B:
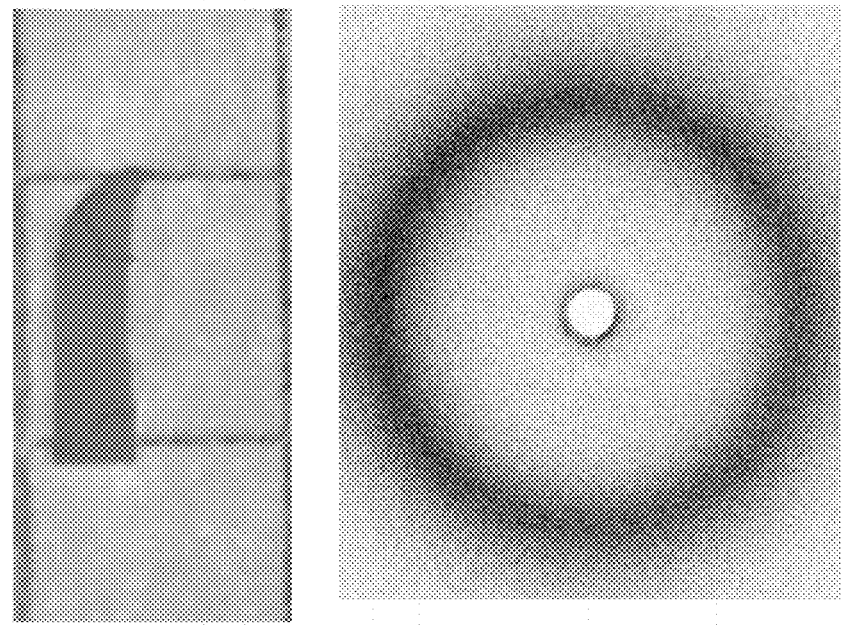
FIG. 45A illustrates an optically-scattering state of a liquid crystal elastomer polymerized at room temperature.
FIG. 45B is a wide angle X-ray scattering pattern of the liquid crystal elastomer of FIG. 45A.

Densely cross-linked LCNs trap the molecular organization (or lack thereof) of the patterned layer during cross-linking. As described herein, LCEs may exhibit phase transitions after crosslinking. Accordingly, so-called "isotropic" genesis materials were prepared according to embodiments of the present invention by undertaking polymerization in the isotropic state of the mixtures. For samples with diacrylate to amine ratios of greater than or equal to 1.5, the material retains a transparent state on cooling, which is indicative of reduced director mobility associated with high crosslink density. Conversely, samples with diacrylate to amine ratios less than about 1.5 after polymerization were within the isotropic phase and, during subsequent cooling to room temperature, the sample transitions from transparent to scattering. FIG. 45A illustrates an optically-scattering state of the a liquid crystal elastomer polymerized at room temperature. FIG. 45B is a wide angle X-ray scattering pattern of the liquid crystal elastomer of FIG. 45A, which confirms there is no macroscopic orientation.

Figure 46:
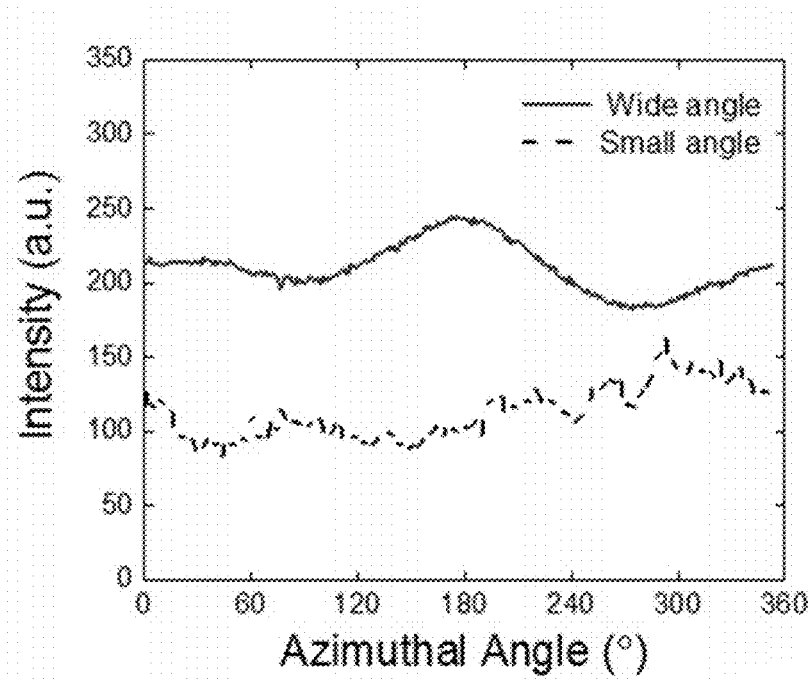
FIG. 46 is a graphical representation of a lack of orientational order exhibited in the isotropic scattering pattern of FIGS. 45A and 45B.

The lack of orientational order in FIG. 45B was confirmed by an isotropic scattering pattern obtained through WAXS, which is graphically shown in FIG. 46. A Rigaku Ultrax 18 using Cu Kα radiation was used to collect 2D wide angle x-ray scattering patterns. Each sample was positioned 53 mm from the imaging plate. The beam was collimated with a pinhole collimator with a diameter of 0.2 mm. Azimuthal integration was utilized to determine a Hermans orientational order parameter. The background level was determined from featureless scattering from the 2θ scan and quantified using integrations at small and wide 2θ angles.

Figures 47A, 47B:
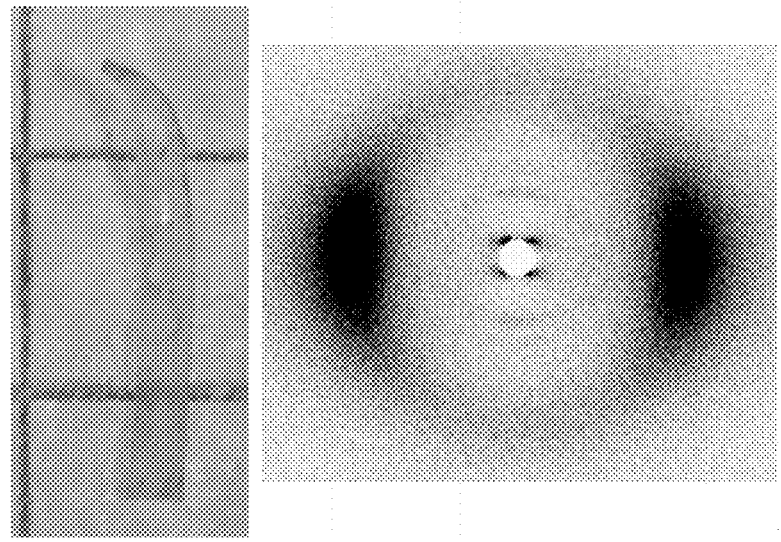
FIG. 47A illustrates an optically-scattering state of another liquid crystal elastomer polymerized at room temperature.
FIG. 47B is a wide angle X-ray scattering pattern of the liquid crystal elastomer of FIG. 47A.
Figure 48:
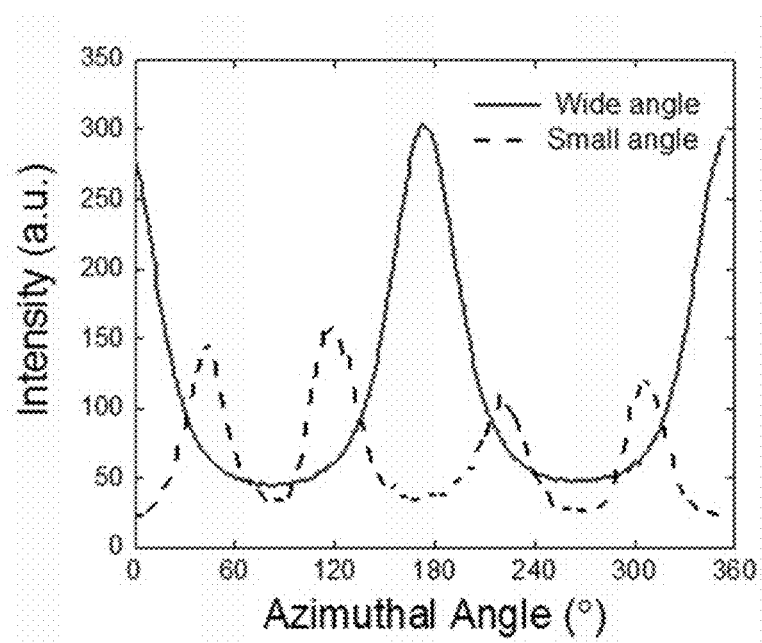
FIG. 48 is a graphical representation of a lack of orientational order exhibited in the isotropic scattering pattern of FIGS. 47A and 47B.

Film samples having a diacrylate-to-amine ratio of 1:1 to 100% uniaxial strain resulted in mechanical alignment. In FIGS. 47A and 47B, the sample transitions from scattering (polydomain, FIG. 47A) to transparent (aligned, FIG. 47B) and several clear features were observed in the diffraction pattern. Intense lobes, centered at 2θ=20°, are observed perpendicular to the stretching direction. The calculated Hermans order parameter is 0.58. FIG. 48 is a WAXS plot of the film samples of FIGS. 47A and 47B.

In FIG. 48, four relatively weak peaks are observed at small angles, which shift at an azimuthal angle approximately 60° to the wide angle peaks. These weak peaks suggest strong smectic-C fluctuations arise in the mechanically stretched material indicating the formation of a chevron-like nanostructure. The smectic-C character leads to interesting shape memory behavior not common in nematic elastomers.

Significant strain fixing in a nematic elastomer upon deformation at room temperature was then observed. Surprisingly, after releasing the load on the elastomer, only partial relaxation is observed as, to the knowledge of the inventors, retention of strain after isothermal deformation in nematic elastomers have not been described.

Tensile testing was performed using a TA Instruments RSA 3 (Texas Instruments, Co., Dallas, Tex.). Film samples were rectangular in shape with nominal dimensions of 10 mm×3 mm×0.05 mm. A strain rate of 1 min$^{-1}$ was used. Shape retention was measured by loading a given sample to a prescribed strain and then unloading slowly (strain rate of 0.1 min$^{-1}$) to zero stress.

Figure 49:
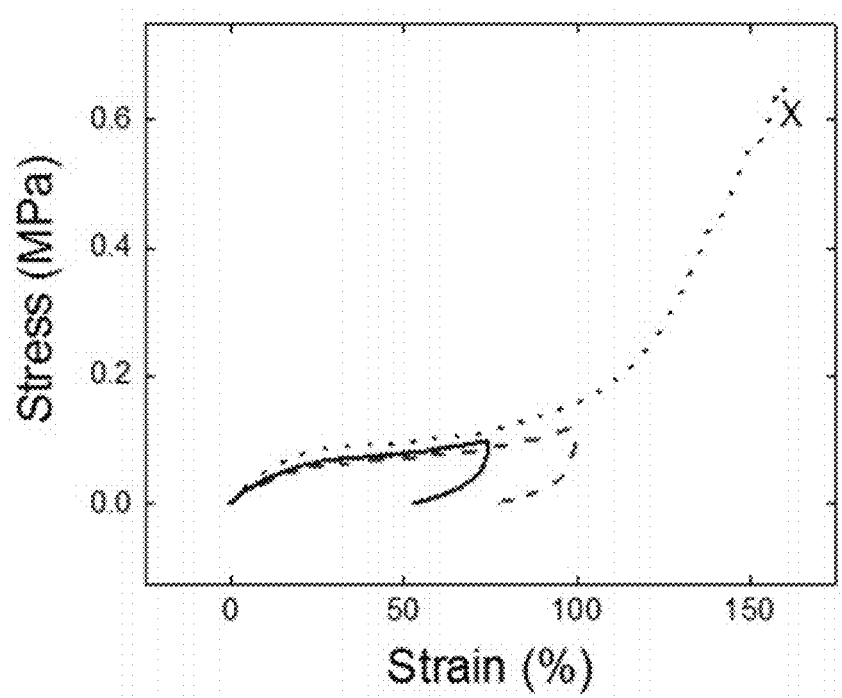
FIG. 49 is a graphical representation of the tensile deformation of an isotropic-genesis polydomain exemplary film prepared in accordance with embodiments of the present invention.

As seen in FIG. 49, tensile deformation of an isotropic-genesis polydomain sample film exhibits the characteristic shape and soft elasticity synonymous with LCEs. After initial elastic behavior, a broad, so-called "soft elastic" plateau associated with orientation of the director is observed. After the mesogens are oriented along the loading axis, the behavior again returns to traditional elasticity, and then ultimately failure (dotted line). If the sample film is not loaded to failure, but instead loaded to an intermediate strain value, the reorientational strain is retained (dashed and solid lines). Isothermal tensile deformation and recovery were performed to quantify strain retention.

Figure 50:
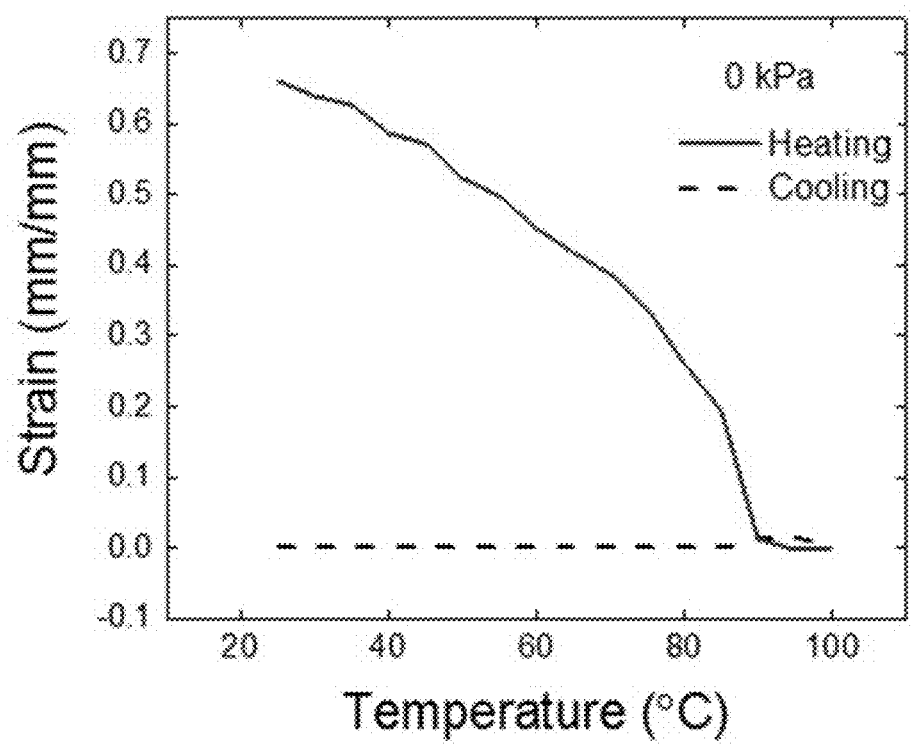
FIG. 50 is a graphical representation of the strain of an isotropic-genesis polydomain exemplary film prepared in accordance with embodiments of the present invention
Figure 53A:
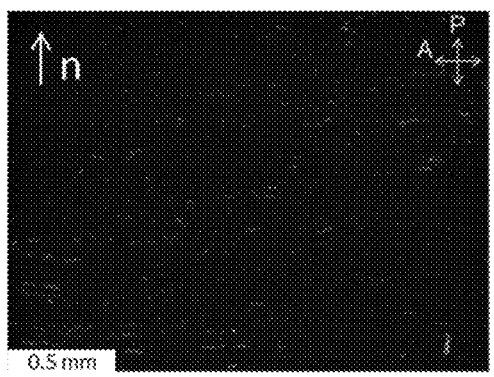
FIGS. 53A-54B are gray-scale images of nematic polymers during cross-linking with FIGS. 53A and 53B corresponding to rubbed surfaces and FIGS. 54A and 54B corresponding to films photoaligned according to embodiments of the present invention.
Figure 53B:
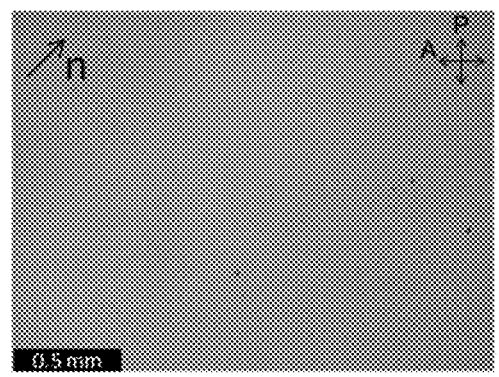
Figure 54A:
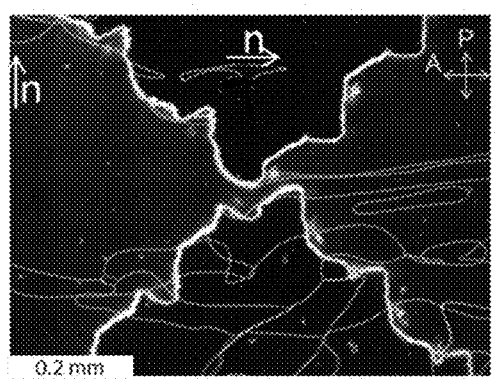
Figure 54B:
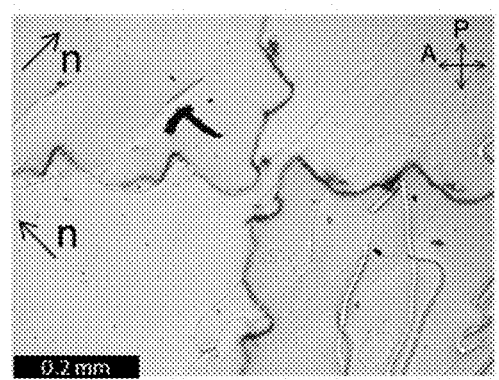

Two intermediate strain values of 75% and 100% were examined. After loading, the sample ilms were slowly recovered to 0 stress. In both cases, the sample recovered 23% strain, which roughly corresponds to the transition from elastic to soft elastic behavior in the tensile testing curve. As a result, the shape fixity, the ratio of programmed strain to stored strain in the material, is highly strain dependent but can be taken to be 0.77 at 100% strain. This strain is stored indefinitely at room temperature. Shape fixity was verified over a period of weeks under ambient conditions. Observation of room temperature programmability greatly simplifies the shape memory cycle for the sample films as compared to many previously described shape memory polymers. It should be noted that strain retention occurs in an elastomeric material. On heating, strain is recovered on demand, as demonstrated in FIG. 50. A sample film initially programmed to 90% strain and allowed to relax at room temperature recovers the programmed strain on heating to 100° C. without externally applied load. Recovery after heating was complete by 90° C. This corresponds to the nematic-isotropic transition temperature of the LCE, which was confirmed optically through the loss of birefringence. On cooling, no significant change in length occurred. As such, shape change was confirmed to be one-way and irreversible.

Thermal actuation and shape recovery were measured using an optical microscope and thermal stage. Each sample film was placed in silicone oil to ensure the ability to change shape biaxially. Two-way actuation under load was monitored using a digital camera while the each sample film was heated using hot air. The deformation of patterned sample films was monitored while heating in a glass thermal chamber on a hot plate at 175° C.

Differential scanning calorimetery was utilized to measure the $T_g$ of the polymerized films. Each sample was heated to 125° C., cooled to −50° C., and heated again to 125° C. All heating and cooling rates were fixed at 10° C./min. The $T_g$ reported is from the second heating cycle.

Two-way reversible shape changes were also observed in film samples. More specifically, reversible shape change was observed under uniaxial load. FIGS. 51A and 51B depict a sample film 208 attached to a support 210 and lifting a weight 212 that is approximately 1470 times the mass of the sample film, corresponding to a stress of 290 kPa, with a tensile stroke of approximately 50%. This tensile actuation corresponds to a specific work capacity of 50 J/kg and a work density of 96.9 kJ/m$^3$. These values are comparable to, or exceed, the behavior of human skeletal muscle. Using forced air heating and ambient cooling, an actuation rate of about 0.3 Hz is demonstrated, as shown in FIG. 52. The resulting specific power is 16.5 W/kg, which is, however, significantly lower than skeletal muscle. The primary limitation of actuation speed is the slow nature of ambient heating and passive cooling methods employed here. In isotropic genesis networks, these reversible shape changes are limited to loaded conditions and relatively simple geometries. By comparison, LCNs that are aligned prior to crosslinking can exhibit complex reversible shape changes without requiring external load.

Example 14

Referring now to FIGS. 53A-54B, the alignment of nematic polymers during cross-linking by treated surfaces is described. FIGS. 53A-54B are representative optical micrographs between crossed polarizers of a surface rubbed (FIGS. 53A and 53B) and photoaligned (FIGS. 54C and 54D) cells immediately after filling with an RM82 and amine mixture. Birefringence and texture indicative of the Schlieren texture associated with the nematic mesophase are readily visible after filling in FIGS. 54A and 54B. On annealing in the nematic state, the presence of defects greatly diminishes, leaving a homogenously aligned nematic. In the aligned nematic state, the cell is left at 75° C. overnight to allow for completion of the Michael addition reaction.

Figure 55:
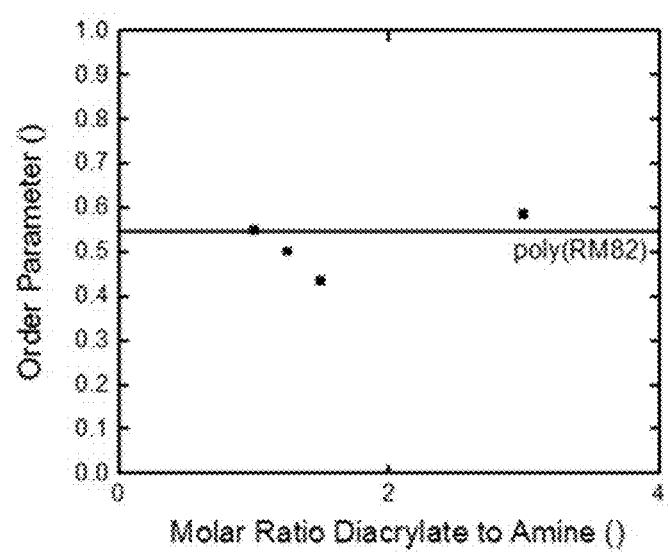
FIG. 55 is a graphical representation of an orientation order parameter of a film prepared in accordance with an embodiment of the present invention.

After crosslinking, WAXS was utilized to determine an orientational order parameter, which is graphically shown in FIG. 55. The degree of order was not found to vary significantly with the ratio of diacrylate-to-amine. The mechanical properties and thermal responses of the LCNs were highly dependent on the concentration of the amine chain extender.

Figure 56A:
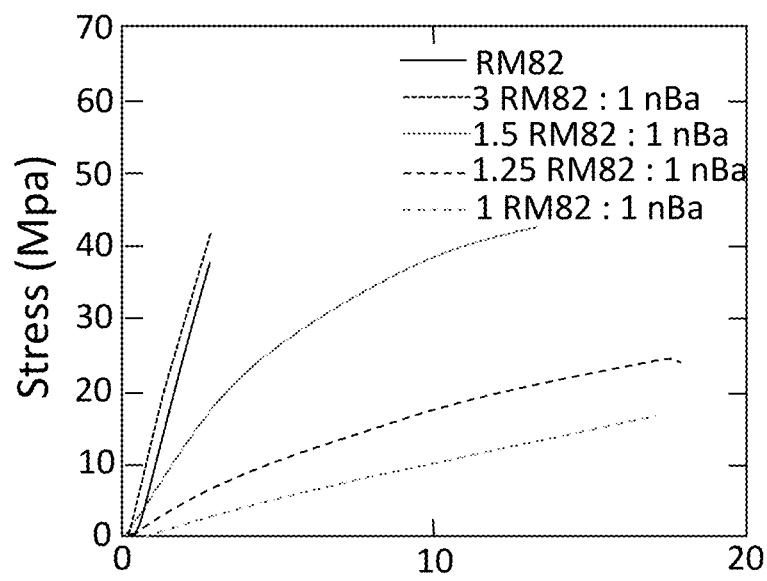
FIGS. 56A-56C are graphical representations of tensile testing along the director orientation, tensile testing perpendicular to the director orientation, and modulus, respectively, for films prepared in accordance with embodiments of the present invention.
Figure 56B:
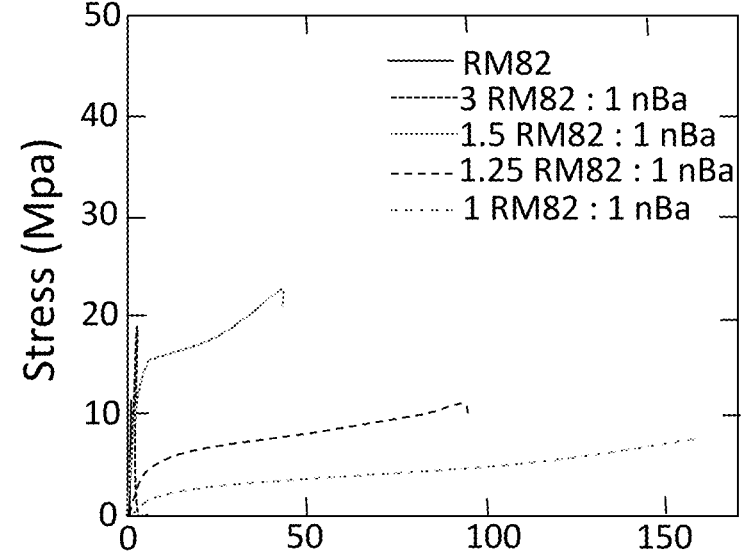
Figure 56C:
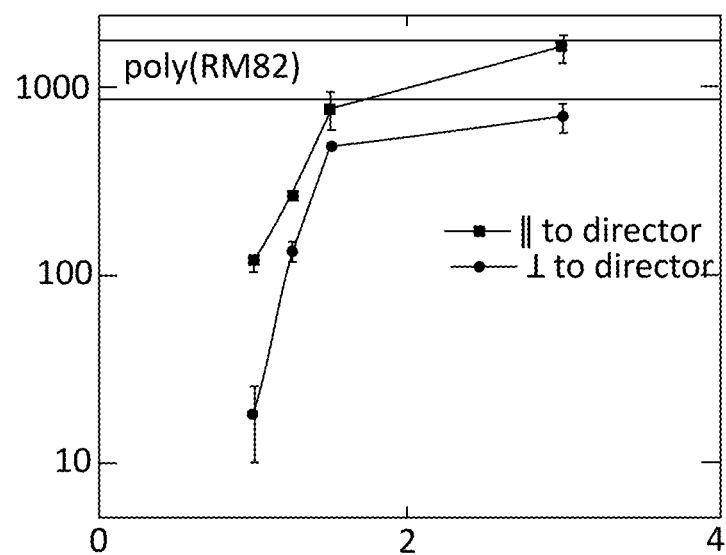

In FIGS. 56A-56C, tensile testing, both along (FIG. 56A) and perpendicular to (FIG. 56B), the director orientation was utilized to probe the anisotropy of the aligned LCNs. Strain-to-failure (FIGS. 56A and 56B) and modulus (FIG. 56C) are both dependent on alignment direction and amine concentration. It should be noted that the $T_g$ values varied by more than 80° C. for this series of LCNs. However, the effect of alignment is clear on each sample. Brittle failure (less than 20% strain) was observed for all diacrylate-to-amine ratios along the director orientation. The strain-to-failure values are significantly larger perpendicular to the director orientation for diacrylate-to-amine ratios of 1.5 and lower. The two most lightly crosslinked samples exhibit semi-soft elastic plateaus perpendicular to the director, characteristic of the rotation of the director in aligned LCEs. The increase in director mobility with amine concentration is also apparent in the spontaneous length changes that occur on heating.

Figure 57:
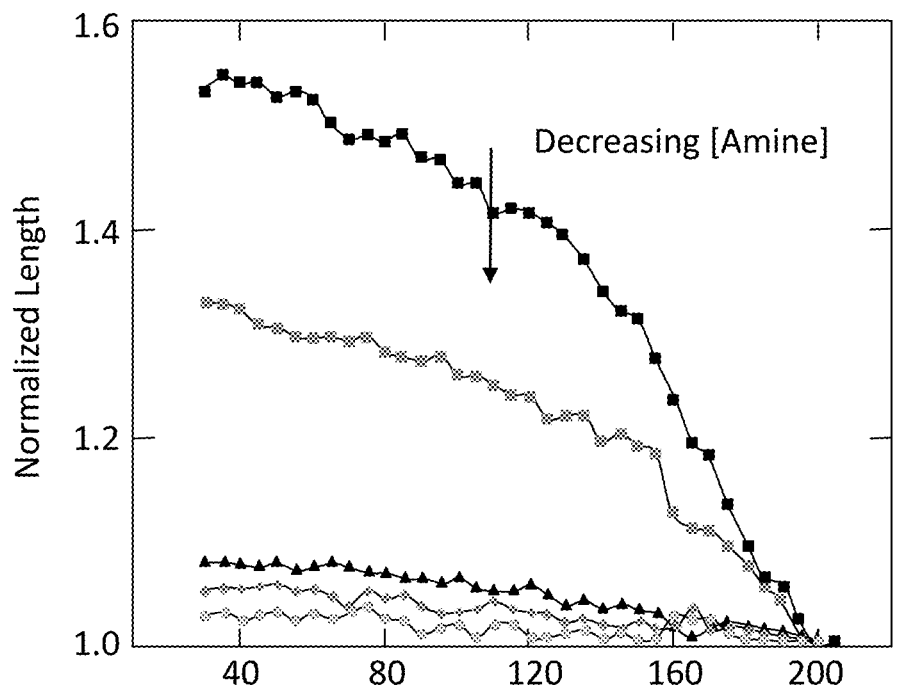
FIGS. 57 and 58 graphically illustrate liquid crystal networks prepared in accordance with embodiments of the present invention and having a broad anisotropic shape change in response to temperature.
Figure 58:
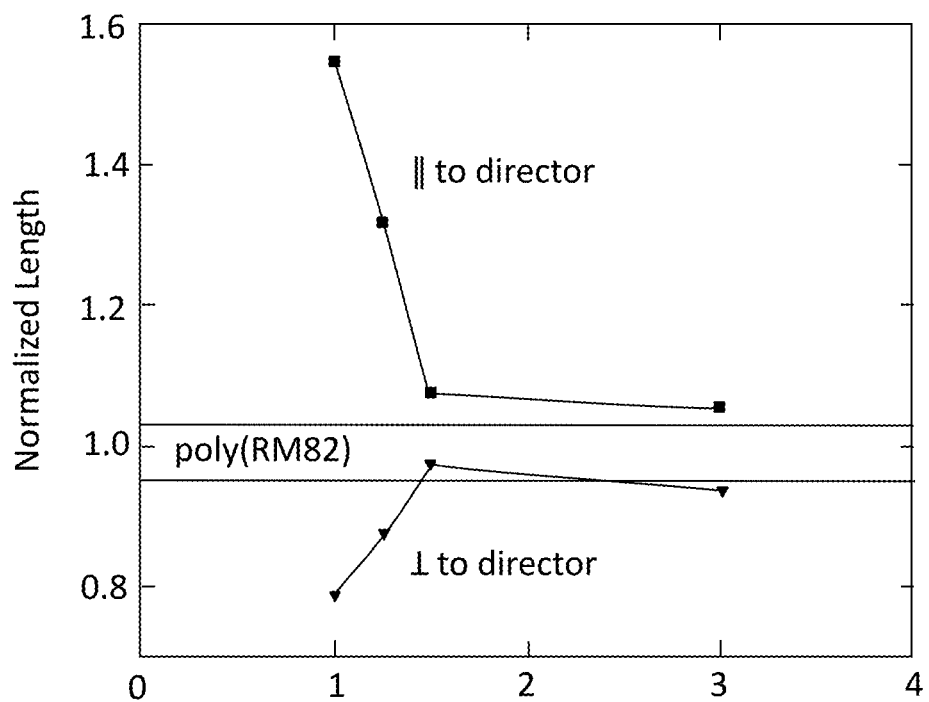

FIGS. 57 and 58 graphically illustrate that each LCN exhibited a broad, anisotropic shape change in response to temperature. In each, a thermally-induced contraction along the director orientation is observed and accompanied by an expansion perpendicular to the director orientation. Shape change may be explained as the macroscopic result of the change in the polymer chain conformation from anisotropic (prolate) to more isotropic (spherical). None of the nematic genesis monodomains undergo a nematic-to-isotropic transition; instead, a high-temperature paranematic state persists (i.e., a supercritical behavior) The amount of reversible strain trends with the concentration of the amine chain extender. The largest strains were observed for networks prepared with near stoichiometric amounts of amine-todiacrylate at about 55% contraction along the director orientation. These strains drop to less than about 3% for the homopolymer of RM82. In the exemplary system, there was a direct tradeoff between modulus and actuation strain. However, the synthetic approach, according to the exemplary embodiment presented here, allows for a selection of the desired combination of properties within an actuator. Although the actuation demonstrated thus far is anisotropic and programmed into the material, the achievable complexity from conventional rubbing techniques is limited. This limitation can be overcome utilizing photoalignment techniques to spatially control actuation direction within a monolith.

Example 15

A single pattern was written for each composition (See Table 2, Example 12, above) shown in FIG. 59, included a square array of alternating regions of alignment, either at 0° or 90°. Resultantly, the pattern yields segmented +1 topological defects at pattern intersections. After polymerization, films were harvested having retained the as-written pattern.

FIGS. 60A and 60B are gray scale images of a representative film placed between crossed polarizers. The two regions in the film possess the same birefringence and are bounded by a bright line border.

Figure 61:
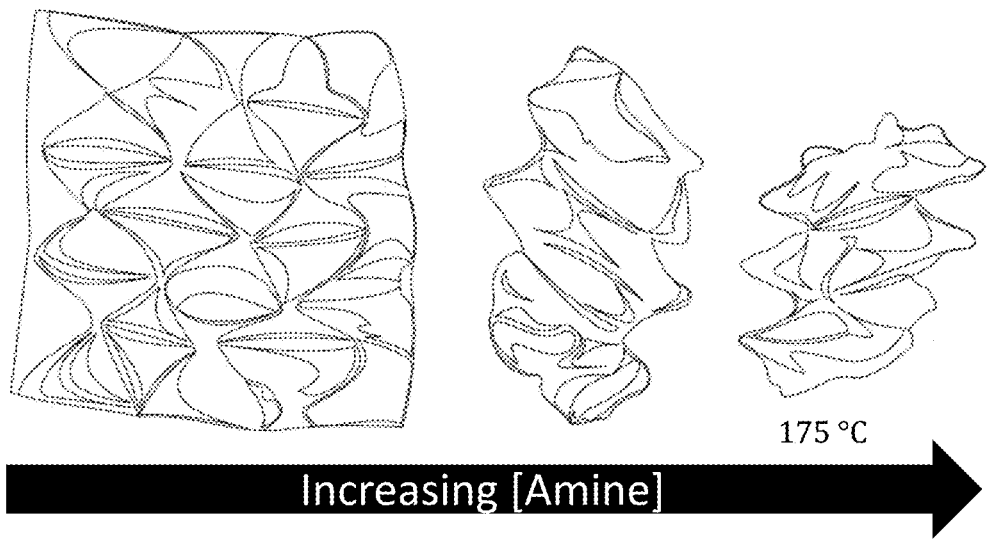
FIG. 61 illustrates the sequential folding of a film prepared in accordance with an embodiment of the present invention and patterned in accordance with FIG. 59.

Each film was largely flat at room temperature, and on heating to 175° C., transformed from flat to a complex array of pyramid-like shapes, as seen in FIG. 61. The magnitude of the deflection of each cone was strongly dependent on the inherent strain present in each region. The strain was largely reversible and the film return to a near flat state after cooling. Small irreversible strain as observed and, as such, the film did not return completely flat shape, likely due to the additional thermal crosslinking during actuation.

Example 16

RM82 was purchased from Sigma Aldrich. RM2AE (2-methyl-1,4-phenylene bis(4-(3-(allyloxy)propoxy)benzoate) was purchased from Alpha Micron. Irgacure 651 was donated by BASF. Elvamide was donated by DuPont. PAAD-22 was purchased from Beam Co. All materials were used as received, unless otherwise noted.

Liquid crystal cells were prepared in accordance with embodiments described herein. For cells patterned via rubbed surfaces, Elvamide was dissolved in methanol at 0.15 wt %, spin coated onto plasma-cleaned glass, and rubbed with a felt cloth to introduce alignment (either uniaxial or twisted).

For photoaligned cells according to embodiment of the present invention, PAAD-22 in dimethylformamide (0.33 wt %) was spin coated onto plasma-cleaned glass. The coated glass was then baked at 100° C. for 10 min.

For both cell types (rubbed surface and photoaligned), two pieces of glass were glued together using a two-part epoxy mixed with 50 μm glass spheres to set cell thickness. Photoalignment was carried out using according to embodiments described herein, using light wave-lengths of 445 nm to orient the dye.

All formulations were a 1:1 mole ratio or RM2AE and EDT. RM82 content varied, as indicated in Table 3, below. Irgacure 651 was used as a photoinitiator in concentrations of 0.1 wt %. While shielded from fluorescent light, each monomer mixture was prepare in a vial, melted at about 100° C., and vortexed repeatedly. Phase behavior of the monomer solution was investigated using polarizing optical microscopy with a heating stage. Resulting nematic solutions were then filled into the previously prepared cells by capillary action, at 100° C., and in the isotropic state. Each cell was then cooled to 15° C., i.e., below the $T_{NI}$ of the monomer, and allowed to rest. Polymerization with a 365 nm UV light (about 200 mW/cm$^2$) was at room temperature.

TABLE 3

| RM82 | RM 2AE | EDT | Gel Fraction (g/g) |
|------|--------|-----|--------------------|
| 0.75 | 1 | 1 | 0.86 ± 0.02 |
| 0.50 | 1 | 1 | 0.76 ± 0.02 |
| 0.40 | 1 | 1 | 0.72 ± 0.01 |
| 0.30 | 1 | 1 | 0.69 ± 0.03 |
| 0.20 | 1 | 1 | 0.50 ± 0.02 |
| 0.00 | 0 | 0 | 0 |

Resultant films were then characterized. Gel fraction was determined by measuring the remaining mass of film, about 10 mg in initial weight, after immersion in acetone. Each composition was run in triplicate.

Differential scanning calorimetry (TA instruments, Q1000) was used to investigate the thermal behavior of the system. Film samples having a thickness of 200 μm were prepared, without specific alignment. The samples were heated in N$_2$ from room temperature to 150° C., cooled to −50° C., and then heated again to 200° C. All heating and cooling rates were set to 10° C./min. Shape change of uniaxially aligned samples was characterized by monitoring a rectangular sample (1 mm by 1 mm) floating on a silicone bath. A thermal stage (top and bottom heating) was used to control temperature. All data was collected on cooling, with temperature allowed to equilibrate for 5 min before recording an image (polarizing microscope) and sample size measured.

Samples (8 mm×2 mm) of a single composition (0.5 RM82) were prepared for further characterization by wide angle X-ray scattering and for measuring alignment with a Rigaku Ultrax and Cu Kα radiation on a sample with uniaxial alignment. Tensile testing was performed using a TA instruments Q800. Strain rate was set to 100%/min. Torsional actuators were fabricated using Elvamide coated glass rubbed in orthogonal directions.

After polymerization, the film was cured at 30° to the rubbing direction (22 mm×0.8 mm×0.5 mm). Defect patterned samples were aligned using point-by-point photoalignment. Sample dimensions were 5 mm×5 mm×0.05 mm. For 3D shape change observations, ambient heating on a hot plate covered in black paper, as a non-adhesive surface, and inside a glass thermal chamber.

Figure 62:
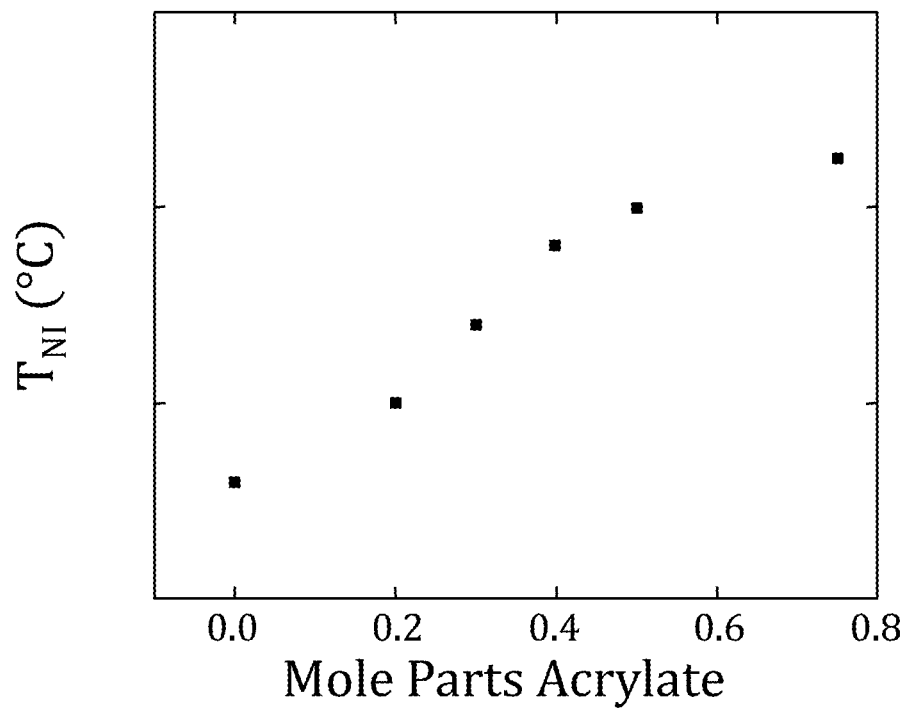
FIG. 62 is a graphical representation of samples prepared in accordance with embodiments of the present invention with varying concentrations of RM82 and exhibiting a nematic phase above room temperature.
Figure 63:
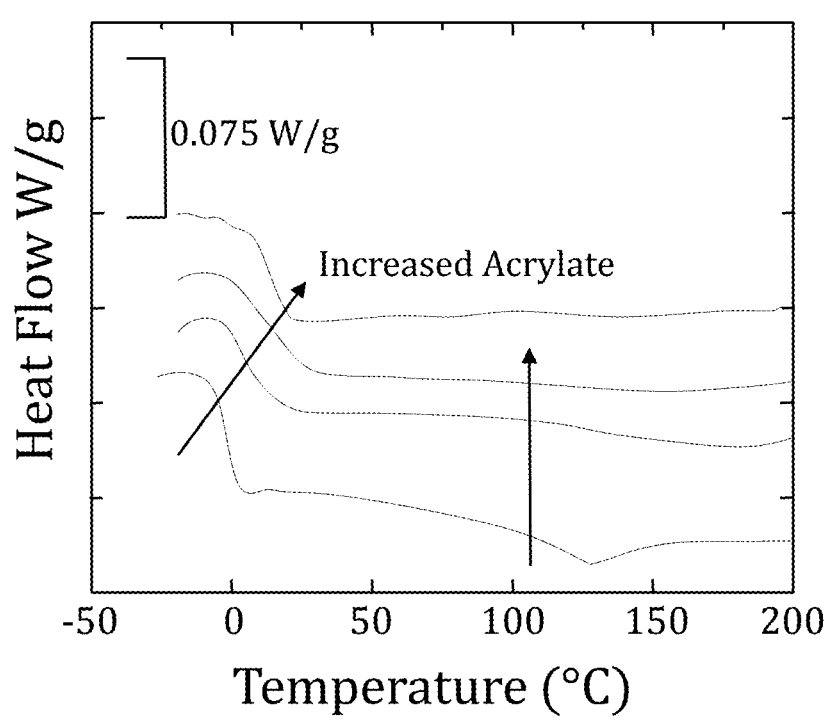
FIG. 63 is a graphical representation of four samples prepared in accordance with embodiments of the present invention with varying concentrations of RM82 and exhibiting glass transition temperatures below room temperature and nematic-isotropic transitions.

FIG. 62 graphically illustrates that each sample exhibited a nematic phase above room temperature. The nematic-isotropic transition temperature was dependent on acrylate composition. After polymerization, as shown in FIG. 63, the films exhibited $T_g$ values below room temperature and a nematic-isotropic transition. Illustrative compositions in FIG. 63 include 0.3 RM82, 0.4 RM82, 0.5 RM82, and 0.75 RM82.

Figure 66:
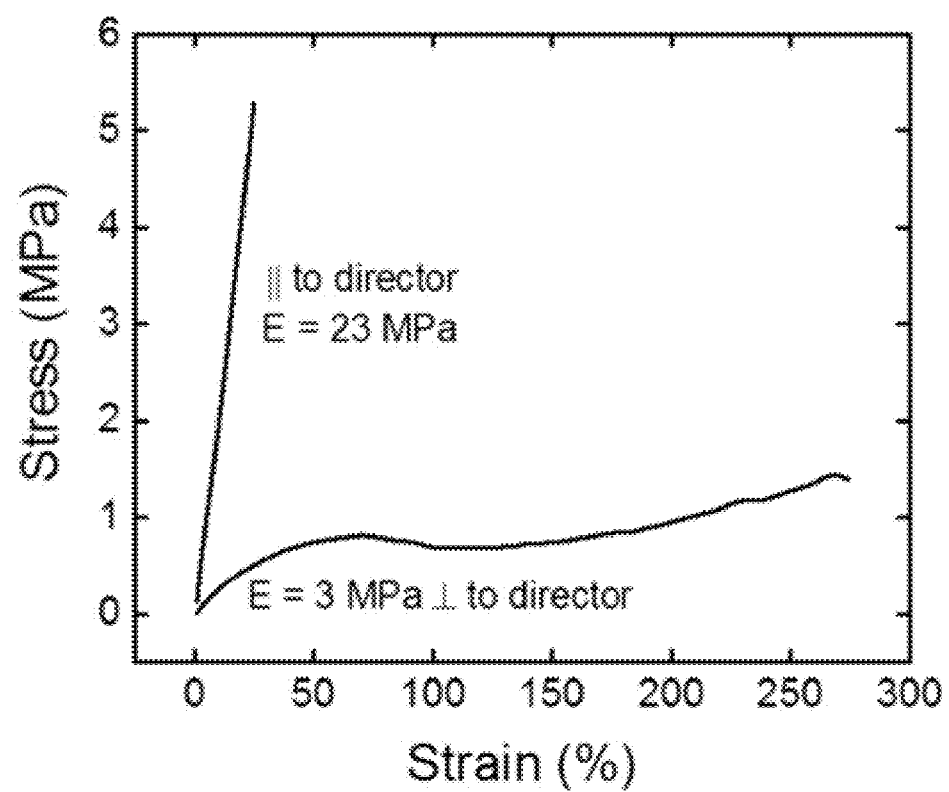
FIG. 66 is a graphical representation of uniaxial tensile testing of the film imaged in FIG. 64 and demonstrating anisotropic mechanical properties.
Figure 64:
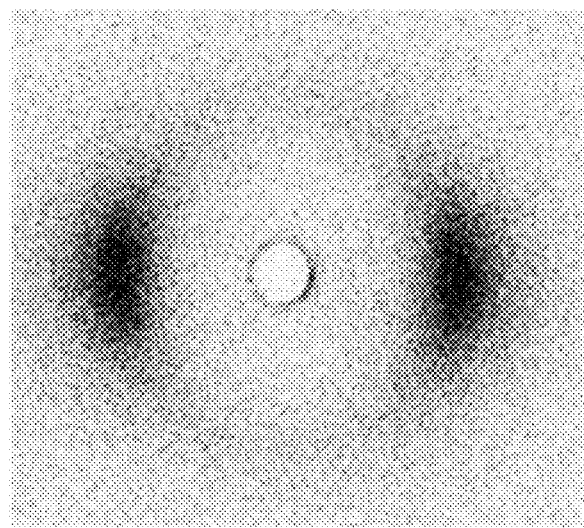
FIG. 64 is a two-dimensional scattering plot resulting from wide-angle X-ray scattering of a film prepared in accordance with an embodiment of the present invention.
Figure 65:
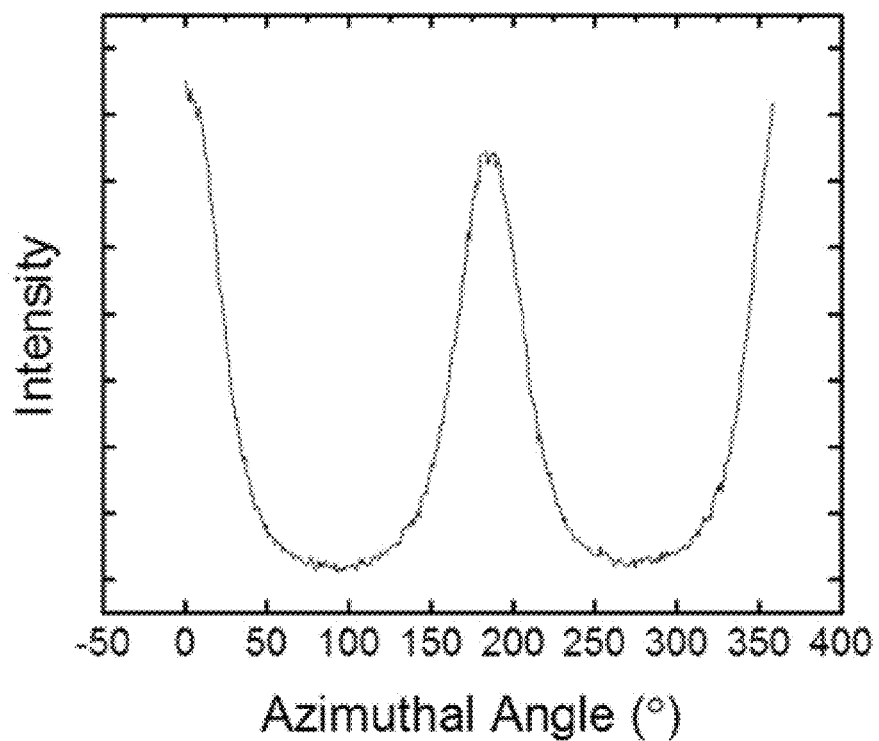
FIG. 65 is a graphical representation of the azimuthal integration of FIG. 64.
Figure 71A:
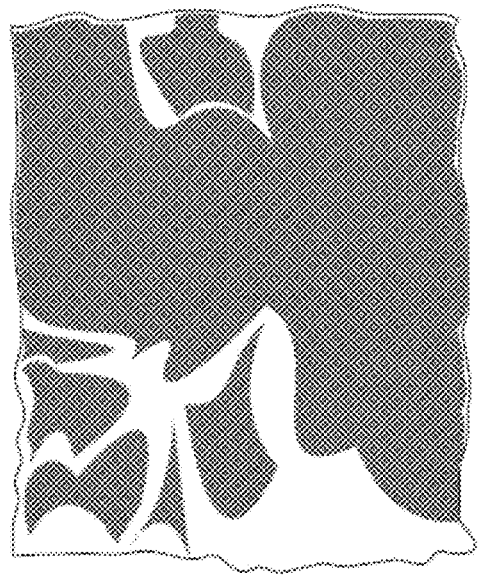
FIGS. 71A and 71B are schematic representations of a film have a +1 azimuthal defect, with and without heat stimulus, respectively, prepared in accordance with an embodiment of the present invention.
Figure 71B:
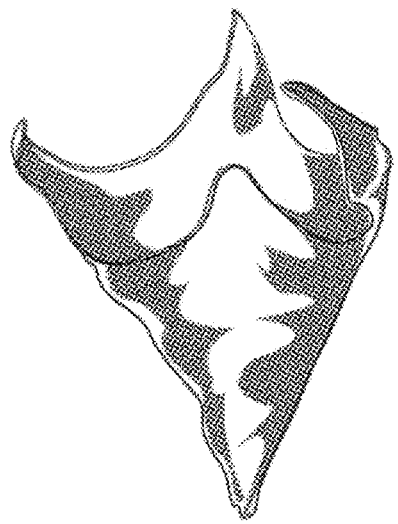
Figure 72A:
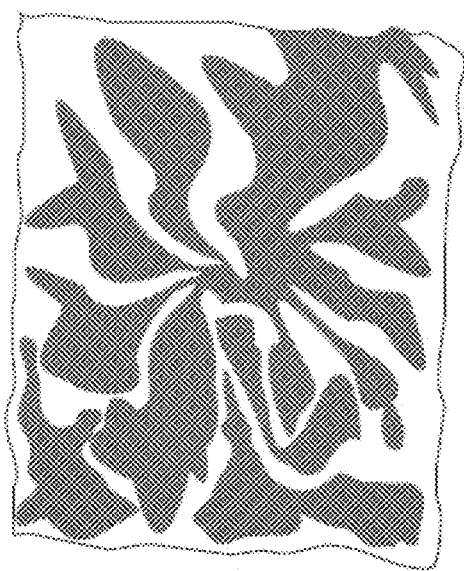
FIGS. 72A and 72B are schematic representations of a film have a +6 defect, with and without heat stimulus, respectively, prepared in accordance with an embodiment of the present invention.
Figure 72B:

FIGS. 64 and 65 include data with respect to wide-angle X-ray scattering of one of the exemplary films: FIG. 64 being a two-dimensional scattering provide and FIG. 65 being the azimuthal integration. These figures shown anisotropic scattering, which may be indicative of a material in the nematic phase. FIG. 66, corresponding to the same exemplary film, graphically illustrates uniaxial tensile testing demonstrating anisotropic mechanical properties and the so-called "soft elasticity."

FIGS. 67A and 67B are polarized optical micrographs of the 0.5 RM82 exemplary films at room temperature and 200° C., respectively. While not specifically shown, the films returned to its original dimensions on cooling to room temperature.

Quantification of reversible shape change for the 0.4 RM82, 0.5 RM82, and 0.75 RM82 films is shown in FIG. 68, while FIG. 69 graphically illustrates the induced torsional shape change with increasing temperature, with corresponding schematic representations for 50° C., 100° C., and 175° C. in FIGS. 70A, 70B, and 70C, respectively. The through thickness (hierarchical) orientation of liquid crystal polymers may be used to generate bending and torsional deflections. Hierarchical variation is prohibitively difficult to achieve by conventional mechanical mechanisms and magnetic fields. Methods of preparing films according to embodiments described herein twisted nematic orientation having director orientation varying 90° through the thickness of the film may be prepared. Thus, offsetting the nematic director orientation by 30° with respect to the long axis of a film produces torsional deformations. On heating, such a film transitions from a flat shape to a twisted conformation until the film is limited by self-intersection (See, FIG. 70C). Nearly 300° of twist per millimeter of film length may be achieved.

The magnitude of strain was shown to be dependent on the concentration of diacrylate, with a maximum reversible strain (measured on cooling) of 156% for films having a molar concentration of RM82 greater than 0.4. As acrylate concentrate increased, the achievable reversible strain decreased; as acrylate concentration decreased from 0.4, reversible strain also decreased, which may be due to low network strength limited by the relatively low crosslink density and low gel fraction.

The director orientation profile may be programmed, in-plane, to prepare films subsumed with topological defects. Topological defects describe point discontinuities in ordered material. FIGS. 71A-72B are schematic representations of two such films (subsumed +1 azimuthal defect in FIGS. 71A and 71B, subsumed +6 defect in FIGS. 72A, and 72B) at 25° C. and 150° C., with the images associated with room temperature being representative of the corresponding film after three heating cycles. The strength of deflection reflects the number of 360° changes of the director orientation when travelling about the defect center. The +1 azimuthal defect of FIGS. 71A and 71B produced a point of Gaussian curvature and transformed from a flat sheet at room temperature to a cone with exposure to heat. Specifically, a 50 µm thick, flat film transitioned to a con of more than 5 mm in height with a sharp opening angle of 39° at 150° C. The +6 defect formed a two-dimensional wrinkling pattern that lead to an areal contraction.

LCNs are versatile materials for the programming of shape change in response to a stimulus. The embodiments provided herein provide materials responsive to thermomechanical stimuli that may be tuned by employing a facile chemistry that allows the crosslink density to be varied through a two-step reaction occurring within a liquid crystal cell. Orientation of mesogens under load within isotropic genesis networks may be used to mechanically program shapes at room temperature that are also recoverable on demand. Actuation is demonstrated with tensile actuation performance comparable to human skeletal muscle. Complex 3D actuation may be achieved by the self-assembly of nematic precursors to patterned surfaces.

More specifically, a facile, one-pot synthesis allows for the preparation of LCE films that are sensitive to directed self-assembly of local alignment with voxel-by-voxel level control of actuation direction and magnitude. The resulting films may be programmed to exhibit localized bending or stretching in response to an order-reducing stimulus. These localized actuations may be combined to generate monolithic actuators with giant stroke or shape deployment.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A liquid crystal film comprising:
   cross-linked and polymerized, nematic monomers comprising a ratio mixture of a diacrylate and an amine; and
   a topographical defect within the cross-linked and polymerized, nematic monomers, the topographical defect having a first state and a second state,
   wherein the liquid crystal film is an elastomer having a glass transition temperature that is less than about 20° C. and the topographical defect is configured to assume the first state with a presence of a stimulus and to assume the second state in an absence of the stimulus.

2. The liquid crystal film of claim 1, wherein the nematic monomers are selected from the group consisting of acrylates, methacrylates, thiols, vinyl, epoxides, and amines.

3. The liquid crystal film of claim 1, wherein the diacrylate is 1,4-bis-[4-(6-acryloxyloxyhexyloxy)benzoyloxy]-2-methylbenzene and the amine is n-butyl amine.

4. The liquid crystal film of claim 1, wherein the polymer includes a mesogen.

* * * * *